United States Patent
Nakayama et al.

(10) Patent No.: US 8,496,046 B2
(45) Date of Patent: Jul. 30, 2013

(54) METHOD FOR PRODUCING ALLOY INGOT

(75) Inventors: Jumpei Nakayama, Kobe (JP); Tatsuhiko Kusamichi, Kobe (JP)

(73) Assignee: Kobe Steel. Ltd., Hyogo (JP)

( * ) Notice: Subject to any disclaimer, the term of this patent is extended or adjusted under 35 U.S.C. 154(b) by 0 days.

(21) Appl. No.: 13/384,142

(22) PCT Filed: Jul. 15, 2010

(86) PCT No.: PCT/JP2010/004615
§ 371 (c)(1),
(2), (4) Date: Jan. 13, 2012

(87) PCT Pub. No.: WO2011/007578
PCT Pub. Date: Jan. 20, 2011

(65) Prior Publication Data
US 2012/0145353 A1 Jun. 14, 2012

(30) Foreign Application Priority Data

Jul. 15, 2009 (JP) ................................. 2009-166725
Jul. 15, 2009 (JP) ................................. 2009-166726
Jul. 15, 2009 (JP) ................................. 2009-166727

(51) Int. Cl.
*B22D 27/02* (2006.01)
*C22B 9/10* (2006.01)

(52) U.S. Cl.
USPC ........................ 164/493; 164/494; 75/10.14

(58) Field of Classification Search
USPC ........... 164/493, 494, 497, 506, 507; 75/10.1, 75/10.14
See application file for complete search history.

(56) References Cited

U.S. PATENT DOCUMENTS 6,309,441 B1 * 10/2001 Benz et al. ................... 75/10.46
7,381,366 B2 * 6/2008 Carter et al. .................. 266/202
(Continued)

FOREIGN PATENT DOCUMENTS

JP 5295470 11/1993
JP 11-246910 9/1999
(Continued)

OTHER PUBLICATIONS

International Preliminary Report on Patentability with Written Opinion in the corresponding International Application PCT/JP2010/004615, issued Feb. 7, 2012.

(Continued)

*Primary Examiner* — Kevin P Kerns
(74) *Attorney, Agent, or Firm* — Stites & Harbison PLLC; Juan Carlos A. Marquez, Esq.; Steven J. Weyer, Esq.

(57) ABSTRACT

Disclosed is a method for producing alloy ingot including: a step of: charging alloy starting material into a cold crucible in a cold-crucible induction melter, and forming melt pool of the alloy starting material by induction heating in inert gas atmosphere; a step of continuing the induction heating and adding first refining agent to the melt pool, and then reducing the content of at least phosphorus from among impurity elements present in the melt pool; and a step of forming alloy ingot by solidifying the melt, the phosphorus content of which has been reduced. The first refining agent is mixture of metallic Ca and flux, where the flux contains $CaF_2$ and at least one of CaO and $CaCl_2$. The weight proportion of the sum of CaO and $CaCl_2$ with respect to $CaF_2$ ranges from 5 to 30 wt % and the weight proportion of metallic Ca with respect to the melt pool is 0.4 wt % or greater.

8 Claims, 9 Drawing Sheets

U.S. PATENT DOCUMENTS

| | | |
|---|---|---|
| 2006/0266158 A1 | 11/2006 | Shindo |
| 2009/0038772 A1 * | 2/2009 | Kunii et al. ............ 164/493 |

FOREIGN PATENT DOCUMENTS

| | | |
|---|---|---|
| JP | 11246910 | 9/1999 |
| JP | 11-310833 | 11/1999 |
| JP | 11310833 | 11/1999 |
| JP | 2000219922 | 8/2000 |
| JP | 2002-069589 | 3/2002 |
| JP | 2003-055744 | 2/2003 |
| JP | 2003271496 | 9/2003 |
| JP | 2003-342629 | 12/2003 |
| JP | 2003342629 | 12/2003 |
| JP | 2004266619 | 9/2004 |
| JP | 2007154214 | 6/2007 |
| JP | 2007155141 | 6/2007 |
| JP | 2008-274340 | 11/2008 |
| JP | 2008274340 | 11/2008 |
| WO | WO 2005-049882 | 6/2005 |
| WO | WO 2011/007578 | 7/2010 |

OTHER PUBLICATIONS

International Search Report for the corresponding Patent Application No. PCT/JP2010/004615, dated Oct. 19, 2010.

Y. Nakamura et al., "Refining of 18%CR-8% Ni Steel with Ca-$CaF_2$ Solution", Transaction ISIJ, vol. 16 (1976), p. 623.

S. Iwasaki et al., "Production of Super-low Phosphorus Stainless Steel by Cold Crucible Levitation Melting," Iron and Steel, vol. 88 (2002), No. 7, p. 413.

* cited by examiner (a)

(b)

(a)

(b)

(a)
TIME STEP

IMPURITY REMOVAL REFINING EFFECT: MAXIMAL (b)

(c)

METHOD FOR PRODUCING ALLOY INGOT

TECHNICAL FIELD

The present invention relates to a method for producing alloy ingot, and more particularly, to a method for producing alloy ingot such as high-grade stainless steel and superalloy for which ultrahigh purity (ultralow impurity content) is required. Specifically, the present invention relates to a method for producing ultrahigh-purity alloy ingot of practical scale, which has a weight of 10 kg or more.

BACKGROUND ART

Impurity elements such as carbon (C), nitrogen (N), oxygen (O), phosphorus (P) and sulfur (S) are known to affect adversely corrosion resistance in alloys. As is also known, reducing to the utmost the content of such impurity elements results in a significant improvement in the corrosion resistance of the alloy.

In mass production of stainless steel in conventional electric furnace-argon oxygen decarburization units (or vacuum oxygen decarburization units), the total content ([C]+[N]+[O]+[P]+[S]) of these impurity elements stood at about 250 ppm, even when performing a removal treatment of the impurity elements by ladle refining.

In vacuum induction melting, by contrast, an alloy ingot is prepared out of a high-purity alloy starting material such as, for instance, electrolytic iron, electrolytic nickel or metallic chromium, using a vacuum induction melter. Therefore, the content of impurity elements can be reduced down to about 10 to 20 ppm for [P] and [S], about 20 to 30 ppm for [N] and [O], and about 30 to 50 ppm for [C]. However, high-purity alloy starting materials are expensive, and hence vacuum induction melting cannot be used for mass production.

Vacuum induction melting employs ordinarily a refractory crucible. Therefore, as is known, it is difficult to reduce the content of impurity elements such as P and N in the melt upon preparation of high-chromium stainless steel. This arises as a result of the fundamental problems below. Removal refining of P in molten steel is ordinarily performed by oxidation refining. In oxidation refining, P in the molten steel is converted to slag-like phosphorus oxide ($P_2O_5$) and is removed by being absorbed into the slag. When using oxidation refining to prepare high-chromium stainless steel, however, there is oxidized not only P in the molten steel, but also chromium (Cr), as one alloy component. The Cr content in the steel becomes thereby insufficient.

Thus, a reduction refining technique disclosed in Non-patent Document 1 was developed in the 1970s as a technique for removing impurity elements such as phosphorus (P) in the preparation of high chromium stainless steel. Specifically, melting refining of stainless steel (SUS304) as consumable electrode material is performed in a water-cooled copper crucible, having an inner diameter of $\phi$70 mm, that is provided in an electroslag remelting (ESR) unit, by using $CaF_2$ as fused slag and forming a slag bath by melting metallic calcium into the $CaF_2$. As a result there are removed, for instance, phosphorus (P), tin (Sn), lead (Pb), arsenic (As), antimony (Sb), bismuth (Bi), oxygen (O), sulfur (S), selenium (Se), tellurium (Te), nitrogen (N) and the like as impurity elements in the stainless molten steel. Non-patent Document 1 is the first report on reduction refining using metallic calcium, and is a report on the possibility of removing, in principle, impurity elements such as phosphorus (P) or the like, present in a Cr-containing alloy, by reduction refining. However, ESR processes used in this report requires causing alternate electric current to flow through a slag bath itself, so that the slag bath becomes formed as a result on account of the resulting heat resistance. Therefore, increasing the addition amount of metallic calcium as a way of enhancing the refining effect results in a significant drop in the electric resistance of the slag bath itself, so that a sufficient amount of heat fails to be achieved, and the formation itself of the slag bath is difficult. Thus, the above process was not a practical process.

Ever since, a reduction refining technique using a magnetic-levitation type induction melter (cold-crucible induction melter) provided with a water-cooled copper crucible has been developed, as disclosed in Patent Documents 1 to 3 and Non-patent Document 2. In this refining technique, a melt pool is formed through melting of stainless steel by induction heating, and through addition of a refining agent in the form of metallic calcium and calcium fluoride ($CaF_2$) to the melt pool, to remove thereby impurity elements such as phosphorus (P).

Specifically, a fused calcium fluoride layer is formed first, using calcium fluoride ($CaF_2$) as flux, and then metallic calcium is melted into the fused calcium fluoride layer. The metallic calcium is left to react with the phosphorus (P) in the melt pool, to form calcium phosphide ($Ca_3P_2$). The calcium phosphide is absorbed into the calcium fluoride bath. Dephosphorization is carried out thereby. In this refining reaction it is indispensable to use a fused flux such as $CaF_2$ or the like that can melt metallic calcium. Accordingly, there must be used, as the reactor, a water-cooled copper crucible that does not react with molten $CaF_2$ or Ca. That is, this reduction refining technique cannot be used in ordinary vacuum induction melting that employs refractory crucibles.

In this reduction refining technique, removal refining of phosphorus (P) and the like is performed by charging 0.8 to 2 kg of stainless steel (SUS316L), as alloy starting material, into a water-cooled copper crucible having an inner diameter of $\phi$60 mm or an inner diameter of $\phi$84 mm, and by forming a small-scale melt pool. Therefore, the refining techniques disclosed in Patent Documents 1 to 3 and Non-patent Document 2, like the refining technique disclosed in Non-patent Document 1, are proof-of-principle tests in small-scale melt pools, wherein the prepared ingots are merely ingots for research, having at most a weight smaller than 2 kg. To prepare practical-scale ingots of 10 kg or more, therefore, it is necessary to establish anew a reduction refining technique for a large cold-crucible induction melter.

As a large cold crucible-type induction melting method, the inventors established a large-scale cold crucible-type induction melting technique using a water-cooled copper crucible having an inner diameter of $\phi$400 mm or larger, disclosed in Patent Document 4. Upon development of this induction melting technique, however, it was found that the behavior of the melt and slag in a water-cooled copper crucible having an inner diameter of $\phi$200 mm or larger exhibited greater fluctuations as compared with a water-cooled copper crucible having an inner diameter of less than $\phi$100 mm, and found that controlling refining in a large cold-crucible induction melter becomes more difficult the higher the purity of the melt is raised (i.e. the further the content of impurity elements is reduced). As a result, it is unclear whether the reduction refining technique of Patent Documents 1 to 3 can apply, in the production of ultrahigh-purity alloy ingots, also to a melt pool of 10 kg or more, which is deemed to be a practical melt pool. Even assuming that such reduction refining technique can be applied, it is not possible to predict, in the light of the above findings by the inventors, the specific conditions that are necessary for a stable practical-scale operation on the basis of Patent Documents 1 to 3, except in a case where the conditions of reduction refining disclosed in Patent Documents 1 to 3 can be used, without modification, in reduction refining in a large cold-crucible induction melter, or in a case where the reduction refining technique disclosed in Patent Documents 1 to 3 can be optimized to an operation condition of a large cold-crucible induction melter. Therefore, it becomes necessary to establish a separate practical-scale refining technique.

Reduction refining as disclosed in Patent Documents 1 to 3 relies on metallic calcium, such that the Ca content in alloy ingots of stainless steel or the like after reduction refining reaches several hundred ppm. Alloy ingots having been subjected to such reduction refining may be susceptible to impairment of corrosion resistance due to high Ca concentration. Preferably, therefore, Ca is further removed from the melt after reduction refining.

Patent Document 5 discloses a method for producing an ultrahigh-purity alloy ingot by using, as primary ingot, an alloy ingot obtained by performing reduction refining disclosed in Patent Documents 1 to 3, employing a cold-crucible induction melter, and then further removing calcium contained in the primary ingot under an atmospheric pressure lower than 0.5 Pa, using an electron beam melter. As a result there is prepared an ultrahigh-purity alloy ingot satisfying $[C]+[N]+[O]+[P]+[S] \leqq 100$ ppm and $[Ca] \leqq 10$ ppm.

Even after performing reduction refining according to the production method of Patent Document 5, however, dephosphorization, decarburization and/or deoxidation were insufficient in some cases, in that $[C]+[N]+[O]+[P]+[S]>100$ ppm, depending on the amount of metallic calcium and flux, and depending on the operation conditions. That is, no method for producing alloy ingots in a practical scale could be established. Also, electron beam melting must be performed under an ultrahigh vacuum atmosphere, i.e. an atmospheric pressure lower than 0.5 Pa, and hence production costs rise as production time lengthens. Electron beam melting under an atmospheric pressure higher than 0.5 Pa was thus preferable.

When an inexpensive starting material such as stainless steel scrap, carbon steel material, ferrochrome material and the like are used as melt starting materials (alloy starting material) in cold crucible-type induction melting (CCIM), then carbon (C), silicon (Si), manganese (Mn), aluminum (Al) and the like become mixed into the melt, out of the melt starting material, at the melting stage. When using ultrahigh-purity alloy scrap such as ultrahigh-purity stainless steel as the melt starting material, by contrast, virtually no impurity elements as phosphorus (P), sulfur (S), tin (Sn), lead (Pb) and the like become mixed into the melt. However, silicon (Si), aluminum (Al), titanium (Ti), zirconium (Zr), hafnium (Hf), boron (B) and the like do become mixed into the melt, out of the melt starting material. Therefore, it is necessary to perform removal refining of elements such as C, Si, Mn, Al, Ti, Zr and B, derived from melt starting material, according to the target composition of the alloy.

Patent Document 6 discloses a method for removing aluminum as impurity element, that is melted in melt, in cold crucible-type induction melting. Specifically, firstly, melt pool is formed by melting 2 kg of high-Cr ferritic heat-resistant steel (Fe-10Cr), as melt starting material, in a water-cooled copper crucible having an inner diameter of ϕ84 mm and that is provided in a cold crucible-type levitation melter. Next, 10 g of iron oxide are added to the melt pool, to oxidize the Al that has not melted in the melt, and yield thereby aluminum oxide (nonmetallic inclusion), such as alumina or the like, that does not melt in the melt. Thereafter, 75 g of calcium fluoride ($CaF_2$) as flux are added, to cause the aluminum oxide to be removed through absorption into the $CaF_2$-based flux.

In Patent Document 6, using iron oxide as oxidant of aluminum is effective for removal refining of aluminum since iron oxide is selected as oxide of an element having a weaker affinity to oxygen than that of aluminum. However, as in the examples of Patent Document 6, there can be removed virtually no elements such as carbon (C), silicon (Si), boron (B) and the like having a stronger oxygen affinity than aluminum. Presumably, aluminum alone is removed by iron oxide according to a reaction mechanism that is different from that of the reaction set forth in Patent Document 6. Thus, it is unclear that an element to be removed will be removed even by using an oxidant in the form of an oxide of an element having a weaker oxygen affinity than that of the element to be removed, and it is likewise unclear whether there will be removed an element having a stronger oxygen affinity than the element to be removed, in accordance with the features disclosed in Patent Document 6.

Therefore, this unclear whether Si, Mn and B can be removed down to a target value, even by using the oxidation refining technique of Patent Document 6, in a case where $[Si]<0.01$ wt %, $[Mn]<0.01$ wt % and $[B]<1$ ppm are required in an ultrahigh-purity stainless steel material from which extreme corrosion resistance is demanded. The oxidation refining technique in Patent Document 6 is a proof-of-principle test in a small-scale melt pool that is formed in a water-cooled copper crucible having an inner diameter of ϕ84 mm, and it is unclear whether the technique applies to a practical-scale melt pool of 10 kg or more. Even if the technique does apply to such a melt pool, the specific oxidation refining conditions required for a stable operation are still unclear.

Patent Document 7 discloses a cold-crucible induction melter that uses a crucible (halide-based crucible) in which a halide layer containing calcium halide, such as calcium fluoride, is formed on the inner side of the crucible, in cold crucible-type induction melting. Although damage to the crucible is suppressed in this cold-crucible induction melter, the reaction progresses at all times through contact between the halide, such as calcium fluoride, and the melt, at an inner wall portion of the halide-based crucible. Accordingly, operational management is more difficult than in the case of using an ordinary water-cooled copper crucible.

As a technique for preparing Ni-based alloy or stainless steel ingots of higher purity, there is an ingot production method by electron beam melting, disclosed in Patent Document 8, that is different from the above-described cold crucible-type induction melting methods. However, electron beam melting is ordinarily used for melting of high-melting point metals such as Ti, Nb and Ta, but methods for removal refining of impurity elements such as carbon (C) and oxygen (O) in stainless steel, by electron beam melting, are still unclear. In particular, specific conditions for stable decarburization and deoxidation refining to $[C] \leqq 10$ ppm and $[O] \leqq 10$ ppm are wholly unclear.

LIST OF PRIOR ART DOCUMENTS

Patent Documents

Patent Document 1: JP H11-246910 A
Patent Document 2: JP 2002-69589 A
Patent Document 3: JP 2003-55744 A
Patent Document 4: JP H11-310833 A
Patent Document 5: JP 2007-154214 A
Patent Document 6: JP 2003-342629 A Patent Document 7: JP 2007-155141 A
Patent Document 8: JP 2008-274340 A Non-Patent Documents Non-patent Document 1: Y. Nakamura et al.: Refining of 18% Cr-8% Ni Steel with Ca—CaF$_2$ Solution, Transaction ISIJ, Vol. 16 (1976), p. 623
Non-patent Document 2: Iwasaki, Sakuraya, Fukuzawa: Production of Super-low Phosphorus Stainless Steel by Cold Crucible Levitation Melting: Iron and Steel Vol. 88 (2002), No. 7, p. 413

SUMMARY OF THE INVENTION

The present invention has been made in view of the above circumstances, and an object thereof is to provide a method for producing, in a practical scale, alloy ingot having extremely low content of at least a specific element (phosphorus (P), carbon (C), calcium (Ca) or oxygen (O)) from among impurity elements.

An aspect of the present invention is a method for producing alloy ingot, comprising: a step of charging alloy starting material into a cold crucible in a cold-crucible induction melter, and forming melt pool of the alloy starting material by induction heating in inert gas atmosphere; a step of continuing the induction heating and adding first refining agent to the melt pool, and then reducing the content of at least phosphorus from among impurity elements present in the melt pool; and a step of forming alloy ingot by solidifying the melt, the phosphorus content of which has been reduced, wherein the first refining agent is mixture of metallic calcium and flux containing calcium halide; the flux contains calcium fluoride and at least one of calcium oxide and calcium chloride, with a proportion of a total weight of the calcium oxide and the calcium chloride with respect to a weight of the calcium fluoride ranging from 5 to 30 wt %; and a proportion of a weight of the metallic calcium in the first refining agent with respect to a weight of the melt pool before adding the first refining agent is 0.4 wt % or greater.

Another aspect of the present invention is a method for producing alloy ingot, comprising: a step of charging alloy starting material into a cold crucible in a cold-crucible induction melter, and forming melt pool of the alloy starting material by induction heating in inert gas atmosphere; a step of continuing the induction heating and adding second refining agent to the melt pool, and thereafter, continuing the induction heating for 15 minutes or longer in evacuated state resulting from evacuating inert gas to the exterior, and then reducing the content of at least carbon and calcium from among impurity elements present in the melt pool; and a step of forming alloy ingot by solidifying the melt, the carbon and calcium content of which has been reduced, wherein the second refining agent is mixture of flux and first oxide containing one, two or more types from among oxides of main component element in the alloy starting material; the flux contains calcium fluoride and at least one of calcium oxide and calcium chloride, with a proportion of a total weight of the calcium oxide and the calcium chloride with respect to a weight of the calcium fluoride ranging from 5 to 30 wt %; and a weight of the first oxide in the second refining agent ranges from 0.2 to 4 times a calculated weight that is calculated in order to oxidize totally at least carbon and calcium from among impurity elements present in the melt pool; and a proportion of a weight of the flux in the second refining agent with respect to a weight of the melt pool before addition of the second refining agent ranges from 0.5 to 5 wt %.

Yet another aspect of the present invention is a method for producing alloy ingot, comprising: a step of supplying starting material electrode into a cold hearth-type electron beam melter, and irradiating electron beam onto the starting material electrode under atmospheric pressure lower than $5 \times 10^{-4}$ mbar, and then forming melt pool in a cold hearth in the cold hearth-type electron beam melter; a step of adding third refining agent to the melt pool and then reducing the content of carbon as impurity element present in the melt pool; and a step of forming alloy ingot by solidifying the melt, the carbon content of which has been reduced, wherein the third refining agent is second oxide containing one, two or more types from among oxides of main component element in the starting material electrode; and a weight of the third refining agent is 1 to 4 times a calculated weight that is calculated in order to oxidize totally carbon from among the impurity elements present in the melt pool.

The objects, features, aspects and advantages of the present invention will become more apparent from the following detailed description and drawings.

DESCRIPTION OF EMBODIMENTS (First Embodiment)

Figure 1:
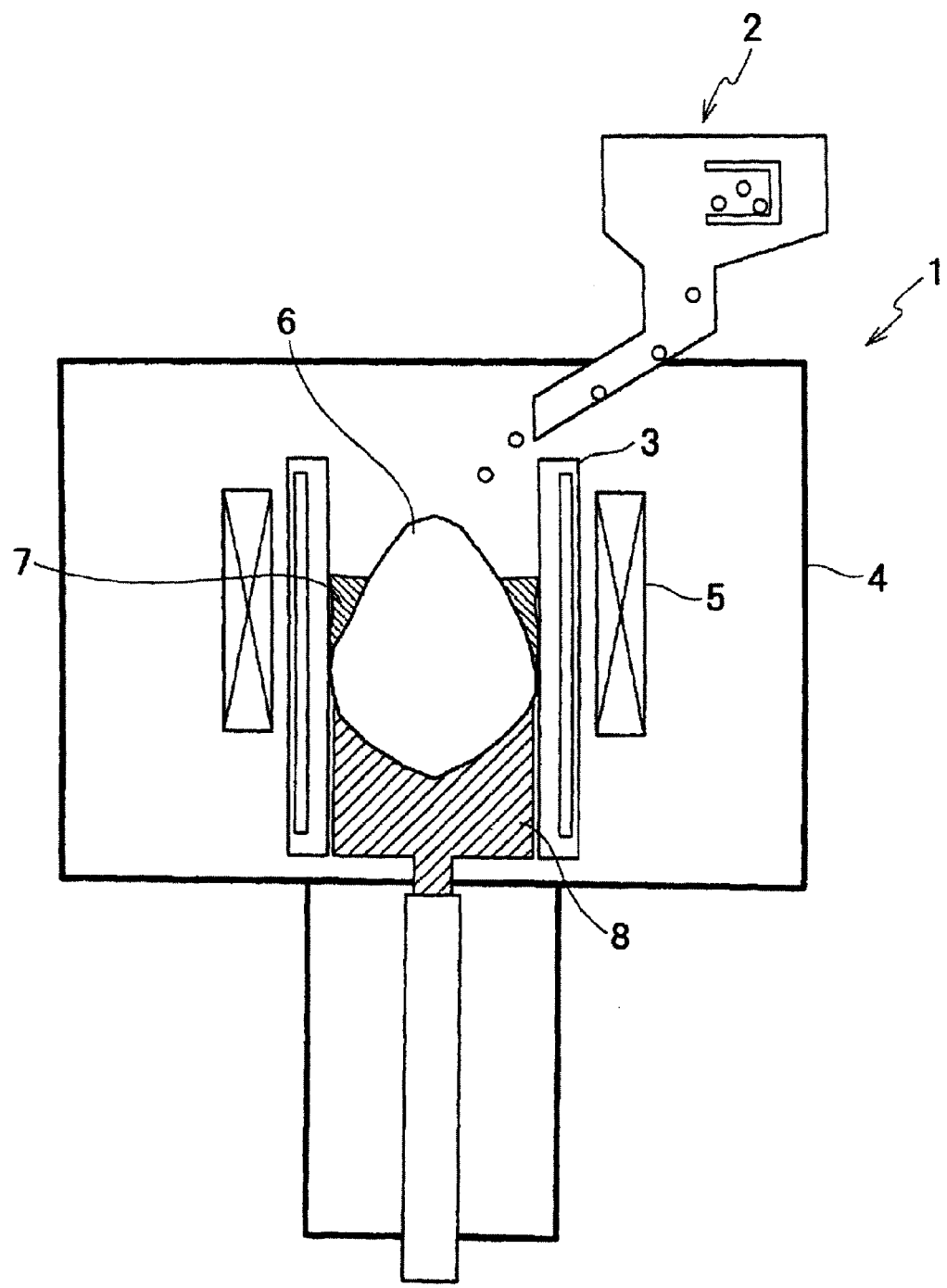
FIG. 1 is a schematic diagram illustrating a cold-crucible induction melter.

In order to assess whether the reduction refining techniques set forth in Patent Documents 1 to 3 applied also to 10 to 50 kg-level melt pool (also referred to as alloy melt pool) the inventors performed various tests that involved forming 20 kg melt pool of stainless steel (SUS310 composition), using a cold-crucible induction melter provided with a vacuum chamber and a water-cooled copper crucible having a inner diameter of ϕ220 mm, followed by addition of calcium fluoride and metallic calcium to the formed melt pool. Specifically, alloy starting materials in the form of a commercially available ferrochrome material, a low-carbon steel material, electrolytic nickel and the like were charged into the water-cooled copper crucible. Next, the atmosphere in the vacuum chamber was evacuated and was made into inert gas atmosphere through introduction of 600 to 800 hPa of Ar gas, in order to suppress oxidative loss of Ca. 20 kg melt pool of stainless steel (SUS310 composition) was formed. Thereafter, refining agent resulting from mixing 400 g of powdery calcium fluoride ($CaF_2$) and 100 g of particulate metallic calcium was added to the melt pool. The metallic calcium started evaporating intensely immediately after addition of the refining agent, and black smoke-like material (dust) was generated, such that, in the course of a few seconds, light emitted by the surface of the melt pool could no longer be observed.

In ordinary melting operations, the melt pool state is held while the fusion state of the melt pool surface is observed. In the above test, by contrast, the surface of the melt pool was unobservable immediately after addition of the refining agent. Therefore, the inventors performed an operation of solidifying the melt pool in the water-cooled copper crucible, by shutting off the high-frequency heating power source, 1 minute after addition of the refining agent. Specifically, the solidifying operation involved shutting off the above power source, and leaving the water-cooled copper crucible to stand overnight.

The vacuum chamber was opened the following day. Most of the black dust had settled by falling or adhering onto the floor and the walls of the vacuum chamber. A solidified stainless steel block, as well as solidified slag ($CaF_2$—Ca), was present in the water-cooled copper crucible. The diameter of the foregoing was smaller, on account of solidification shrinkage, than at the time where the power source was shut off, and hence could be removed from the water-cooled copper crucible. The solidified stainless steel block and the $CaF_2$—Ca slag were removed accordingly.

The damage condition of the water-cooled copper crucible was observed first. There were no traces of erosion by the $CaF_2$—Ca slag, and the water-cooled copper crucible itself was found to be intact. All the metallic calcium added as refining agent had fused, but part of the calcium fluoride had remained in the form of a powder and had become adhered to the top of the solidified slag ($CaF_2$—Ca). That is, the calcium fluoride failed to fuse completely.

Next, specimens for analysis were sampled out of the removed solidified ingot (solidified stainless steel block), and were analyzed and examined. The results indicated that [P], which was about 0.018 wt % in the melt pool stage, was now about 0.014 wt %. It was found thus that, though little, some phosphorus could be removed by refining. That is, it was found that removal refining was possible, in principle, also in melt pool of 10 kg or more, in a practical scale. However, it was likewise found that separate research on appropriate refining conditions was required in order to achieve a sufficient removal refining effect.

Therefore, the inventors conducted diligent research focusing on the composition of the refining agent added to the melt pool, and the proportion of refining agent with respect to the melt pool, with a view to remove sufficiently at least phosphorus (P), from among impurity elements, out of a practical-scale melt pool such that the weight of the finished ingot is 10 kg or more. As a result, the inventors found that it is possible to produce, in a practical scale, an alloy ingot having an extremely low content of at least phosphorus (P) from among impurity elements, by way of a production method that involves forming melt pool in a cold crucible that is provided in a cold-crucible induction melter, adding refining agent to the melt pool to remove impurity elements thereby, and solidifying the melt having impurity elements removed therefrom, to form an alloy ingot, such that, in the method:

(1) First refining agent is used, as refining agent, that is mixture of metallic calcium and flux containing calcium halide;

(2) As the flux there is used calcium halide-based flux containing calcium fluoride and at least one from among calcium oxide and calcium chloride, such that the proportion of the total weight of the calcium oxide and the calcium chloride with respect to the weight of the calcium fluoride ranges from 5 to 30 wt %;

(3) The proportion of the weight of the metallic calcium in the first refining agent with respect to the weight of the melt pool before addition of the first refining agent is set to 0.4 wt % or greater.

The inventors perfected the first embodiment of the present invention on the basis of the above finding.

An object of the first embodiment according to the present invention is to provide a method for producing, in a practical scale, an alloy ingot having an extremely low content of at least phosphorus (P) from among impurity elements.

The first embodiment of the present invention will be explained next with reference to accompanying drawings.

The first embodiment according to the present invention is a method for producing alloy ingot, the method comprising: a step of charging alloy starting material into a cold crucible in a cold-crucible induction melter, and forming melt pool of the alloy starting material by induction heating in inert gas atmosphere; a step of continuing the induction heating and adding first refining agent to the melt pool, and then reducing the content of at least phosphorus from among impurity elements present in the melt pool; and a step of forming alloy ingot by solidifying the melt, the phosphorus content of which has been reduced.

(Cold-Crucible Induction Melter)

FIG. 1 is a schematic diagram illustrating a cold-crucible induction melter. As the cold-crucible induction melter in the method for producing alloy ingots of the present embodiment there can be used, for instance, a cold-crucible induction melter 1 illustrated schematically in FIG. 1. The cold-crucible induction melter 1, which is an instance of melting equipment belonging to magnetic levitation-type cold crucible induction melting (CCIM), comprises a starting material feeder 2, a vacuum chamber 4, a cold crucible 3 provided in the vacuum chamber 4, and a coil 5 disposed so as to be wound around the outer periphery of the side face of the cold crucible 3 in the vacuum chamber 4.

The starting material feeder 2 allows feeding alloy starting materials of various forms into the cold crucible 3. The coil 5 is provided so as to wind spirally around the side face of the cold crucible 3, leaving free the upper and lower ends thereof, and so as to be slightly spaced apart from the surface of the cold crucible 3. The coil 5 melts, through induction heating, the alloy starting material in the region (induction heating region) of the cold crucible 3 around which the coil 5 is wound, to form thereby melt pool 6. A solidified scull layer 8 is formed, through cooling of the melt pool 6, at a non-induction heating region that is positioned below the induction heating region of the cold crucible 3. The starting material feeder 2 allows supplying a refining agent, for removal refinement of impurity elements, into the melt pool 6.

The atmosphere in the vacuum chamber 4 is controlled. In order to prevent evaporative loss of alloy components from the alloy being prepared, the atmosphere can be kept as inert gas atmosphere resulting from introducing argon (Ar) gas or helium (He) gas into the vacuum chamber 4. To form the inert gas atmosphere, preferably, the vacuum chamber 4 is evacuated using a vacuum pump, and thereafter inert gas such as Ar gas or the like is introduced into the vacuum chamber 4. That is because fused metallic calcium, used as the refining agent, is extremely active, so that presence of oxygen gas or the like in the vacuum chamber 4 causes Ca to be depleted, through oxidation, before the refining reaction. Leaks from the vacuum chamber 4 are preferably reduced to the utmost in reduction refining using metallic calcium. The atmosphere in the vacuum chamber 4 can be kept at vacuum atmosphere through continued evacuation of gas from inside the vacuum chamber 4.

The cold crucible 3 need only be a crucible such that the melt pool 6 does not react with the molten slag layer 7 that is formed around the melt pool 6. Examples of the cold crucible 3 include, for instance, metallic crucibles the surface whereof is cooled by a coolant, for instance water-cooled copper crucibles. An ordinary refractory crucible, however, cannot be used instead of the cold crucible 3. That is because, in the present embodiment, it is necessary to use flux comprising calcium halide such as calcium fluoride ($CaF_2$) or the like, as the flux during refining. If an ordinary refractory crucible is used, the refractory crucible is severely damaged by the fused mass of calcium halide, for instance fused calcium fluoride, and a risk of accident arises as a result, for instance steam explosion or erosion of the water-cooled copper coil for heating in the induction melter.

To allow for some hot working in the production of articles in a practical scale, the alloy ingots must weigh at least about 10 kg. To form the melt pool 6 of 10 kg or more, therefore, the inner diameter D of the cold crucible 3 is preferably a diameter of 0.2 m or greater. That is because the weight of the melt pool 6 that can be formed is smaller, and it may be not possible to form stably melt pool of 10 kg or more, if the inner diameter of the cold crucible 3 is not more than 0.2 m.

In the present embodiment, firstly, alloy starting material is charged, by way of the starting material feeder 2, into the cold crucible 3 of the cold-crucible induction melter 1. In inert gas atmosphere, the alloy starting material is melted through induction heating by the coil 5, to form thereby the melt pool 6 for adjusting the components to a predetermined alloy composition (melt pool formation step). Next, first refining agent is added to the melt pool 6 under continued induction heating by the coil 5 (i.e. in a state where the melt pool 6 is held), to remove thereby at least phosphorus from among the impurity elements in the melt pool 6 (refining step). The melt after refining (having phosphorus removed therefrom) is left to solidify to form alloy ingot (ingot formation step). The alloy ingot is prepared thus in the present embodiment as a result of these steps.

In the ingot formation step of the present embodiment, induction heating may be discontinued, for instance, after a slag-off process, and the melt in the cold crucible 3 may be solidified, to form thereby the alloy ingot. As the cold crucible 3 there may be used a bottom plate lift type cold crucible in which a bottom plate can move up and down, such that alloy ingot may be formed through gradual solidification of the melt from the bottom, through lowering of the bottom plate together with the melt pool, down to the non-induction heating region, while the melt pool is held in the induction heating region of the cold crucible; alternatively, the melt after refining may be injected from the cold crucible 3 into a mold, and caused to be solidified therein, to form thereby alloy ingot.

In the present embodiment, granular, plate-like or disc-like metals, alloys and the like may be used as alloy starting materials. The shape, purity and composition of the alloy starting materials may be selected in accordance with the target composition of the alloy ingot. In a case where, for instance, high-nickel high-chromium stainless steel is to be prepared, there can be used ferrochrome material, low-carbon steel material (converter material) and electrolytic nickel. In order to further increase the purity of the alloy ingot (to further reduce the content of impurity elements), the alloy ingot obtained in the present embodiment may also be used as the alloy starting material.

The present embodiment allows producing alloy ingots of various component compositions. For instance, there can be produced alloy material having Fe as main component (Fe-based alloy ingot), alloy material having Ni as main component (Ni-based alloy ingot), alloy material having Fe and Ni as main components (Fe—Ni-based alloy ingot), or alloy material having Co as main component (Co-based alloy ingot). The method for producing alloy ingots of the present embodiment is particularly suitable for the production of Fe-based alloy ingot, Ni-based alloy ingot and Fe—Ni-based alloy ingot.

(Reduction Refining Using a Cold-Crucible Induction Melter)

In the present embodiment, the melt pool 6 is formed in the cold crucible 3 of the cold-crucible induction melter 1. Thereafter, refining through elimination of impurity elements such as phosphorus (P), sulfur (S), nitrogen (N), tin (Sn), lead (Pb) and boron (B) is performed through addition of a refining agent that satisfies conditions (1) to (3) below, for a weight M (g) of the melt pool 6. The solidified scull layer 8 is formed below the melt pool 6. FIG. 1 depicts schematically the state of the refining in the present embodiment.

The refining conditions in the present embodiment were elucidated as a result of multiple tests and studies using the cold-crucible induction melter 1 having a water-cooled copper crucible (cold crucible 3) the inner diameter whereof was φ220 mm (1) As refining agent, first refining agent is used that is mixture of metallic calcium and flux containing calcium halide.

In reduction refining using metallic calcium (also referred to as Ca reduction refining), it is necessary to reliably supply metallic calcium to the melt pool 6. The boiling point of simple metallic calcium is 1484° C. The temperature of the melt pool formed by CCIM is about 1520° C. for Fe-based alloy, and about 1450° C. for Ni-based alloy. In the production of Fe-based alloy, Ni-based alloy or Fe—Ni-based alloy, adding metallic calcium as simple substance to the melt pool 6 results in vaporization of most of the metallic calcium, so that there remains virtually no metallic calcium for the refining reaction. As is known, metallic calcium melts into fused calcium halide (hereafter, Ca halide) such as fused calcium fluoride ($CaF_2$) or the like. The melting point of calcium fluoride is about 1410° C., which is lower than the temperature of the melt pool 6. Therefore, the molten slag layer 7 can be caused to be formed, through thermal conductivity from the melt pool 6, by adding calcium halide such as calcium fluoride into the melt pool 6. Therefore, metallic calcium can coexist in the melt pool 6 by using, as the refining agent, the first refining agent that is mixture of metallic calcium and flux containing calcium halide.

(2) The flux contains calcium fluoride and at least one from among calcium oxide and calcium chloride, such that the proportion of the total weight of calcium oxide and calcium chloride with respect to the weight of calcium fluoride (i.e. total weight of calcium oxide plus calcium chloride/weight of calcium fluoride) ranges from 5 to 30 wt %.

In Patent Documents 1 to 3 and Non-patent Documents 1 and 2, calcium fluoride ($CaF_2$) alone is used as the flux in the refining agent. However, the temperature of the formed melt pool is lower in the preparation of Ni-based alloy or stainless steel having substantial Ni content, by CCIM, than in the preparation of Fe-based alloy. Therefore, using calcium fluoride ($CaF_2$) alone as the flux resulted often in termination of the refining reaction in a state where the calcium fluoride remained in powdery form without having fused. As a result, it was difficult to hold effectively metallic calcium in the flux bath (i.e. securing the presence of metallic calcium, not bonded to other elements, in the fused flux), and a refining effect through impurity removal was less likely to be brought about. As a result of multiple tests, the inventors found that flux can be caused to melt easily in the melt pool through the use of flux in the form of mixture (referred to also as calcium halide composition flux or Ca halide composition flux) containing calcium fluoride ($CaF_2$) as main component and compound that lowers the melting point of the flux itself. The above compound is at least one from among calcium oxide (CaO) and calcium chloride ($CaCl_2$). That is because calcium oxide and calcium chloride are compounds that lower the melting point of flux having calcium fluoride as main component, while exerting little influence on the refining reaction.

The flux (i.e. calcium halide-based flux) in the first refining agent is mixture having calcium fluoride as main component, and comprising at least one from among calcium oxide and calcium chloride, such that the proportion of the total weight of "calcium oxide and calcium chloride" with respect to the weight of calcium fluoride ranges from 5 to 30 wt %. Blending a small amount of CaO and/or $CaCl_2$ with $CaF_2$ has the effect of lowering the melting point of the flux and eliciting easy formation of the molten slag layer 7 through heat transfer from the melt pool 6. If the proportion of the weight of calcium oxide with respect to the weight of calcium fluoride exceeds 30 wt %, however, the flux does not melt readily, and the fluidity of the slag bath decreases. This can be attributed to residual CaO, among other factors. Therefore, the upper limit for the proportion of the weight of calcium oxide with respect to the weight of calcium fluoride is set to 30 wt %. Calcium chloride elicits a significant effect of lowering the melting point of the flux, and is effective in the preparation of high-nickel alloy ingots having a low melting point. However, the evaporative loss of calcium chloride is severe, and the refining operation became unstable when using a flux wherein the proportion of the weight of calcium chloride with respect to the weight of calcium fluoride exceeded 30 wt %. Accordingly, the upper limit for the proportion of the weight of calcium chloride with respect to the weight of calcium fluoride is set to 30 wt %. Such being the case, the upper limit of the proportion of the total weight of calcium oxide and calcium chloride with respect to the weight of calcium fluoride is likewise set to 30 wt %.

If the proportion of the total weight of "calcium oxide and calcium chloride" with respect to the weight of calcium fluoride was smaller than 5 wt %, the melting point of the flux dropped only slightly in some instances, and calcium fluoride failed to fuse by the time the refining reaction was over, in a case where the flux comprised calcium fluoride and calcium oxide, in a case where the flux comprised calcium fluoride and calcium chloride, and also in a case where the flux comprised calcium fluoride, calcium oxide and calcium chloride. Therefore, the lower limit of the proportion of the total weight of "calcium oxide and calcium chloride" with respect to the weight of calcium fluoride is set to 5 wt %.

The flux in the first refining agent may contain other compounds (for instance, a calcium halide other than calcium fluoride) in an amount such that the compound exerts no influence in raising the melting point of the flux and such that the compound has little influence on the refining reaction.

Examples of the flux in the first refining agent include, for instance, $CaF_2$—CaO (5 to 30 wt %), $CaF_2$—$CaCl_2$ (5 to 30 wt %), $CaF_2$—(CaO+$CaCl_2$) (5 to 30 wt %). Herein, $CaF_2$—CaO (5 to 30 wt %) is a flux resulting from blending 5 to 30 wt % of calcium oxide in calcium fluoride (proportion of the blend weight W(CaO) of calcium oxide with respect to the blend weight W($CaF_2$) of calcium fluoride, namely W(CaO)/W($CaF_2$)). Further, $CaF_2$—$CaCl_2$ (5 to 30 wt %) is a flux resulting from blending 5 to 30 wt % of calcium chloride in calcium fluoride (proportion of the blend weight W($CaCl_2$) of calcium chloride with respect to the blend weight W($CaF_2$) of calcium fluoride, namely W($CaCl_2$)/W($CaF_2$)). Further, $CaF_2$—(CaO+$CaCl_2$)(5 to 30 wt %) is a flux resulting from blending a total of 5 to 30 wt % of calcium oxide and calcium chloride in calcium fluoride (proportion of the total of the blend weight W(CaO) of calcium oxide and the blend weight W($CaCl_2$) of calcium chloride with respect to the blend weight W($CaF_2$) of calcium fluoride, i.e. (W(CaO)+W($CaCl_2$))/W($CaF_2$)).

To prepare Fe—Ni-based alloy having low Ni content it was effective to use $CaF_2$—CaO (20 wt %) having a comparatively high melting point (hereafter also referred to as "$CaF_2$-20CaO") as the flux in the first refining agent.

(3) The proportion of the weight of metallic calcium in the first refining agent with respect to the weight of the melt pool before addition of the first refining agent is 0.4 wt % or greater.

The inventors found that the dephosphorization ratio in one refining operation could be significantly enhanced when the proportion $\{Ca\}M$ (wt %) of the weight WCa (kg) of metallic calcium in the first refining agent with respect to the weight M (kg) of the melt pool 6 before addition of the first refining agent is 0.4 wt % or greater, i.e. when $0.4 \leq \{Ca\}M$ is satisfied.

Herein, $\{Ca\}M$ is defined according to the expression below.

$$\{Ca\}M = WCa/M \times 100$$

In the expression, WCa denotes the weight (kg) of metallic calcium in the first refining agent, and M denotes the weight (kg) of the melt pool 6 before addition of the first refining agent.

A below-described proportion $\{Flx\}M$ (wt %) of the weight WFlx (kg) of the flux in the first refining agent with respect to the weight M (kg) of the melt pool 6 before addition of the first refining agent is defined according to the expression below.

$$\{Flx\}M = WFlx/M \times 100$$

In the expression, WFlx denotes the weight (kg) of flux in the first refining agent, and M denotes the weight (kg) of the melt pool 6 before addition of the first refining agent.

In the present description, the proportion of the weight $\{Ca\}M$ of metallic calcium in the first refining agent with respect to the weight of the melt pool before addition of the first refining agent is also referred to as "addition ratio of metallic calcium with respect to the melt pool", "metallic calcium addition ratio" or "metallic Ca addition ratio". The proportion of the weight $\{Flx\}M$ of the flux in the first refining agent with respect to the weight of the melt pool before addition of the first refining agent is also referred to as "addition ratio of flux with respect to the melt pool" or "flux addition ratio".

In ordinary manipulations, the amount of metallic calcium and the amount of flux during refining are adjusted based on the concentration of metallic calcium in the refining agent (sum total of metallic calcium plus flux) and the concentration of the flux in the refining agent. However, a desired metallic calcium amount and/or flux amount can be readily grasped, directly, if the adjustment is performed based on the proportion of the weight WCa (kg) of metallic calcium with respect to the weight M (kg) of the melt pool 6 and the proportion of the weight WFlx (kg) of the flux with respect to the weight M (kg) of the melt pool 6. The notation used in the present description, therefore, is the weight proportion of metallic calcium with respect to the melt pool and the weight proportion of flux with respect to the melt pool, as in the definition of $\{Ca\}M$ and $\{Flx\}M$. The weight M of the melt pool 6 was set to be equal to the weight of the alloy starting material before charging into the water-cooled copper crucible (cold crucible 3).

A detailed explanation follows next on the suitable amount $(0.4 \leq \{Ca\}M)$ of metallic calcium addition ratio.

Metallic calcium started evaporating immediately, giving rise to black smoke, upon addition of the mixture (i.e. the first refining agent) of metallic calcium and calcium halide-based flux to the melt pool 6. The added metallic calcium was largely lost, through evaporative loss of the metallic calcium, when the metallic calcium addition ratio was small $(\{Ca\}M<0.1)$. Therefore, virtually no removal refining effect was achieved. When the metallic calcium addition ratio was large $(0.4 \leq \{Ca\}M)$, by contrast, black smoke generated several seconds to several tens of seconds after addition rose in the vacuum chamber 4, such that the black smoke blocked of the light emitted by the surface of the melt pool 6, and it became difficult to observe the state of the surface of the melt pool 6.

In an initial stage of studies on a suitable amount of metallic calcium addition ratio, tests were conducted under conditions wherein the metallic calcium addition ratio was small, in view of the concern that the surface state of the melt pool 6 becomes unobservable after addition of the first refining agent. For instance, a test was performed wherein 20 kg melt pool (Fe-20Ni-25Cr) was formed in a water-cooled copper crucible (cold crucible 3) having a diameter φ220 mm, and 30 g of metallic calcium and 270 g of $CaF_2$—CaO (25 wt %) were added, as first refining agent, to the melt pool $(\{Ca\}M=0.15\%, \{Flx\}M=1.35\%)$. Under such conditions, the view was poor on account of Ca evaporation dust, but the surface of the melt pool 6 could be more or less observed.

Under such conditions, however, the dephosphorization ratio was about 15 to 30%. The refining effect through removal of impurities such as phosphorus (P) and the like was wholly unsatisfactory. The dephosphorization ratio (hereafter also referred to as de-[P] ratio) ηp (%) and denitrification ratio (hereafter also referred to as de-[N] ratio) ηN (%) are defined in accordance with the expressions below.

$$\eta p = ([P]0-[P])/[P]0 \times 100$$

In the expression, [P]0 denotes the phosphorus concentration (wt %) in the melt before refining, and [P] denotes the phosphorus concentration (wt %) in the melt after refining.

$$\eta N = ([N]0-[N])/[N]0 \times 100$$

In the expression, [N]0 denotes the nitrogen concentration (wt %) in the melt before refining, and [N] denotes the nitrogen concentration (wt %) in the melt after refining.

It was found that no damage occurred in the water-cooled copper crucible (cold crucible 3) as a result of multiple refining tests under a condition of small metallic calcium addition ratio $\{Ca\}M$, even upon multiple refining tests that involved adding metallic calcium and calcium halide-based flux (i.e. adding the first refining agent). It was found that refining could be continued even if the melt pool 6 was not directly observable visually. Accordingly, various refining tests under a condition of large metallic calcium addition ratio $\{Ca\}M$ and flux addition ratio $\{Flx\}M$ were performed next.

In a refining operation under a condition of large metallic calcium addition ratio $(0.4 \leq \{Ca\}M)$, black smoke generated several seconds to several tens of seconds after addition of the metallic calcium rose in the vacuum chamber 4. The light emitted from the surface of the melt pool 6 became blocked off, and it was impossible to visually observe the state of the surface of the melt pool 6. However, it was found that adding the metallic calcium in an amount such that not even light emitted from the melt pool 6 was observable resulted in a enhanced dephosphorization refining effect was enhanced.

Figure 2:
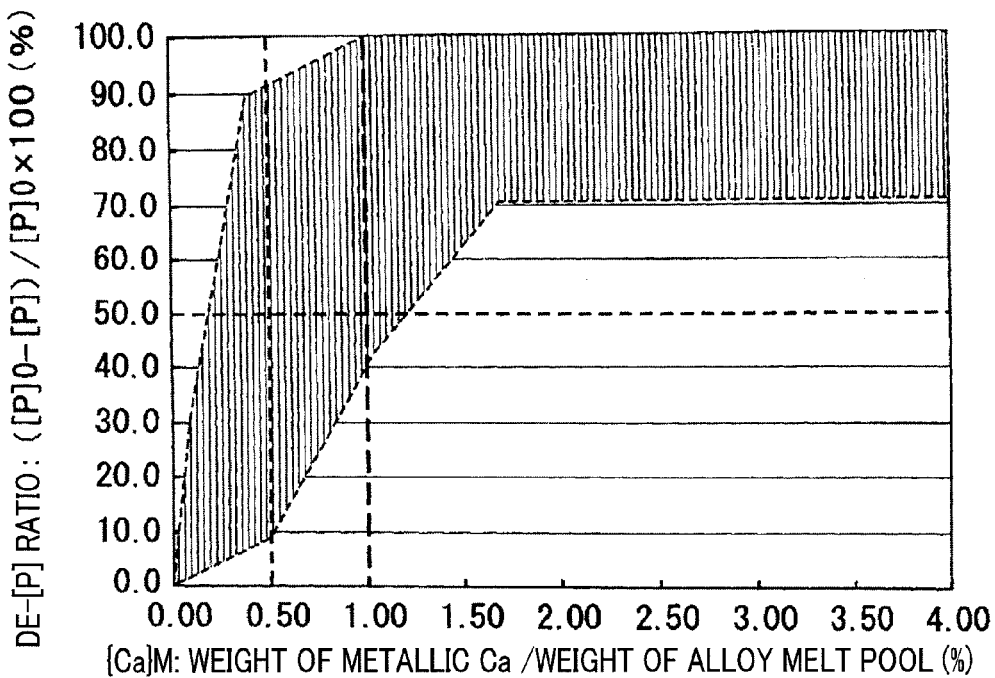
FIG. 2 is a set of graphs illustrating a relationship between metallic calcium addition ratio and dephosphorization ratio, and a relationship between metallic calcium addition ratio and denitrification ratio.
Figure 2:
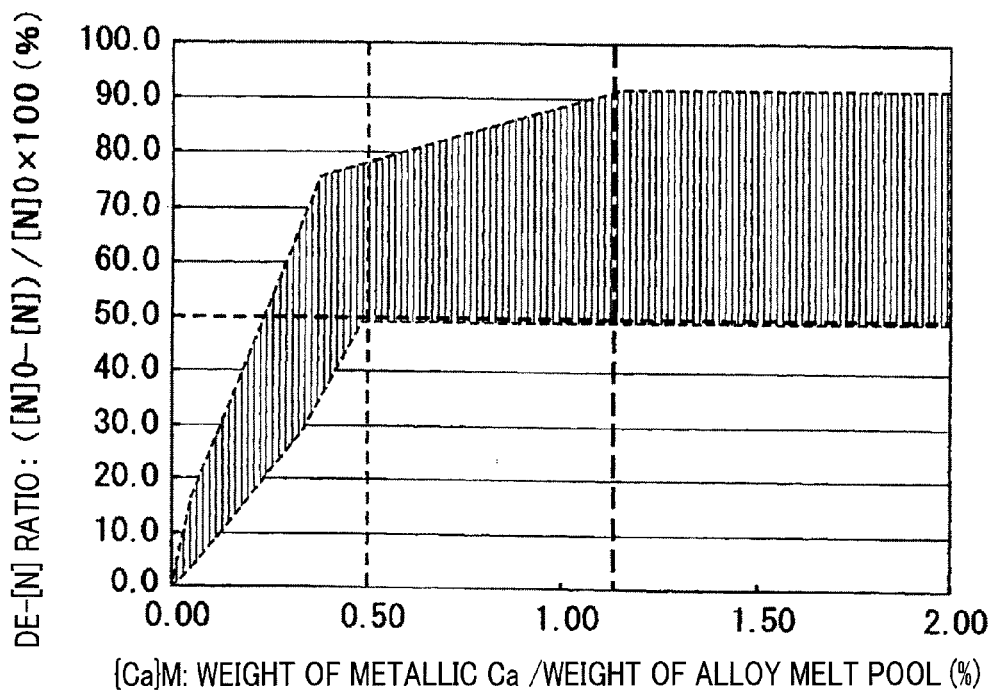

Multiple refining tests were performed under conditions wherein the metallic calcium addition ratio $\{Ca\}M$ and the flux addition ratio $\{Flx\}M$ were modified in various ways, within a range of weight M of the melt pool 6 from 20 kg to 50 kg. The test results revealed a correlation relationship between the dephosphorization ratio ηP and the metallic calcium addition ratio $\{Ca\}M$, and a correlation relationship between the denitrification ratio ηN and the metallic calcium addition ratio $\{Ca\}M$. The relationship between metallic calcium addition ratio $\{Ca\}M$ and dephosphorization ratio (de-[P] ratio) is depicted in the graph of FIG. 2($a$). The relationship between the metallic calcium addition ratio $\{Ca\}M$ and the denitrification ratio (de-[N] ratio) is depicted in the graph of FIG. 2($b$).

FIG. 2($a$) shows that the dephosphorization ratio ηP increases with increasing addition ratio $\{Ca\}M$ of metallic calcium with respect to the melt pool. Focusing on the upper limit value of the dephosphorization ratio, more specifically, the latter rises abruptly in a range of $\{Ca\}M$ from 0 to about 0.4, to become about 90% when $\{Ca\}M$ is about 0.4. Thereafter, the upper limit value of the dephosphorization ratio rises gently for $\{Ca\}M$ up to about 1.0, and reaches a maximum value of 100% for $\{Ca\}M$ of about 1.0 or greater. Focusing on the lower limit of the dephosphorization ratio, the latter rises gently in a $\{Ca\}M$ range from 0 to about 0.5, to become about 9% for a $\{Ca\}M$ of about 0.5. Thereafter, the lower limit value of the dephosphorization ratio rises sharply until $\{Ca\}M$ is about 1.0, to a value of about 41% for a $\{Ca\}M$ of about 1.0. The lower limit of the dephosphorization ratio rises somewhat more gently then for a $\{Ca\}M$ range from about 1.0 to about 1.7, and reaches a maximum value of about 71% for $\{Ca\}M$ of about 1.7 or greater. Such variation in the dephosphorization ratio (change in $\eta P/\{Ca\}M$) reveals that the dephosphorization reaction proceeds abruptly when $\{Ca\}M$ is 0.5 or greater. Therefore, the metallic calcium addition ratio $\{Ca\}M$ is set to 0.4 or greater. Preferably, the metallic calcium addition ratio $\{Ca\}M$ is 0.5 or greater, more preferably 1.0 or greater. A high dephosphorization effect in one refining operation can be achieved as a result.

A plurality of refining operations (Ca reduction refining) may be repeated in a case where an ultrahigh-purity alloy (for instance [P]<2 ppm) having low impurity element content is prepared using inexpensive starting material (for instance, ferrochrome material having [P]0=200 to 300 ppm) having a substantial impurity element content. That is, alloy ingot obtained (primary ingot) in the first preparation is used as the alloy starting material during the second preparation, and thereafter, the n-th primary ingot is used as alloy starting material in the n-th preparation (n is a natural number equal to or greater than 3).

FIG. 2(b) shows that the denitrification ratio (IN increases with increasing addition ratio $\{Ca\}M$ of metallic calcium with respect to the melt pool. Focusing on the upper limit value of the denitrification ratio, more specifically, the latter rises abruptly in a range of $\{Ca\}M$ from 0 to about 0.4, becoming about 76% when $\{Ca\}M$ is about 0.4. Thereafter, the upper limit value of the denitrification ratio rises gently for $\{Ca\}M$ up to about 1.1, and reaches a maximum value of about 92% for $\{Ca\}M$ of about 1.1 or greater. Focusing on the lower limit value of the denitrification ratio, the latter rises monotonically in a range of $\{Ca\}M$ from 0 to about 0.35, reaching about 30% for a $\{Ca\}M$ of about 0.35, and thereafter rises sharply until $\{Ca\}M$ is of about 0.5, and takes on a value of about 50% for a $\{Ca\}M$ of about 0.5 or greater. Such variation in the denitrification ratio (change in $\eta N/\{Ca\}M$) reveals that the denitrification reaction proceeds abruptly when $\{Ca\}M$ is 0.35 or greater. For purposes of denitrification, therefore, the metallic calcium addition ratio $\{Ca\}M$ is set to be 0.35 or greater, preferably to 0.5 or greater and more preferably to 1.1 or greater.

The denitrification ratio exhibits a slightly lower trend compared to the dephosphorization ratio. This can be attributed to the occurrence of nitrogen contamination, in that nitrogen gas in air flows readily into the vacuum chamber 4 as a result of slight atmosphere leaks during the refining operation.

As regards the metallic calcium addition ratio, it is deemed that, in principle, a greater $\{Ca\}M$ entails a greater effect in terms of reliable impurity removal. In an actual refining operation, however, a $\{Ca\}M$ greater than 1.5, while enabling the Ca reduction refining operation itself, nevertheless resulted in adhesion of $\{Ca\}M$ to the ingot after the refining operation, and in an increased amount of absorbed metallic calcium. As a result, the problem of, for instance, ignition of evaporated Ca dust became likelier during post-processing, for instance, upon removal of the ingots. In the m-th melting refining step in which the (m−1)-th ingot (m is a natural number equal to or greater than 2) is the alloy starting material, there occurred significant operational hindrances due to, for instance, generation of dust through evaporation of calcium melted in the ingot. In the light of the above problems, there holds preferably $\{Ca\}M\leq 1.5$ in terms of carrying out a stable refining operation.

In the present embodiment, the following condition (4) is preferably satisfied as well, in terms of further enhancing the dephosphorization effect. The inventors arrived at that finding as a result of the abovementioned multiple refining tests.

(4) The proportion of the weight of the flux in the first refining agent with respect to the weight of the melt pool before addition of the first refining agent (addition ratio $\{Flx\}M$ of the flux with respect to the melt pool) is equal to or greater than the proportion of the weight of metallic calcium in the first refining agent with respect to the weight of the melt pool (addition ratio $\{Ca\}M$ of the metallic calcium with respect to the melt pool), i.e. the expression below is satisfied.

$$\{Ca\}M \leq \{Flx\}M$$

The ostensible reason is that the phosphorus capturing ability of metallic calcium is further enhanced, with substantially no evaporative loss of the added metallic calcium, when the above condition (4) is satisfied.

In order for metallic calcium to be stably melted in the flux (i.e. in order to secure the presence of metallic calcium, within the fused flux, without being bonded to other elements), more preferably, $\{Flx\}M$ is 1.5 times or more greater than $\{Ca\}M$, i.e. $\{Ca\}M \times 1.5 \leq \{Flx\}M$ is satisfied.

Preferably, the flux alone is added to the melt pool beforehand, prior to addition of the first refining agent (mixture of metallic calcium and the flux (calcium halide-based flux)). A fused calcium halide-based slag layer forms as a result before addition of the first refining agent, which allows suppressing evaporative loss of the added metallic calcium. It was effective to set the amount of flux added beforehand (also referred to as pre-added flux) that satisfied $\{Ca\}M \leq \{Flx\}M0$. Herein, $\{Flx\}M0$ denotes the proportion (wt %) of the weight WFlx0 (kg) of the pre-added flux with respect to the weight M (kg) of the melt pool 6 before addition of the first refining agent. Also, $\{Flx\}M0$ is referred to as the pre-addition ratio or addition ratio of pre-added flux with respect to the weight M (kg) of the melt pool 6.

In Ca reduction refining (metallic calcium—Ca halide reduction refining) in the present embodiment, the molten slag layer 7 must be formed as a result of heat transfer from the melt pool 6. The molten slag layer 7 was difficult to form if the total amount of $\{Ca\}M$, $\{Flx\}M$ plus $\{Flx\}M0$ was excessively large. The results of multiple tests show that, preferably, the total amount of $\{Ca\}M$, $\{Flx\}M$ plus $\{Flx\}M0$ is within 5% of the weight M of the melt pool 6.

Herein, S was easily removed through reduction refining in the present embodiment, among impurity elements other than P and N. The removal effect substantially equal to that for P and N was obtained for trace and tramp elements such as Sn, Pb, Sb and the like. The deboration rate for B at $\{Ca\}M=1.0$ was about 20%, and hence refining by separation and removal of B was possible.

Thus, a high dephosphorization ratio can be secured by setting the addition ratio $\{Ca\}M$ of metallic calcium with respect to the melt pool 6 to be 0.4 wt % or greater, i.e. by satisfying conditions (1) to (3) above. However, the removal refining effect varies depending on the hold time of the melt pool 6 after addition of the refining agent to the melt pool 6. This is one of the reasons why the upper limit value and lower limit value of the dephosphorization ratio, as well as the upper limit value and lower limit value of the denitrification ratio, take on divergent values for one same metallic calcium addition ratio, as illustrated in FIG. 2(a) and FIG. 2(b). Refining must be carried out at an appropriate hold time in the melt pool 6 in order to achieve a higher removal refining effect.

Accordingly, the inventors performed the below-described tests.

Stainless steel material (Fe-20Ni-25Cr, Fe-35Ni-25Cr) or the like were charged in a water-cooled copper crucible 3, in a cold-crucible induction melter 1 having a water-cooled copper crucible (cold crucible 3) of inner diameter of φ220 mm, and melt pools 6 of weight M (20 kg, 40 kg, 50 kg) were formed by induction heating. Thereafter, fluxes (80 wt % $CaF_2$-20 wt % CaO, 80 wt % $CaF_2$-10 wt % $CaCl_2$-10 wt % CaO or the like) were added under a condition of $\{Flx\}M0=1.5\%$, to form thereby beforehand molten slag layers 7 prior to refining. Thereafter, first refining agent (mixture of metallic calcium and flux) was added, under conditions $\{Ca\}M=1.0\%$ and $\{Flx\}M=1.5\%$, and induction heatings were continued for a given lapse of time, to hold the melt pools 6 and the molten slag layers 7 (2 minutes to 60 minutes). The high-frequency heating power source was cut off immediately thereafter (i.e. induction heating was discontinued), and the melt pools 6 were solidified through quenching in the water-cooled copper crucible 3. Thereafter, the content of impurity elements such as phosphorus (P), nitrogen (N) and the like in the quenched and solidified ingot were analyzed.

Figure 3:
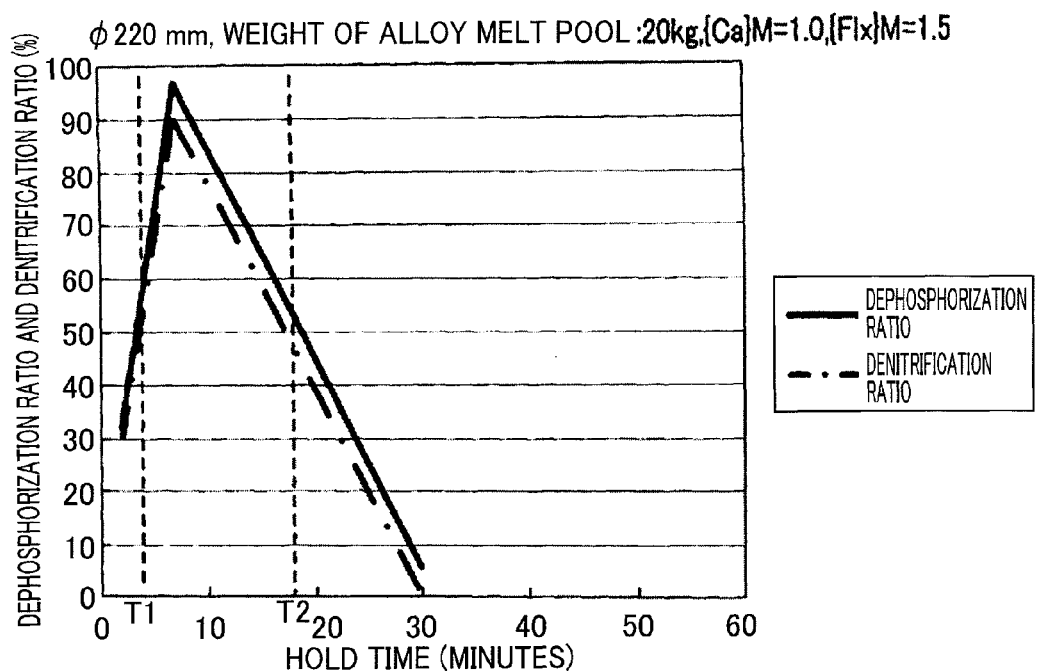
FIG. 3 is a set of graphs illustrating schematically the change of dephosphorization ratio and denitrification ratio with hold time in a melt pool.
Figure 3:
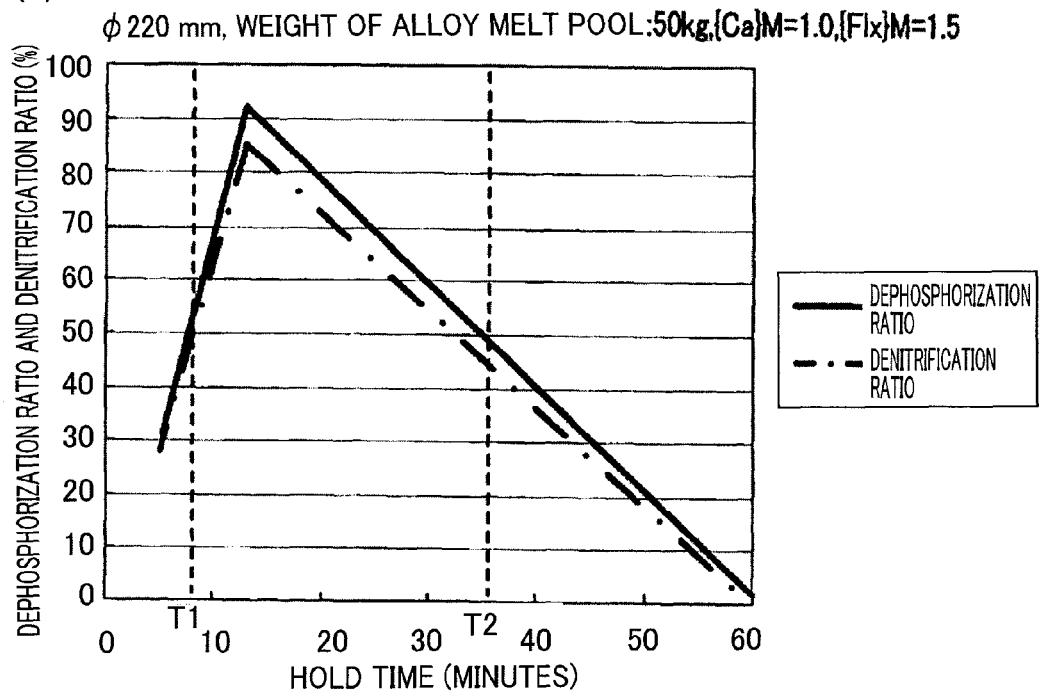

FIG. 3 illustrates the results of the tests performed above. FIG. 3(a) is a graph illustrating schematically the change of dephosphorization ratio with hold time in the melt pool 6. FIG. 3(b) is a graph illustrating schematically the change of denitrification ratio with hold time in the melt pool 6.

The test conditions for the test results schematically illustrated in FIG. 3(a) are as follows. The weight of the melt pool 6 was set to 20 kg. The weight of flux (pre-added flux) added beforehand prior to refining was set to 300 g ({Flx}M0=1.5). The weight of metallic calcium added as a first refining agent was set to 200 g ({Ca}M=1.0) and the weight of flux was set to 300 g ({Flx}M=1.5).

The test conditions for the test results schematically illustrated in FIG. 3(b) are as follows. The weight of the melt pool 6 was 50 kg. The weight of pre-added flux was set to 750 g ({Flx}M0=1.5). The weight of metallic calcium added as first refining agent was set to 500 g ({Ca}M=1.0) and the weight of flux was set to 750 g ({Flx}M=1.5).

As FIGS. 3(a) and 3(b) illustrate, both the dephosphorization ratio and the denitrification ratio exhibit lower values immediately after addition of the first refining agent (mixture of metallic calcium and a flux). Thereafter, both the dephosphorization ratio and the denitrification ratio increase, and reach maximum values at a hold time of 4 to 7 minutes, in the case of 20 kg melt pool 6 (FIG. 3(a)), and at hold time of 10 to 17 minutes in the case of 50 kg melt pool 6 (FIG. 3(b)). However, it was found that both the dephosphorization ratio and the denitrification ratio tended to decrease upon further continued holding of the state of the melt (molten state) over long periods of time. The same trend was observed for a melt pool 6 having a weight of 40 kg. The dephosphorization ratio and the denitrification ratio became maximal at time from 8 to 11 minutes in a case of 40 kg melt pool 6. Herein, 600 g of flux (pre-added flux) was added beforehand, prior to refining, to the 40 kg melt pool 6, as a condition for satisfying {Flx}M0=1.5. Thereafter, 400 g of metallic calcium and 600 g of flux were added, as a condition whereby the first refining agent satisfies {Ca}M=1.0 and {Flx}M=1.5.

The test results showed that the time elapsed until the maximum refining effect was achieved tended to be shorter for cases where the amount of added refining agent was small (i.e. cases where the weight of the melt pool 6 was small).

FIG. 3 shows that a high dephosphorization ratio and a high denitrification ratio are achieved when the hold time of the melt pool 6 after addition of the first refining agent (mixture of metallic calcium and flux) lies within an appropriate time range. Therefore, a refining technique may involve controlling the abovementioned melt hold time so as to lie within an a appropriate time range, in accordance with conditions such as the inner diameter D of the water-cooled copper crucible 3, the weight M of the melt pool 6 and the addition amount of the first refining agent (weight of metallic calcium plus weight of flux).

On the basis of the above test results, to the effect that the hold time of the melt pool 6 at which the dephosphorization ratio becomes maximal varies when the amount of melt pool 6 varies, and the amount of first refining agent (amount of metallic calcium plus amount of flux) that is added varies accordingly, it is estimated that, in the refining step of the present embodiment, the dephosphorization reaction and the denitrification reaction progress in accordance with the following refining reaction mechanism below.

The metallic calcium and flux in the first refining agent that is added to the melt pool 6 start melting on account of heat transfer from the melt pool 6. The molten slag layer 7 (layer of Ca+ flux) forms ongoingly as a result of this melting. The following dephosphorization reaction and denitrification reaction are promoted accompanying the increase of metallic calcium melted in the slag.

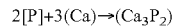

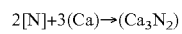

Meanwhile, Ca in the molten slag layer 7 goes on evaporating in the form of calcium gas. On account of this evaporative loss, the Ca concentration in the molten slag layer 7 is deemed to drop gradually after complete dissolution of Ca in the molten slag layer 7. The vapor pressure of the simple metallic calcium is very high. Therefore, the evaporation rate of Ca from the molten slag layer 7 is fairly large, and the drop in Ca concentration in the molten slag layer 7 is likewise fairly fast. As the Ca concentration drops in the molten slag layer 7, the Ca that is present in the form of a calcium compound ($Ca_3P_2$, $Ca_3N_2$ and the like) absorbed by the molten slag layer 7 reverts to the original metallic state through decomposition of the calcium compounds. As a result, P and N generated in this decomposition migrate again into melt pool 6. Specifically, a so-called re-phosphorization reaction and the like according to the expression below takes place in the molten slag layer 7.

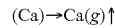

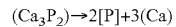

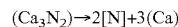

If the melt hold refining time is longer than necessary, therefore, the P and N having been once absorbed into the molten slag layer 7 migrate back to the melt pool 6, and a sufficient refining effect (dephosphorization effect, denitrification effect) fails to be achieved. Accordingly, management of the time elapsed after addition of the refining agent is crucial in reduction refining using metallic calcium. The weight to be added of first refining agent (weight of metallic calcium and weight of flux) in the first refining agent varies depending on the weight of the melt pool 6. In management of the melt hold time, therefore, the range of appropriate melt hold time varies depending on the weight of metallic calcium and the weight of flux that are added. The amount of molten slag layer 7 that is formed varies also depending on the inner diameter of the water-cooled copper crucible 3, and hence the latter factor must also be taken into account.

Figure 4:
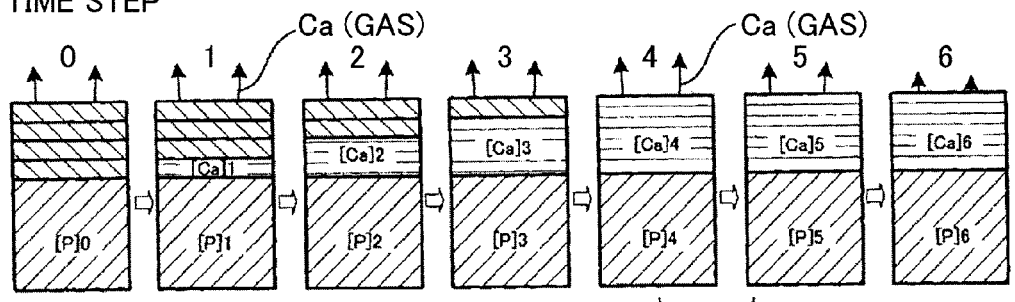
FIG. 4 is a set of graphs including a graph (FIG. 4(a)) illustrating a model of a reduction refining reaction through addition of a first refining agent, a graph (FIG. 4(b)) illustrating the relationship between a parameter in this reaction model (a melting rate constant Kmelt(Ca+Flx)) of the first refining agent and time required for melting, and a graph (FIG. 4(c)) illustrating a relationship between another parameter in the reaction model (Ca evaporation rate constant Kev (Ca)) and dephosphorization ratio.
Figure 4:
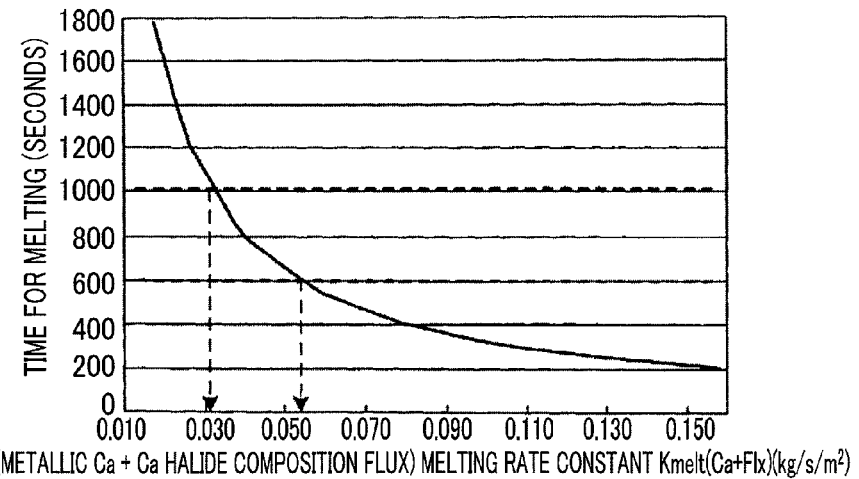
Figure 4:
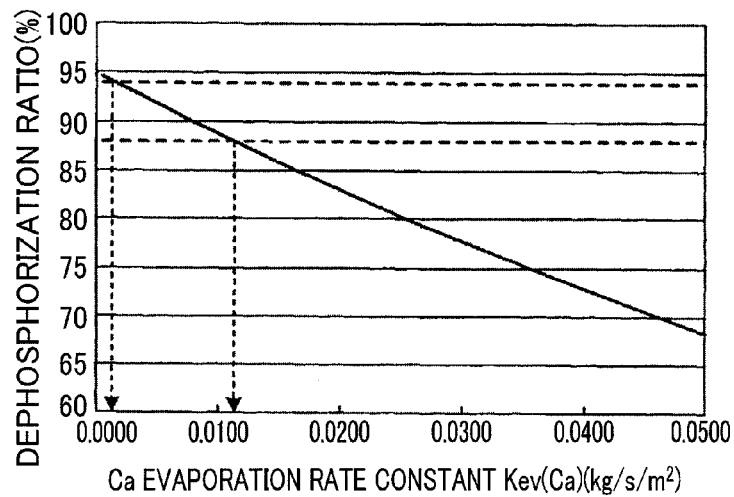

The inventors derived a model, as illustrated in FIG. 4(a), of the melt refining situation illustrated schematically in FIG. 1. FIG. 4(a) is a diagram illustrating a model of the reduction refining reactions arising upon addition of the first refining agent (mixture of metallic calcium and flux). In FIG. 4(a), the numerals 0 to 6 denote time steps, [P]0 to [P]6 denote the phosphorus concentration in the melt at each time step, and [Ca]0 to [Ca]6 denote the calcium concentration in the molten slag layer 7 at each time step. The portions of left- and downward-slanting hatching denote the melt pool, and portions of right- and downward-slanting hatching denote a layer of the first refining agent. The portions of horizontal hatching denote the molten slag layer 7.

The inventors devised the below-described reaction model. The metallic calcium and flux in the first refining agent that are added to the top of the melt pool 6 melt sequentially on account of heat transfer from the melt pool 6, and the molten slag layer 7 becomes formed thereby (stages from time step 0 to 4 in FIG. 4(a)). In this reaction model, the dephosphorization reaction and the denitrification reaction progress once the molten slag layer 7 is formed, with the P concentration and N concentration in the melt pool 6, and the $Ca_3P_2$ concentration and $Ca_3N_2$ concentration in the molten slag layer 7, among others, being determined by a local equilibrium with Ca in the molten slag layer 7. After formation of the entire molten slag layer 7 (stage from time step 4 in FIG. 4(a)), however, the Ca concentration in the molten slag layer 7 drops as time goes by, on account of evaporative loss of Ca from the molten slag layer 7. Local equilibrium reactions cause the P concentration and N concentration to increase again in the melt pool 6 accompanying this drop in Ca concentration.

In this reaction model, two parameter values (a melting rate constant Kmelt(Ca+Flx) $(kg/s/m^2)$ at which the metallic calcium and the flux added as the first refining agent melt on account of heat transfer from the melt pool 6 per unit surface area and unit time, and a Ca evaporation rate constant Kev (Ca) $(kg/s/m^2)$ at which metallic calcium evaporates from the molten slag layer 7 per unit time and unit surface area) were worked out so as to match the test results for respective instances of a weight of the melt pool 6 of 20 kg, 40 kg and 50 kg.

The molten slag layer 7 becomes formed in about 1 minute to 2 minutes upon addition of 200 g of 80 wt % $CaF_2$-20 wt % CaO into the φ220 mm water-cooled copper crucible 3. Such being the case, it is estimated that the melting rate constant (Kmelt(Ca+Flx)) of the first refining agent ranges from about 0.017 to 0.088 $(kg/s/m^2)$. The slag melting point drops if metallic calcium is present, and hence the melting rate is expected to be slightly higher than that of 80 wt % $CaF_2$-20 wt % CaO. The evaporation rate constant (Kev(Ca)) of Ca vapor from the molten slag layer 7 (for instance, 25 wt % Ca-60 wt % $CaF_2$-15 wt % CaO or the like) is calculated to be about 1 to 2 $(kg/s/m^2)$ according to an expression for determining the evaporation rate constant in vacuum, on the basis of vapor pressure of pure Ca. In the present embodiment, however, Ca reduction refining is performed, for instance, with Ar gas at a pressure of about 1 atmosphere. Therefore, the evaporation rate is expected to be lower than the above value. In this context, R. G. Ward (JISI, Vol. 201 (1963), p. 11) reports that the evaporation rate of Mn in molten steel pool in atmosphere of Ar gas at pressure of 1 atmosphere is about 1/100 the evaporation rate of Mn in molten steel pool in vacuum. Assuming a similar behavior for Ca, then Kev(Ca) is deemed to be of the order of 0.01 to 0.02 $(kg/s/m^2)$. Therefore, 750 g of calcium halide-based flux were added to a weight of 50 kg of the melt pool 6, as a condition for satisfying {Flx}M0=1.5%, to form the molten slag layer 7. Thereafter, 500 g of metallic calcium and 750 g of flux were added, as a condition for satisfying {Ca}M=1.0% and {Flx}M=1.5%, and there was worked out the time required for melting of the added refining agent in a case where the melting rate constant of the refining agent was modified in accordance with the reaction model, for a test condition wherein a Ca reduction refining test was performed by varying the refining time. The results are shown in FIG. 4(b). In this test, the reaction time at which the highest dephosphorization ratio was achieved is found to range from about 10 to 17 minutes (600 to 1020 seconds). Accordingly, it can be determined that the first refining agent melts completely, to yield the molten slag layer 7, within this lapse of time (600 to 1020 seconds). Therefore, Kmelt(Ca+Flx) ranges from about 0.03 to 0.06 $(kg/s/m^2)$. This value matches substantially the rate constant estimated on the basis of the melting rate of the flux.

Next, the value of Kev(Ca) was modified, with Kmelt(Ca+Flx)=0.045, to work out the dephosphorization ratio that is obtained. The results are shown in FIG. 4(c). The dephosphorization ratio obtained in an actual refining test ranges from about 88% to 94%. Therefore, the value of Kev(Ca) corresponding thereto ranges from about 0.002 to 0.012 $(kg/s/m^2)$. This value matches substantially the value of Ca evaporation rate constant estimated based on the vapor pressure of pure Ca. A proper value is thus obtained.

Upon working out values for test results for melt pools of 40 kg and 20 kg, Kmelt(Ca+Flx) took on a value of 0.04 to 0.07 and 0.03 to 0.06 $(kg/s/m^2)$, respectively and Kev(Ca) took on a value of 0.002 to 0.012 and 0.002 to 0.012 $(kg/s/m^2)$, respectively, on the basis of the above reaction model. Patent Document 2 and Non-patent Document 2 report test results upon varying the refining agent in a 1.6 kg melt pool that is formed in a φ84 mm water-cooled copper crucible and to which Ca+$CaF_2$ is added as refining agent. Patent Document 2 and Non-patent Document 2 indicate that the highest dephosphorization ratio (for instance 85 to 95%) is achieved 1 to 2 minutes after addition. Upon analysis of this data on the basis of the same reaction model, the Kmelt(Ca+Flx) for a test in a φ84 mm water-cooled copper crucible was about 0.04 to 0.09 $(kg/s/m^2)$, and Kev(Ca) was about 0.008 to 0.0027 $(kg/s/m^2)$. Compared with a test in a φ220 mm water-cooled copper crucible 3, the rates take on somewhat greater values in both cases, but are substantially identical. It was found that the above reaction model could be used in Ca reduction refining using a water-cooled copper crucible 3 of virtually any diameter.

Such being the case, it was found that a range of the above Kmelt(Ca+Flx) upon complete fusion of the first refining agent (mixture of metallic calcium and flux) with respect to the weight of melt pool 6 of 20 to 50 kg was about $0.03 \leq Kmelt(Ca+Flx) \leq 0.1$, and Kev(Ca) was about $0.002 \leq Kev(Ca) \leq 0.012$, taking into account data variability, among other factors.

Using the above values, it becomes possible to set an appropriate melt hold time in a case where the first refining agent (mixture of metallic calcium and flux) is added following formation of the melt pool 6 in the water-cooled copper crucible 3 of arbitrary size. Quantitatively, a higher dephosphorization ratio and denitrification ratio can be obtained, as illustrated in FIG. 3, by setting the hold time T (minutes) in the melt pool 6, after addition of the first refining agent (mixture of metallic calcium and a flux) to the melt pool 6, to range from T1 (minutes) to T2 (minutes).

The times T1 and T2 can be set as follows.

Herein, T1 (minutes) is ½ of the time required for complete fusion of the refining agent after addition of the first refining agent (mixture of metallic calcium and a flux).

$$T1 = WCa+Flx/S/Kmelt(Ca+Flx)/60/2$$

In the expression, WCa+Flx is the total weight (kg) of the first refining agent, expressed as M×({Ca}M+{Flx}M)/100 on the basis of the weight M (kg) of the melt pool 6, the metallic calcium addition ratio {Ca}M (wt %) and the flux addition ratio {Flx}M (wt %); and S is the horizontal cross-sectional area $(m^2)$ of the water-cooled copper crucible 3, expressed as $\pi D^2/4$ based on the inner diameter D (m) of the water-cooled copper crucible 3.

Herein, a time that is twice the time T1 calculated assuming Kmelt(Ca+Flx) $(kg/s/m^2)$=0.1 is the time required for forming the molten slag layer 7 through complete melting of the added refining agent. This time (T1×2), which is the time at which the refining effect is greatest, exhibits however substantial variability in practice. Therefore, the time T1 being ½ of that time was set as the shortest hold time in the melt pool 6. Accordingly, a higher dephosphorization ratio and denitrification ratio can be obtained by holding the melt for the time T1 or longer.

Herein, T2 (minutes) is the time by which ½ of the metallic calcium in the added first refining agent has disappeared from the molten slag layer 7 on account of evaporative loss.

$$T2 = WCa/2/S/Kev(Ca)/60$$

In the expression WCa denotes the weight (kg) of metallic calcium in the first refining agent, expressed as WCa=M×{Ca}M/100 based on the weight M (kg) of the melt pool 6 and the metallic calcium addition ratio {Ca}M (wt %).

The abovementioned time T2 calculated assuming Kev (Ca) (kg/s/m$^2$)=0.002 is the time by which ½ of the added metallic calcium has been lost through evaporation. A higher dephosphorization ratio and denitrification can be achieved thus by terminating holding of the melt at a time up to T2.

In an actual refining operation there is little need for holding until ½ of the added metallic calcium disappears. Qualitatively, the refining effect is maximal at the time (time of about twice T1) at which the molten slag layer 7 is formed through fusion of the entirety of the added first refining agent (mixture of metallic calcium and a flux); it is thus deemed that quenching and solidifying at that point in time the melt pool 6 as fast as possible is effective in suppressing, for instance, the re-phosphorization reaction that accompanies Ca evaporative loss. In an actual refining operation, however, visual observation itself of the surface of the melt pool 6 is precluded on account of the dust that arises from Ca evaporation in a short period of time, from several seconds to several tens of seconds, following addition of the first refining agent. Therefore, it is not possible to check, by observation, what is the point in time by which the first refining agent is completely fused, and management must be performed on the basis of time alone.

As regards the impurity removal refining effect, in this case the gradient of the change with time of the dephosphorization ratio and the denitrification ratio is steep by the stage at which the refining agent is fused, as illustrated in FIG. 3. Conversely, the change with time of the dephosphorization ratio and the denitrification ratio become less steep by the stage at which, once the molten slag layer 7 has formed completely, the Ca concentration in the molten slag layer 7 drops as Ca evaporation progresses. Therefore, it is more reliably to set a somewhat long hold time, in order to reliably secure the dephosphorization ratio. Thus, the upper limit is set as the time (T2) by which half the Ca in the slag has been lost through evaporation.

Herein, T1 and T2 are given by the expressions below, in which t0 denotes the point in time by which the first refining agent is added to the melt pool, t1 denotes the point in time by which there has elapsed half the time until fusion of all the first refining agent, from the point in time t0, and t2 denotes the point in time at which there has elapsed the time that it takes for half the metallic calcium in the first refining agent to evaporate, from the point in time t0.

$$T1 = t1 - t0$$

$$T2 = t2 - t0$$

Based on these relationships, T1 and T2, as appropriate melt hold times for the inner diameter D (m) of the water-cooled copper crucible 3, were worked out for one example of the weight of the melt pool 6 (L/D=0.75: weight of the cylindrical melt pool 6 having a height (L) in a water-cooled copper crucible of height equivalent to 0.75 the inner diameter of the water-cooled copper crucible 3), the weight of the pre-added flux ({Flx}M0=1.5) and the weight of the first refining agent ({Ca}M=1.0, {Flx}M=1.5). The results are shown in FIG. 5.

Figure 5:
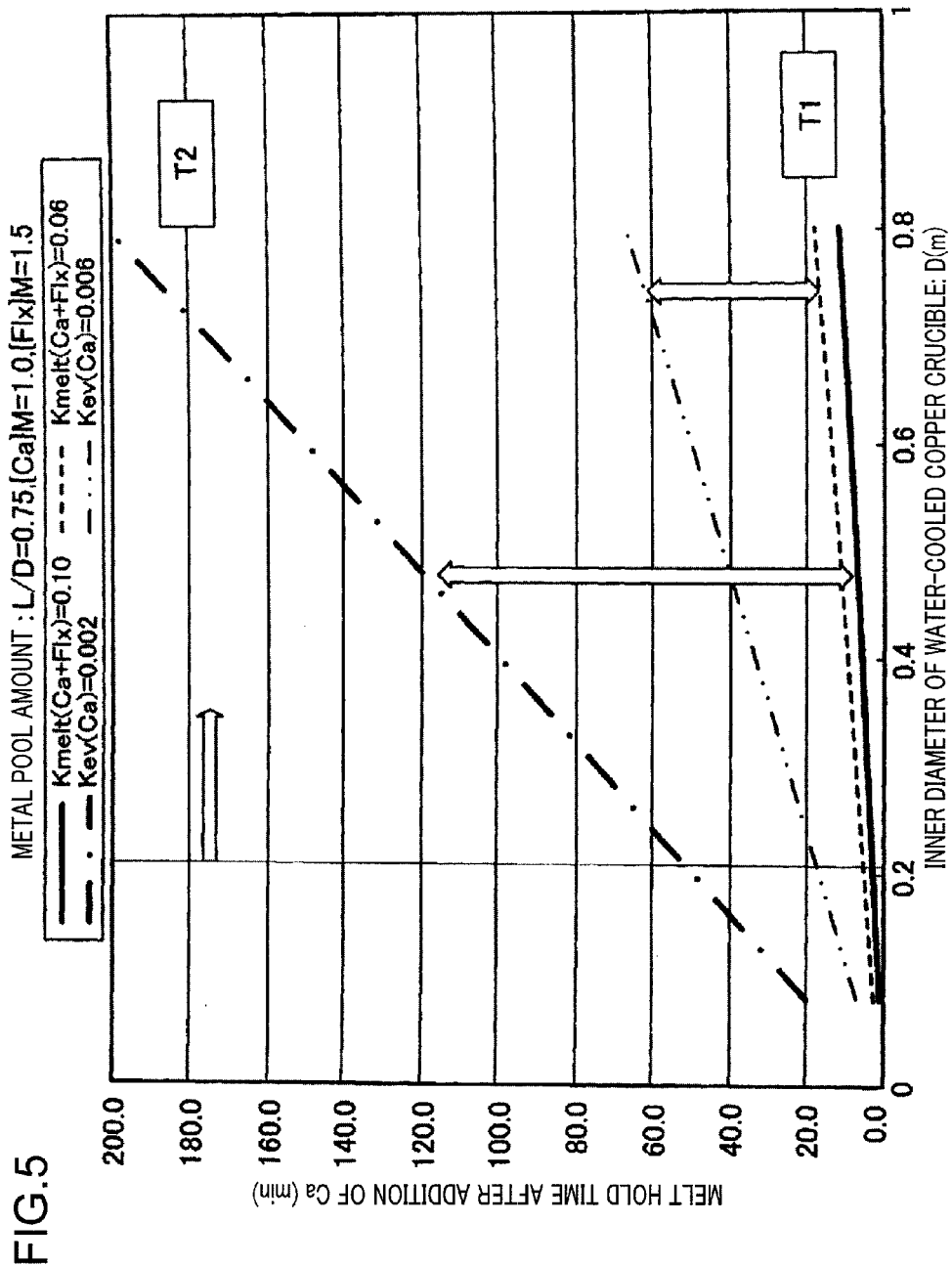
FIG. 5 is a graph illustrating a relationship between the inner diameter of a water-cooled copper crucible and an appropriate hold time after addition of a refining agent.

FIG. 5 shows that an appropriate hold time varies depending on the inner diameter in the water-cooled copper crucible 3. Despite variability in the test data, a more appropriate time range of melt hold extends from a time calculated as Kmelt (Ca+Flx) (kg/s/m$^2$)=0.06, as T1, to a time calculated as Kev (Ca) (kg/s/m$^2$)=0.006, as T2, i.e. lies within a range indicated by the dotted line and the double dotted line in FIG. 5.

Such being the case, a yet higher dephosphorization ratio and denitrification ratio (preferably, for instance, 50% or more in one refining operation during mass production), can be obtained by holding the melt pool for a time that satisfies the above relationship expression (T1≦T≦T2), in a refining operation wherein the first refining agent (mixture of metallic calcium and a flux) is added to the melt pool 6 that is formed in a water-cooled copper crucible 3 having a diameter of φ200 m or greater.

Thus, the content of impurity elements such as phosphorus (P), sulfur (S), tin (Sn), lead (Pb) and the like can be reduced to 2 ppm or less by setting the addition ratio {Ca}M of metallic calcium with respect to the melt pool to be 0.5 wt % or greater, setting the addition ratio {Flx}M of the flux with respect to the melt pool to be equal to or greater than the addition ratio {Ca}M of the metallic calcium with respect to the melt pool, and by setting the hold time T of the melt pool to T1≦T≦T2.

For instance, alloy starting materials in the form of ferrochrome material and low-carbon steel material (converter material) having substantial impurity element content, plus high-purity electrolytic Ni starting material, are charged into a φ220 mm water-cooled copper crucible 3 in use of a cold-crucible induction melter 1 having this water-cooled copper crucible 3. Next, 50 kg melt pool 6 of stainless steel (Fe-20Ni-25Cr) is formed in the water-cooled copper crucible 3 by induction heating. Thereafter, first refining agent (mixture of metallic calcium and flux), using $CaF_2$-20CaO as flux, is added to the melt pool 6 under the condition of satisfying {Ca}M=1.0 and {Flx}M=1.5. The refining operation is performed in which the melt pool 6 is held for 11 to 15 minutes, through continued induction heating. In this case, the impurity element concentration in the melt pool 6 at the initial stage of blending the alloy starting materials is about [P]0=250 ppm and [N]0=250 ppm. Through Ca reduction refining, a dephosphorization reaction and a denitrification reaction proceed at dephosphorization ratio=about 90%, denitrification ratio=about 85%, so that the impurity element concentration once refining is over is about [P]1=25 ppm and [N]1=40 ppm. The melt after refining is over solidifies to yield a primary ingot. Using this primary ingot as alloy starting material, the second Ca reduction refining is performed under the same conditions as in the first refining. The impurity element concentration once the second refining is over is about [P]2=3 ppm and [N]2=6 ppm. The melt after the second refining is over solidifies to yield the secondary ingot. Using this secondary ingot as alloy starting material, the third Ca reduction refining is performed under the same conditions as in the first refining. The impurity element concentration once the third refining is over can be [P]3<2 ppm, [N]3<2 ppm. Thus, the concentration of impurity elements can reach a value of 2 ppm or less, which is the analytical limit in current chemical analysis methods. Herein, [P]0 and [N]0 denote the phosphorus concentration and nitrogen concentration in the melt pool 6 before Ca reduction refining; [P]1, [P]2, [P]3 denote the phosphorus concentration in the melt pool 6 once the first, second and third Ca reduction refining processes are over, respectively; and [N]1, [N]2, [N]3 denote the nitrogen concentration in the melt pool 6 once the first, second and third Ca reduction refining processes are over, respectively.

In a cold-crucible induction melter 1 having a φ220 mm water-cooled copper crucible 3 there was produced an alloy ingot through reduction refining by adding a refining agent that satisfied conditions (1) to (4) set forth in the first embodiment, and using, as alloy starting materials, for instance electrolytic iron, electrolytic Ni and metallic Cr, being commercially available high-purity starting materials that are comparatively easy to procure. The content of impurity elements in the melt pool 6 before refining (i.e. the content of impurity elements at the initial blending stage of the alloy starting materials) and the content of impurity elements in the alloy ingot were measured by chemical analysis methods. It was found that [P]1<1 ppm, [S]1<1 ppm for [P]0=10 ppm, [S]0=10 ppm. It was found that the content of trace and tramp elements such as Sn, Pb and Sb in the alloy ingot, by GD-MS analysis, was 1 ppm or less for each element. Thus, it was found that the content of impurity elements could be reduced to 2 ppm or less just as a result of one Ca reduction refining in the first embodiment. Herein, [P]0 and [S]0 denote the phosphorus concentration and sulfur concentration in the melt pool 6 before Ca reduction refining; and [P]1 and [S]1 denote the phosphorus concentration and sulfur concentration in the melt pool 6 once Ca reduction refining is over.

Thus, practical-scale alloy ingots can be produced in which the content of impurity elements such as phosphorus (P) or the like is 2 ppm or less, by performing reduction refining in which a refining agent that satisfies conditions (1) to (4) of the present embodiment is added to the melt pool.

(Second Embodiment)

A significant amount of metallic calcium remains in alloy ingots obtained by refining using metallic calcium, in particular, in alloy ingots that contain Ni as alloy component. For instance, the residual calcium concentration in an alloy having 0 (zero) Ni content is about 0.02 wt %. By contrast, the residual calcium concentration is about 0.05 wt % in an alloy having a Ni content of about 20 wt %; the residual calcium concentration is about 0.09 wt % in an alloy having a Ni content of about 35 wt %; the residual calcium concentration is about 0.12 wt % in an alloy having a Ni content of about 45 wt %; and the residual calcium concentration is about 0.5 wt % in an alloy having a Ni content of about 60 wt %. As is known, corrosion resistance is impaired by alkaline earth elements and alkali metal elements, such as Ca, that are present in the alloy ingot. As a method for producing a corrosion-resistant materials, therefore, a method is required in which there is produced an alloy ingot having a Ca content not greater than 0.001 wt %, preferably not greater than 1 ppm.

Reduction refining performed using metallic calcium in cold-crucible induction melters often entails an increase in elements such as carbon, aluminum and silicon, as impurities in the melt, which are decreased more readily than Ca. For instance, there may occur concentration increases of about 30 ppm for C and about 50 ppm for Al and Si. This is deemed to be attributable to reduction, by metallic calcium, of organic materials and ceramics that are adhered to the vacuum chamber of the induction melter, and subsequent absorption into the melt pool 6. These impurity elements must also be removed in accordance with the target composition of the alloy.

Depending on the application, an ultrahigh-purity alloy may also be required in which [C]<10 ppm, [Si]<0.01 wt % and [Ca]<10 ppm is satisfied. In such a case, it becomes necessary to remove impurity elements such as C, Si and the like, together with Ca, at the refining stage. Further, boron may impair significantly corrosion resistance, and hence some ultrahigh-purity alloys are also required in which [B]<1 ppm.

In the light of the above, the inventors performed diligent research focusing on the composition of the refining agent added to the melt pool and on the proportion of refining agent with respect to the melt pool, in order to remove sufficiently at least carbon and calcium from among impurity elements from a practical-scale melt pool such that the weight of the finished ingot was 10 kg or more. As a result, the inventors found that it is possible to produce, in a practical scale, an alloy ingot having an extremely low content of at least carbon (C) and calcium (Ca) from among impurity elements, by way of a production method that involves forming melt pool in a cold crucible that is provided in a cold-crucible induction melter, adding refining agent to the melt pool to remove impurity elements thereby, and solidifying the melt having impurity elements removed therefrom, to form an alloy ingot, such that, in the method:

(5) Second refining agent is used, as refining agent, that is mixture of flux and first oxide containing one, two or more types of oxides of main component element in the alloy starting material;

(6) Calcium halide-based flux is used as the flux;

(7) The weight of the first oxide in the second refining agent is set to 0.2 to 4 times a calculated weight that is calculated in order to oxidize totally at least carbon and calcium from among impurity elements present in the melt pool; and (8) The proportion of the weight of the flux in the second refining agent with respect to the weight of the melt pool before addition of the second refining agent is set to range from 0.5 to 5 wt %.

The inventors perfected the second embodiment of the present invention on the basis of the above finding.

An object of the second embodiment according to the present invention is to provide a method for producing, in a practical scale, an alloy ingot having an extremely low content of at least carbon (C) and calcium (Ca) from among impurity elements.

The second embodiment of the present invention will be explained next with reference to accompanying drawings.

The second embodiment according to the present invention is a method for producing alloy ingot, the method comprising: a step of charging alloy starting material into a cold crucible in a cold-crucible induction melter, and forming melt pool of the alloy starting material by induction heating in inert gas atmosphere; a step of continuing the induction heating and adding second refining agent to the melt pool, and then reducing the content of at least carbon and calcium from among impurity elements present in the melt pool; and a step of forming alloy ingot by solidifying the melt, the carbon and calcium content of which has been reduced.

As the cold-crucible induction melter in the method for producing alloy ingots of the present embodiment there can be used, for instance, the cold-crucible induction melter 1 illustrated schematically in FIG. 1.

In the present embodiment, firstly, alloy starting material is charged, by way of the starting material feeder 2, into the cold crucible 3 of the cold-crucible induction melter 1. The alloy starting material is melted through induction heating by the coil 5, to form thereby the melt pool 6 for adjusting the components to a predetermined alloy composition (melt pool formation step). Next, second refining agent is added to the melt pool 6 under continued induction heating by the coil 5 (i.e. in a state where the melt pool 6 is held), to remove thereby at least carbon and calcium from among the impurity elements in the melt pool 6 (refining step). The melt after refining (removal of carbon and calcium) is left to solidify to form alloy ingot (ingot formation step). The alloy ingot is prepared thus in the present embodiment as a result of these steps.

In the ingot formation step of the present embodiment, similarly to the first embodiment, induction heating may be discontinued, for instance, after a slag-off process, and the melt in the cold crucible 3 may be caused to solidify, to form thereby the alloy ingot. As the cold crucible 3 there may be used a bottom plate lift type cold crucible in which a bottom plate can move up and down, such that an alloy ingot may be formed through gradual solidification of the melt from the bottom, through lowering of the bottom plate, together with the melt pool, down to the non-induction heating region while the melt pool is held in the induction heating region of the cold crucible, or, alternatively, the melt after refining may be injected from the cold crucible 3 into a mold, and caused to be solidified therein, to form thereby an alloy ingot.

In the present embodiment, granular, plate-like or disc-like metals, alloys and the like may be used as the alloy starting material. The shape, purity and composition of the alloy starting material may be selected in accordance with the target composition of the alloy ingot. For instance, an alloyed ferrous material may be used, such as commercially available stainless steel scrap, low-carbon steel material or ferrochrome, which are inexpensive starting materials. That is because, unlike reduction refining, oxidation refining in the present embodiment allows removing C, Si, Mn, Al and Ca present in large amounts, at a level ranging from several hundred to several thousand ppm, to a level of several ppm or less.

For instance, there may be used ultrahigh-purity alloy scrap, which, although having a sufficiently low content of impurity elements such a P, S, Sn or Pb, has nonetheless Al, Ti, Zr or Si added thereto, or a high-purity metal such as electrolytic iron, electrolytic nickel, metallic chromium or the like that contain Si, Al or B as impurity elements. That is because oxidation refining in the present embodiment allows decreasing the content of Ca, Al, Ti, Zr, Si and B.

In order to further increase the purity of the alloy ingot (to further reduce the content of impurity elements), the alloy ingot obtained in the present embodiment may also be used as the alloy starting material.

The present embodiment allows producing alloy ingots of various component compositions. For instance, there can be produced Fe-based alloy ingot, Ni-based alloy ingot, Fe—Ni-based alloy ingot or Co-based alloy ingot. The method for producing alloy ingots of the present embodiment is particularly suitable for the production of Fe-based alloy ingot, Ni-based alloy ingot and Fe—Ni-based alloy ingot.

(Oxidation Refining Using a Cold-Crucible Induction Melter)

In the present embodiment, refining through removal of active elements present in the melt, such as carbon (C), silicon (Si), aluminum (Al), titanium (Ti), zirconium (Zr), hafnium (Hf) and boron (B), can be performed by charging alloy starting materials into the cold crucible 3 in the cold-crucible induction melter 1, forming the melt pool 6 in inert gas atmosphere, and adding thereafter refining agent that satisfies conditions (5) to (8) below. The solidified scull layer 8 is formed below the melt pool 6. FIG. 1 depicts schematically the state of the refining in the present embodiment. As the inert gas there is used Ar gas, He gas or the like. To achieve inert gas atmosphere in the vacuum chamber 4, the interior of the vacuum chamber 4 is evacuated first by means of a vacuum pump, and inert gas such as Ar gas is introduced into the vacuum chamber 4.

The refining conditions in the present embodiment were elucidated as a result of multiple tests and studies using the cold-crucible induction melter 1 having a water-cooled copper crucible (cold crucible 3) the inner diameter whereof was φ220 mm (5) As refining agent, second refining agent is used that is mixture of flux and first oxide containing one, two or more types from among oxides of main component element in alloy starting material.

During production of alloy ingot using the cold-crucible induction melter 1, the decarburization reaction according to the expression below must be promoted in order to remove carbon as impurity element in the melt.

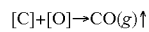

To promote this reaction, oxygen must be supplied to the melt pool 6, and the generated carbon monoxide gas (CO (g)) removed, to lower thereby the partial pressure of CO. The method for supplying oxygen to the melt pool 6 may involve, for instance, blowing oxygen gas into the melt pool. An effective method for removing CO (g), however, involves vacuum evacuation, and continued discharge of generated carbon monoxide gas out of the vacuum chamber 4. Accordingly, adding an oxide of main component element of the alloy starting material in a solid state is a more effective method of supplying oxygen into the melt pool 6 than blowing gaseous oxygen-containing substance. In particular, the residual oxygen concentration in the alloy ingot is often of 5 ppm or less, so that, as a result, the melt pool is in a state free of oxygen sources, in a case where the melt pool is formed using an alloy starting material in the form of an alloy ingot having been subjected to reduction refining by metallic calcium. Accordingly, it is indispensable to supply an oxygen source in order to promote the abovementioned decarburization reaction.

Herein, the "oxide of main component element of the alloy starting material" is a compound included in the alloy starting material and being a compound of oxygen atoms and a main component element in the alloy ingot. In a case where, for instance, the alloy ingot is Fe-based alloy, the main component element in the alloy ingot is Fe, and the oxide of a main component element of the alloy starting material is an iron oxide, such as $Fe_3O_4$, $Fe_2O_3$ or the like. In a case where the alloy ingot is Fe—Ni-based alloy, the main component elements in the alloy ingot are Fe and Ni, and the oxide of a main component element of the alloy starting material is an iron oxide or nickel oxide. In a case where the alloy ingot is Ni-based alloy, the main component element in the alloy ingot is Ni, and the oxide of a main component element of the alloy starting material is a nickel oxide. In a case where the alloy ingot is Co-based alloy, the main component element in the alloy ingot is Co, and the oxide of a main component element of the alloy starting material is a cobalt oxide. These oxides are in solid form at the point in time at which they are added to the melt pool. The oxide of a main component element of the alloy starting material acts as oxidant in the refining reaction (the abovementioned decarburization reaction) in the present embodiment, and is therefore an oxidant contains a metal oxide. The first oxide acting as oxidant in the second refining agent may be one type, or a combination of two or more types, from among oxides of the main component element.

Alloy elements such as Si, Al, Ti, Zr, Hf, B, Ca and the like are active metal elements the oxides whereof are thermodynamically more stable than those of iron and nickel. To remove these alloy elements, therefore, the below-described oxidation refining reactions must take place and the respective resulting oxides must be removed through separation into the slag.

$$[Si]+2[O] \rightarrow (SiO_2)$$

$$2[Al]+3[O] \rightarrow (Al_2O_3)$$

$$[Ti]+2[O] \rightarrow (TiO_2)$$

$$[Zr]+2[O] \rightarrow (ZrO_2)$$

$$2[B]+3[O] \rightarrow (B_2O_3)$$

$$[Ca]+[O] \rightarrow (CaO)$$

Although Ca in the melt is removed through evaporation, even when in a molten state, certain amount of Ca remains in the alloy ingot. Performing oxidation refining is likewise important in order to remove Ca in the melt. When oxidized and absorbed into the slag, these elements react with CaO in the molten slag layer 7 and become more stable compounds, whereby the activity of such components drops in the molten slag layer 7. This lower activity is effective for a removal refining reaction. For instance, $SiO_2$ formed through oxidation of Si reacts with CaO to yield a stable compound such as $Ca_2SiO_4$ or the like. This is effective, as a result, for reducing lowering the activity of $SiO_2$ in the molten slag layer 7 and facilitating the progress of the oxidation reaction of Si. Likewise, $Al_2O_3$, $TiO_2$, $B_2O_3$ and the like react with CaO to yield compounds, whereby there drops the activity of the foregoing in the molten slag layer 7. This is effective for refining through oxidation removal of these elements. Accordingly, it is effective to set the amount of CaO in the molten slag layer 7 in accordance with the amount of these various oxides that are generated in oxidation reactions.

The second refining agent in the refining step of the present embodiment must promote the abovementioned decarburization reaction and the abovementioned oxidation reaction of the metal active element, as removal refining reactions of active elements. Therefore, the second refining agent comprises the first oxide that acts as oxidant of the above decarburization reaction, and the above flux (calcium halide-based flux) that causes oxides generated as a result of an oxidation reaction of the above metal active elements to be absorbed stably into the slag layer.

For instance, $Fe_2O_3$ or $Fe_3O_4$ are used as iron oxides that constitute a typical oxygen source. The oxides generated as a result of the oxidation reaction must be absorbed stably into the molten slag layer 7. Therefore, flux resulting from adding CaO to a Ca halide-based flux, such as calcium fluoride ($CaF_2$) and calcium chloride ($CaCl_2$), is used as flux having high oxygen absorption ability.

(6) The flux in the second refining agent is calcium halide-based flux.

The component of this flux has the same composition as the flux in the first refining agent. That is because lowering the melting point of the flux to facilitate fusion of the added flux, by heat transfer from the melt pool 6, and form thereby the molten slag layer 7, is effective for driving the reactions forward. A flux that contains CaO is more effective for absorbing oxides generated in the oxidation reaction. Yet more effective is a component system having incorporated thereinto beforehand an amount of CaO as necessary for rendering the generated oxides into stable compounds.

(7) The weight of the first oxide in the second refining agent is 0.2 to 4 times a calculated weight that is calculated in order to oxidize totally at least carbon and calcium from among impurity elements present in the melt pool.

In a case where, for instance, an iron oxide ($Fe_xO_y$) is used as the oxide of a main component element of the alloy starting material in the second refining agent, then an addition weight $WFe_xO_y$ (kg) of the iron oxide ($Fe_xO_y$) and a calculated weight MFeO (kg) of the iron oxide ($Fe_xO_y$) satisfy the expression below, on the basis of the above relationship.

$$0.2 \times MFeO \leq WFe_xO_y \leq 4.0 \times MFeO$$

Herein, MFeO is given by the expression below, using the weight of the melt pool and the concentration of active elements in the melt pool.

$$MFeO=M/100 \times ([C]/12.01+2 \times [Si]/28.09+1.5 \times [Al]/26.98+2 \times [Ti]/47.9+2 \times [Zr]/91.22+2 \times [Hf]/178.49+1.5 \times [B]/10.811+[Ca]/40.08-[O]/15.9994)/y \times (55.85 \times x+16.0 \times y)$$

M: weight (kg) of the melt pool 6
[C]: concentration (wt %) of C in the melt pool 6
[Si]: concentration (wt %) of Si in the melt pool 6
[Al]: concentration (wt %) of Al in the melt pool 6
[Ti]: concentration (wt %) of Ti in the melt pool 6
[Zr]: concentration (wt %) of Zr in the melt pool 6
[Hf]: concentration (wt %) of Hf in the melt pool 6
[B]: concentration (wt %) of B in the melt pool 6
[Ca]: concentration (wt %) of Ca in the melt pool 6
[O]: concentration (wt %) of O in the melt pool 6

During Ca reduction refining, there is some contamination of C, Si, Al and the like from a refractory sheet, for receiving melt splash, that is provided in the outer periphery of the cold crucible 3 (water-cooled copper crucible). Accordingly, the calculation of the added oxygen amount must take into account a pick-up amount during Ca reduction refining. Specifically, test results have revealed the possibility of pick-up on account of contamination by about 30 ppm of [C], and about 50 ppm each of [Si] and [Al]. In the concentration of the various elements in the above calculation formula there must be used using blending calculation values that employ, for instance, analysis values of the charged starting materials. The above calculation formula is a formula for, in a case where the oxygen is supplied in the form of a $Fe_xO_y$ iron oxide, working out the required number of oxygen moles for converting [C] into CO gas, [Si] into $SiO_2$ slag, [Al] into $Al_2O_3$ slag, [Ti], [Zr], [Hf] into $TiO_2$ slag, $ZrO_2$ slag and $HfO_2$ slag, respectively, [B] into $B_2O_3$ slag and [Ca] into CaO slag, through division by the atomic weight of the respective element, and for calculating thereupon the necessary weight of $Fe_xO_y$ iron oxide. The concentration values [C], [Si], [Al], [Ti], [Zr], [Hf], [B], [Ca] and the like are calculated on the basis of analysis values of the blended molten starting material.

Although not included in the above calculation formula, the latter must be supplemented with the necessary oxygen amount for converting, if present as active metals, for instance alkali metals (EI), alkaline earth metals (EII), Y, lanthanide and actinide metals (ER) and the like, into slags of $EI_2O$, EIIO, $Y_2O_3$ and $ER_2O_3$, respectively. Manganese (Mn) is not as active as Fe, and is comparatively removed less readily by oxidation refining. Also, manganese characteristically is readily removed by evaporation when molten in high vacuum. Therefore, manganese is not a target for removal by oxidation refining. When nickel oxide or cobalt oxide is used as the oxidant, the Fe (atomic weight: 55.85) in the above expression need only by converted to Ni (atomic weight: 58.71) or Co (atomic weight: 58.93).

Figure 6:
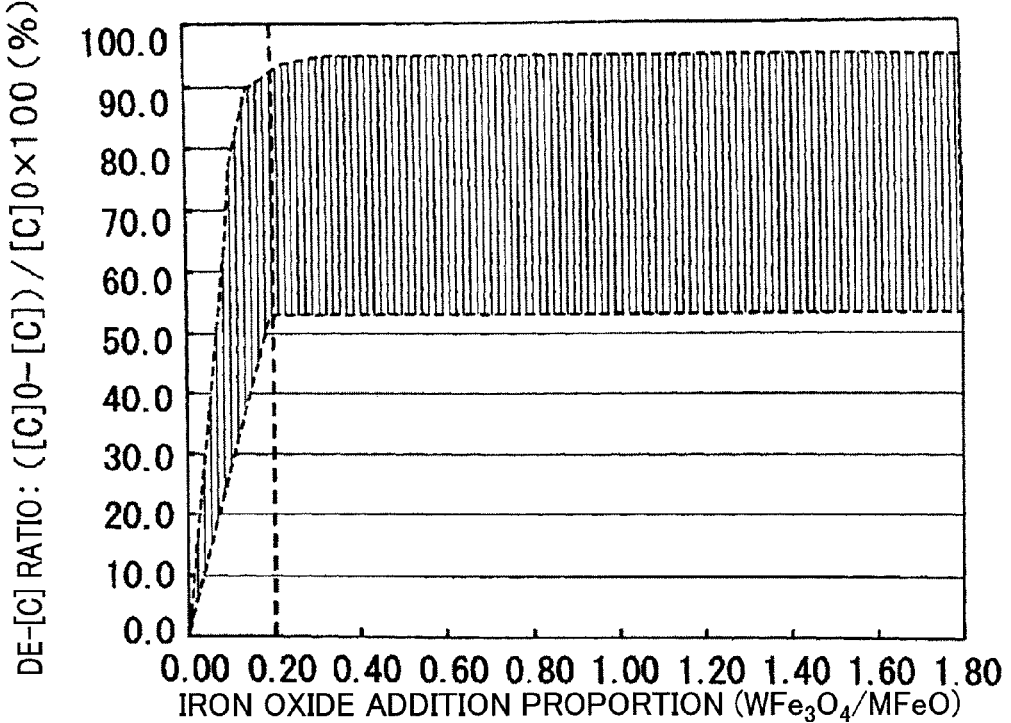
FIG. 6 is a set of graphs illustrating a correlation between decarburization ratio and iron oxide addition proportion (WFe$_3$O$_4$/MFeO) and flux addition ratio {Flx}M in iron oxide addition/vacuum oxidation refining.
Figure 6:
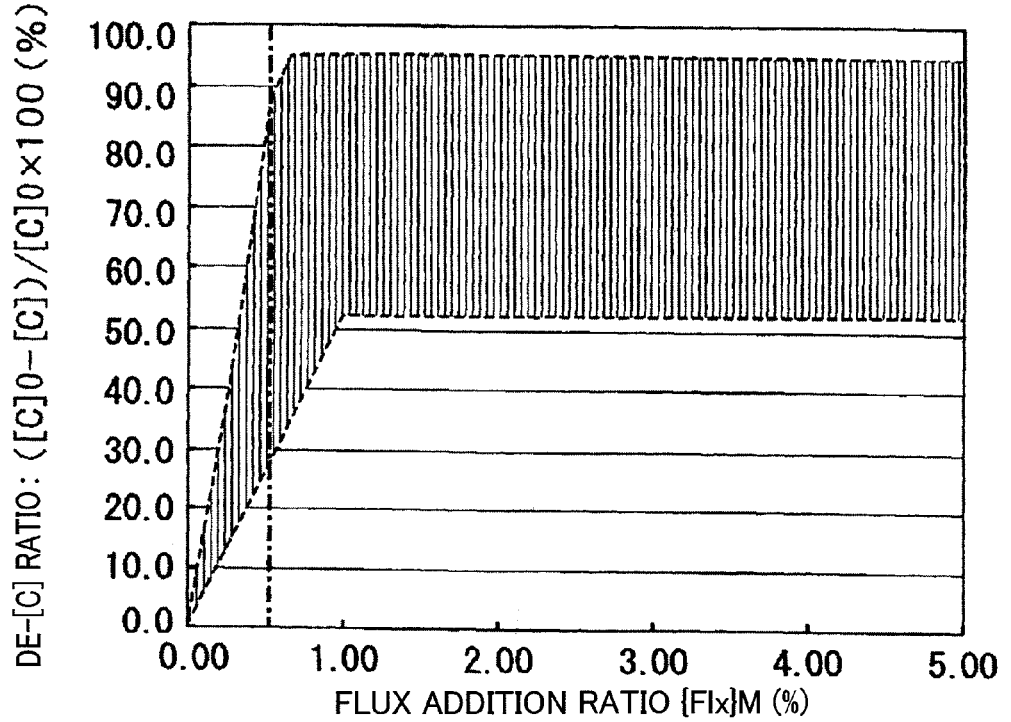
Figure 7:
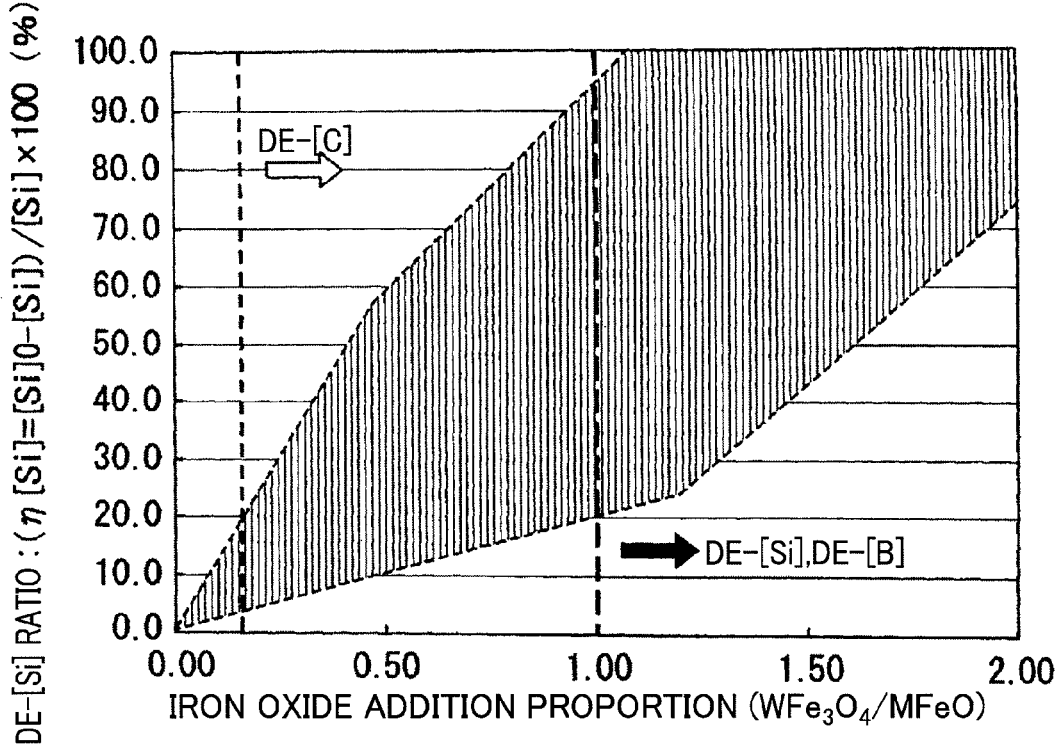
FIG. 7 is a set of graphs illustrating the correlation between desiliconization ratio and iron oxide addition proportion (WFe$_3$O$_4$/MFeO) and flux addition ratio {Flx}M in iron oxide addition/vacuum oxidation refining.
Figure 7:
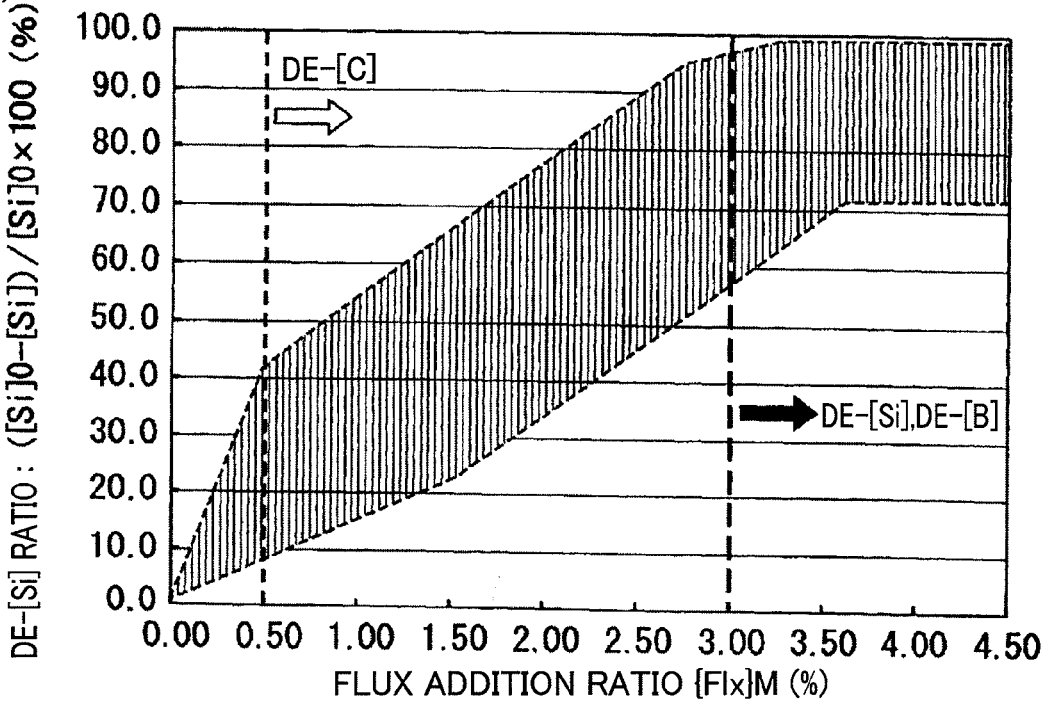

As a result of several preparation and refining tests, it was found that the iron oxide weight $WFe_xO_y$ (kg) that must be added when decarburization is the main purpose, is 0.2 times or more the calculated amount of MFeO (kg), and the flux addition ratio {Flx}M must be 0.5 wt % or more, as illustrated in FIG. 6(a). The decarburization ratio drops significantly, and the refining effect is harder to achieve, when $WFe_xO_y$ is $WFe_xO_y<0.2\times MFeO$ and {Flx}M is {Flx}M<0.5. As regards refining through oxidation and removal of Si and B, the oxides whereof have smaller thermodynamic stability than those of elements such as Al and Ti, it was found that setting the weight of added iron oxide to satisfy $1.0\times MFeO<WFe_xO_y$, and setting {Flx}M to satisfy 3.0<{Flx}M was effective to achieve a desiliconization ratio of 50% or greater, as illustrated by the relationship between $WFe_3O_4/MFeO$ and {Flx}M and the desiliconization ratio in FIG. 7. In order to enhance the desiliconization ratio more reliably, $WFe_xO_y$ had to be set to range from about 1.5 times to 2 times MFeO. That is because not all the added iron oxide is used in the reactions. On the other hand, adding a weight of iron oxide of 4 times or more the required amount results in an excessive increase in oxidative loss of alloy components such as Cr or the like, which is undesirable.

Removal refining of elements such as C, Al, Ti, Zr, Hf, Ca and the like, the oxides whereof are thermodynamically stable, progresses when performing vacuum oxidation refining by setting the weight of added iron oxide to range from about 0.2 times to about 1.0 times the calculated amount MFeO; however, removal refining of Si, B and the like often fails to progress noticeably in this case. Nevertheless, Si, B and the like can be removed by setting the addition amount of iron oxide to be 1.0 times or more the MFeO amount, and setting the flux addition ratio {Flx}M to be 3 wt % or greater. For instance, [B] is 50 ppm before refining, and becomes 1 ppm after refining. Also, [Si] is 0.22 wt % before refining, and smaller than 0.01 wt % after refining. Removal refining of Si and B can be further facilitated by setting the addition amount of iron oxide to be 2.0 times or more the MFeO amount, using $CaF_2$—CaO-based flux or $CaF_2$—(CaO+$CaCl_2$)-based flux, and setting the flux addition ratio {Flx}M with respect to the weight of the melt pool 6 to be 3.0 wt % or greater.

If the weight of added iron oxide is greater than 4 times the MFeO amount, the oxidation reaction is excessively harsh, and the oxidative loss of Cr and the like, as alloy elements, becomes significant. Therefore, a weight greater than 4 times the MFeO amount is not preferred.

In a specific example of the foregoing quantities, for instance, 50 kg melt pool is formed using stainless steel having a Fe-20Ni-25Cr composition, ferrochrome material and low-carbon steel material or the like as commercially available inexpensive starting materials, plus electrolytic Ni starting material, as high-purity starting material. Thereupon, the impurity element concentrations in the melt pool are about [C]=0.02, [Si]=0.21, [Al]=0.015, [Ti]=0.0, [B]=0.005, [Ca]=0.001 and [O]=0.02 wt %. The calculated oxygen molar quantity required for oxidizing the foregoing elements is 8.9 moles. If supplied in the form of iron oxide $Fe_3O_4$, the oxygen in the form of iron oxide $Fe_3O_4$ corresponds to MFeO=515 g. Therefore, addition of about 800 g (about 1.5 times) of $Fe_3O_4$ causes [C] to drop down to about 0.005 wt % and [Al] to drop down to about 0.003 wt %. However, there is hardly a drop for [Si], at about 0.19 wt %, and [B], at about 0.004 wt %. Nevertheless, [Si] drops to 0.01 wt % or less, and [B] drops to about 0.0001 wt %, upon addition of 1300 g (2.5 times) of $Fe_3O_4$. The flux used herein is $CaF_2$—CaO (25 wt %) and the addition ratio {Flx}M=4.0% (2000 g).

It is found that such refining allows performing removal refining down to a impurity concentration ([Si]<0.01 wt %) comparable to that achieved when using high-purity starting material such as electrolytic iron, electrolytic nickel, metallic chromium or the like, even when ferrochrome material, low-carbon steel material or the like, which are commercially available inexpensive starting materials, are used as melt starting materials.

In a case where removal of Si or B is not necessary, refining can be performed in which C removal takes precedence, through suppression of decreases in Si or B, by adding iron oxide in an amount of about 1.5 times the MFeO amount, by using of a Ca halide composition flux having a small CaO content, and by setting the addition ratio {Flx}M of flux to range from about 0.5 to 2%.

(8) The proportion of the weight of metallic calcium in the second refining agent with respect to the weight of the melt pool before addition of the second refining agent ranges from 0.5 to 5 wt %.

If the flux addition ratio is too small there is elicited no absorption effect of the generated oxide. Therefore, at least the flux amount must be 0.5 wt % of the weight of the melt pool 6. On the other hand, when the {Flx}M is 5.0 wt % or greater, as in the case of metallic calcium reduction refining, the heat transfer from the melt pool 6 is insufficient, and the molten slag layer 7 does not form readily. Therefore, the upper limit is set to 5.0 wt %.

In the present embodiment, preferably, the refining agent (second refining agent) being mixture of flux and iron oxide is added; thereafter, the inert gas in the chamber (vacuum chamber 4) is evacuated (vacuum evacuation is performed), and that state (vacuum state (evacuation state)) is held for 15 minutes or longer.

For instance, vacuum evacuation is performed in a chamber using an oil-sealed rotary pump if the molten slag layer 7 is formed through addition of a second refining agent, being mixture and iron oxide, to the melt pool 6. As the case may require, vacuum evacuation is performed using a mechanical pump, a diffusion pump or the like, and oxidation refining is performed in a vacuum atmosphere.

Fine droplets (splash) scatter from the melt pool 6 when the degree of vacuum is 10 hPa or lower. This occurrence is deemed to arise on account of CO (g) gas, released through reaction of C and O, and which causes surrounding fused metal to fly off. In this phenomenon, the reaction ends when the carbon concentration drops in the melt pool 6. For instance, occurrence of violent splashing is over in about 10 minutes, and [C] drops to about 20 to 60 ppm, also in a case of initial concentration [C]0=250 ppm. It is also observed that holding the melt pool 6 under vacuum causes the surface temperature of the melt pool 6 to rise, and causes the added flux to fuse more readily. The molten slag layer 7 is formed stably thereby.

After such a decarburization reaction, fused slag fragments, deemed to be oxides, are observed to float on the surface of the melt pool 6. These fragments disappear by being gradually absorbed into the molten slag layer 7 of the flux. After about 15 minutes, there is virtually no float-out of the oxide slag, and the floating oxide on the surface of the melt pool 6 is observed to become less. Accordingly, the melt must be held for 15 minutes or longer.

The operation of adding iron oxide to the melt pool is disclosed in Patent Document 5. Specifically, iron oxide and $CaF_2$ are added to a 2 kg melt pool in a φ84 mm water-cooled copper crucible, under an inert gas atmosphere. Conditions are same as regards the feature of using iron oxide. In the present invention, however, there is formed a melt pool 6 of 10 kg or more in a water-cooled copper crucible 3 having a diameter of φ200 mm or larger, and there are clarified the conditions for addition of iron oxide and low-melting point Ca halide composition flux in a practical scale. This feature differs from conventional method. In the present invention, moreover, the decarburization reaction is promoted through a vacuum evacuation operation. As a result, this promotes formation of the molten slag layer 7 and absorption of the formed oxides. This feature is different from conventional method. That is, a major characterizing feature of the present invention is the explicit definition of conditions for obtaining a specific refining effect.

(Third Embodiment)

In the method for producing alloy ingots of the second embodiment, as described above, carbon and calcium, as impurity elements, are removed from a practical-scale melt pool through oxidation refining in a cold-crucible induction melter. In a cold-crucible induction melter, however, the melt pool is formed in a cold crucible. Therefore, the surface area/volume ratio of the melt pool is relatively small, and removal of generated CO gas is insufficient in some instances even when performing oxidation refining under high vacuum. That is, in some instances the decarburization fails to progress, and it is difficult to remove carbon to [C]<10 ppm. Herein, [C]<10 ppm can be achieved through oxidation refining by charging a large amount of oxidant, to forcibly remove carbon, but then the [O] in the melt pool becomes significantly high, to the point of exceeding 100 ppm.

Therefore, the inventors conducted diligent research focusing on the melting method, the composition of the refining agent added to the melt pool, the addition amount of the refining agent, and an appropriate atmospheric pressure range at the time of melting of the starting materials, in order to remove sufficiently oxygen and carbon, as impurity elements, from a practical-scale melt pool such that the weight of a finished ingot is 10 kg or more. As a result, the inventors found that it is possible to produce, in a practical scale, an alloy ingot having an extremely low content of carbon (C) and oxygen (O), from among impurity elements, by way of a production method that involves irradiating electron beam to a starting material electrode that is supplied into a cold hearth-type electron beam melter, to form thereby melt pool in the cold hearth provided in the melter; removing impurity elements by adding refining agent to the melt pool; and solidifying the melt having had impurity elements removed therefrom, to form thereby an alloy ingot, such that, in the method:

(9) The interior of the cold hearth-type electron beam melter during electron beam irradiation is set to an atmospheric pressure lower than $5\times10^{-4}$ mbar;

(10) Third refining agent is used, as refining agent, that is the second oxide containing one, two or more types from among oxides of main component element in the starting material electrode;

(11) The weight of the third refining agent is set to 1 to 4 times a calculated weight that is calculated in order to oxidize totally carbon from among impurity elements present in the melt pool.

The inventors perfected the third embodiment of the present invention on the basis of the above finding.

An object of the third embodiment according to the present invention is to provide a method for producing, in a practical scale, an alloy ingot having an extremely low content of carbon (C) and oxygen (O) from among impurity elements.

The third embodiment of the present invention will be explained next with reference to accompanying drawings.

The third embodiment according to the present invention is a method for producing alloy ingot, the method comprising: a step of supplying starting material electrode into a cold hearth-type electron beam melter, and irradiating electron beam onto the starting material electrode under atmospheric pressure lower than $5\times10^{-4}$ mbar, and then forming melt pool in a cold hearth in the cold hearth-type electron beam melter;

a step of adding third refining agent to the melt pool and then reducing the content of carbon as impurity element present in the melt pool; and a step of forming alloy ingot by solidifying the melt, the carbon content of which has been reduced.

(Cold Hearth-Type Electron Beam Melter)

Figure 8:
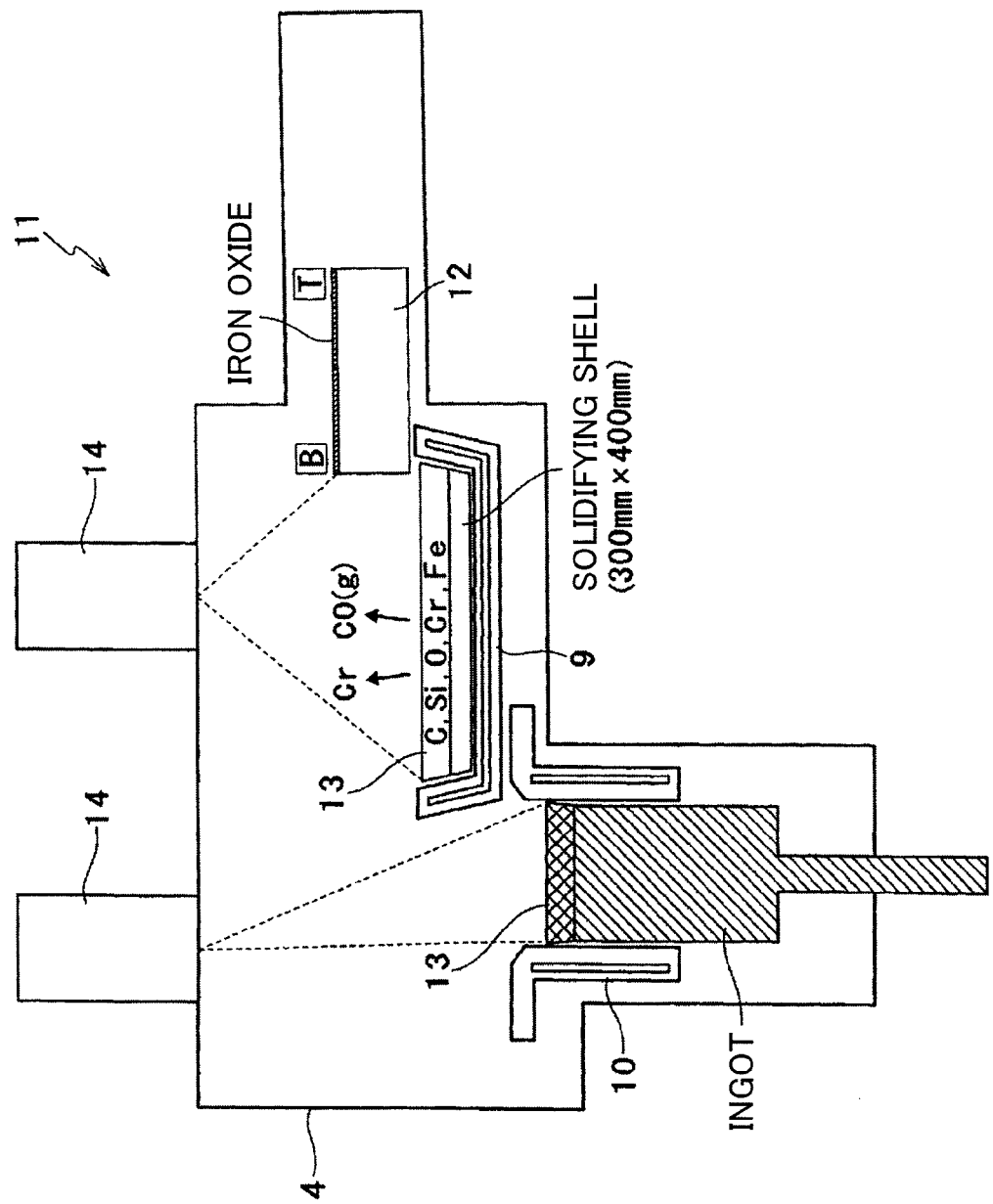
FIG. 8 is a schematic diagram illustrating a cold hearth-type electron beam melter.

FIG. 8 is a schematic diagram illustrating a cold hearth-type electron beam melter 11. For instance, the cold hearth-type electron beam melter 11 illustrated schematically in FIG. 8 can be used as the cold hearth-type electron beam melter in the method for producing alloy ingots of the present embodiment. The cold hearth-type electron beam melter 11 comprises a vacuum chamber 4; a starting material supply mechanism, not shown, that feeds a starting material electrode 12 into the vacuum chamber 4; electron guns 14 that cause the leading end portion of the starting material electrode 12 to melt, through irradiation thereonto of an electron beam indicated by a broken line in the figure; a cold hearth 9 disposed inside the vacuum chamber 4 and that holds a melt pool that is formed through melting; and a cold crucible 10 disposed inside the vacuum chamber 4 and that forms an ingot by receiving the melt that is tapped out of the cold hearth 9.

After formation of the melt pool 13 in FIG. 8, the starting material supply mechanism feeds the starting material electrode 12 together with an iron oxide, as third refining agent, to one end of the cold hearth 9. Alternatively, there may be provided additional starting material feeder for supplying the third refining agent to the cold hearth-type electron beam melter 11. Providing thus the starting material feeder allows adding the third refining agent (oxidant ($Fe_xO_y$ or the like)) to the melt pool 13 in the cold hearth 9, in accordance with the melting state of the starting material electrode 12.

The cold hearth 9 may be a vessel that does not react with the melt pool 13 or with the molten slag layer that forms around the melt pool 13. Examples of the cold hearth 9 include, for instance, a water-cooled dish-like vessel made of copper such that the inner dimensions of the melting vessel are 0.2×0.2 m or greater. That is because the refining reaction that accompanies evaporation or gasification of the impurity elements is promoted through formation of a melt pool having a large surface area/volume ratio (i.e. a shallow melt pool of large surface area), by using a water-cooled dish-like vessel made of copper and having a large surface area. The cold crucible 10 may be a crucible that does not react with the melt. Examples of the cold crucible 10 include, for instance, a lifting bottom plate-type water-cooled copper mold.

Melting and vacuum refining are performed in the cold hearth-type electron beam melter 11 using electron beams as heat source, under high vacuum. Therefore, it becomes possible to perform vacuum removal refining of nitrogen (N), manganese (Mn) and so forth that failed to be removed by removal refining of carbon, as an impurity element, to the greatest extent, or by reduction refining using a first refining agent in a cold-crucible induction melter, or by oxidation refining using a second refining agent.

The cold hearth-type electron beam melter 11 is provided with the cold hearth 9 (water-cooled dish-like vessel made of copper) having a large surface area/volume ratio compared with the cold crucible provided in a cold-crucible induction melter. Therefore, impurity elements can be removed more reliably that in a cold-crucible induction melter, in a refining reaction that accompanies gasification or evaporation.

In the present embodiment, firstly, a rod-like or block-like starting material electrode 12 (alloy starting material) is supplied from a side face opposite a tap hole of the cold hearth 9. The starting material electrode 12 melts on the cold hearth 9 through irradiation of electron beam, to form thereby the melt pool 13 (melt pool formation step). Next, the third refining agent is added to the melt pool 13, to remove carbon as impurity element present in the melt pool 13 (refining step). Next, the overspilling melt after refining is injected, through a hearth tap hole of the cold hearth 9, into the cold crucible 10 that is provided adjacent to the cold hearth 9. Thereafter, the melt in the cold crucible 10 is left to solidify to form alloy ingot (ingot formation step). Next, practical-scale elongate ingots having a finished ingot weight of 10 kg or more are prepared through successive downward drawing of the alloy ingot.

In the present embodiment there can be used, as the starting material electrode, metal, alloy or the like according to the target composition of the rod-like or block-like alloy ingot. In order to further raise the purity of the alloy ingot (to further reduce the content of impurity elements), the alloy ingot obtained in the present embodiment may also be used as the alloy starting material.

The present embodiment allows producing alloy ingots of various component compositions. For instance, there can be produced Fe-based alloy ingot, Ni-based alloy ingot, Fe—Ni-based alloy ingot or Co-based alloy ingot.

(Oxidation Refining Using a Cold Hearth-Type Electron Beam Melter)

In the present embodiment, refining through removal of carbon (C) and oxygen (O), as impurity elements, is carried out by forming the melt pool 13 in the cold hearth 9 of the cold hearth-type electron beam melter 11, followed by a refining operation that satisfies conditions (9) to (11) below. FIG. 8 depicts schematically the state of the refining in the present embodiment.

The refining conditions in the present embodiment were elucidated as a result of multiple tests and studies using the cold hearth-type electron beam melter 11 such that the ultimate vacuum in the vacuum chamber 4 was of the order of $10^{-6}$ mbar.

(9) Preparation is performed under a high vacuum atmosphere ($<5\times10^{-4}$ mbar).

That is because the higher the degree of vacuum (i.e. the lower the atmospheric pressure), the more readily the decarburization reaction is promoted. Preferably, the degree of vacuum is as high as possible, to reduce the carbon content to the utmost. The rationale for setting the degree of vacuum (atmospheric pressure) to be smaller than $5\times10^{-4}$ mbar is that a small amount of Ar gas is introduced in some instances into the vacuum chamber 4. If no inert gas such as Ar gas or the like is introduced into the vacuum chamber 4, preparation is preferably performed under an atmospheric pressure lower than $1\times10^{-4}$ mbar.

(10) As refining agent, third refining agent is used that is the second oxide containing one, two or more types from among oxides of main component element in the starting material electrode.

During production of alloy ingot using the cold-crucible induction melter 11, the decarburization reaction according to the expression below must be promoted in order to remove carbon, as impurity element, from the melt.

$$[C]+[O]\rightarrow CO(g)\uparrow$$

If the oxygen concentration in the melt pool 13 is insufficient, however, no decarburization takes place, even under a high vacuum condition such that the degree of vacuum is $<5\times10^{-4}$ mbar. Accordingly, it becomes necessary to supply the oxygen required for carbon oxidation. Electron beam melting is performed under high vacuum, and hence it is difficult to supply oxygen gas. Therefore, it is effective to supply, together with the starting material electrode, an oxygen source in the form of a solid oxide of a main component element of the starting material electrode (for instance, high-purity iron oxide or the like). Specifically, it is effective to use an oxide of a main component element of the starting material electrode as the refining agent (third refining agent) in decarburization removal refining. In this case, a solid oxide in micropowder form, for instance, an iron oxide micropowder, becomes scattered by being entrained in the gas flow at the initial vacuum evacuation stage of electron beam melting. This micropowder reaches the vacuum pump and damages the latter. Therefore, it is preferable to render beforehand the micropowder-like solid oxide into a block form. When using for instance an iron oxide micropowder as the oxide of main component element in the starting material electrode, it is preferable to perform a sintering treatment or the like beforehand, and to add the iron oxide in granulated form.

Herein, the "oxide of main component element of the starting material electrode" is a compound included in the alloy starting material electrode and being a compound of oxygen atoms and a main component element in the alloy ingot. In a case where, for instance, the alloy ingot is Fe-based alloy, the main component element in the alloy ingot is Fe, and the oxide of a main component element of the starting material electrode is an iron oxide, such as $Fe_3O_4$, $Fe_2O_3$ or the like. In a case where the alloy ingot is Fe—Ni-based alloy, the main component elements in the alloy ingot are Fe and Ni, and the oxide of a main component element of the starting material electrode is an iron oxide or a nickel oxide. In a case where the alloy ingot is Ni-based alloy, the main component element in the alloy ingot is Ni, and the oxide of a main component element of the starting material electrode is a nickel oxide. In a case where the alloy ingot is Co-based alloy, the main component element in the alloy ingot is Co, and the oxide of a main component element of the starting material electrode is a cobalt oxide. These oxides are in solid form at the point in time where the oxide is added to the melt pool. The oxide of a main component element of the starting material electrode acts as oxidant in the refining reaction (the abovementioned decarburization reaction) in the present embodiment, and is therefore an oxidant contains a metal oxide. The third refining agent, being the second oxide that acts as oxidant, may be one oxide type from among the oxides of main component element in the starting material electrode, or a combination of two or more types.

(11) The weight of the third refining agent is set to 1 to 4 times a calculated weight that is calculated in order to oxidize totally carbon from among impurity elements present in the melt pool.

The inventors studied experimentally the change in impurity element content according to the addition amount of the third refining agent, and found that the decarburization reaction becomes activated as the addition amount of the third refining agent increases gradually from 0 (zero), such that a sufficient decarburization reaction progresses when the addition weight of the third refining agent is a weight substantially equal to "a calculated weight that is calculated in order to oxidize totally carbon from among impurity elements present in the melt pool". The inventors found that the oxygen content in the ingot tended to rise when, as a result of an increase in the addition amount of the third refining agent, the addition weight of the third refining agent exceeds substantially four times the "calculated weight that is calculated in order to oxidize totally carbon from among impurity elements present in the melt pool".

Accordingly, the weight of the third refining agent was set to be 1 to 4 times the "calculated weight that is calculated in order to oxidize totally carbon from among impurity elements present in the melt pool". The inventors found that the carbon content takes on a substantially lowest value (analytical limit) and the oxygen content takes on a substantially lowest value (analytical limit) when the weight of the third refining agent is 2 to 3 times the calculated weight. Preferably, the weight of the third refining agent is 2 to 3 times the above calculated weight.

In a case where an iron oxide ($Fe_xO_y$) is used as the oxide of main component element in the starting material electrode, the addition weight $WFe_xO_y$ (kg) of iron oxide ($Fe_xO_y$) and the calculated weight MFeO (kg) of iron oxide ($Fe_xO_y$) satisfy the expression below on the basis of the above relationship.

$$1.0 \times MFeO \leq WFe_xO_y \leq 4.0 \times MFeO$$

Herein, MFeO is given by the expression below on the basis of the weight WM (kg) of the starting material electrode and the carbon content [C] (wt %) of the starting material electrode.

$$MFeO = WM/100 \times ([C]/12.01 - [O]/16.0)/y \times (55.85 \times x + 16.0 \times y)$$

Nickel oxide ($Ni_xO_y$) or the like may be used, instead of iron oxide, as the oxide of main component element in the starting material electrode. In this case, it is sufficient to use the atomic weight (58.71) of Ni instead of the atomic weight (55.85) of Fe in the above expression for calculating MFeO.

Figure 9:
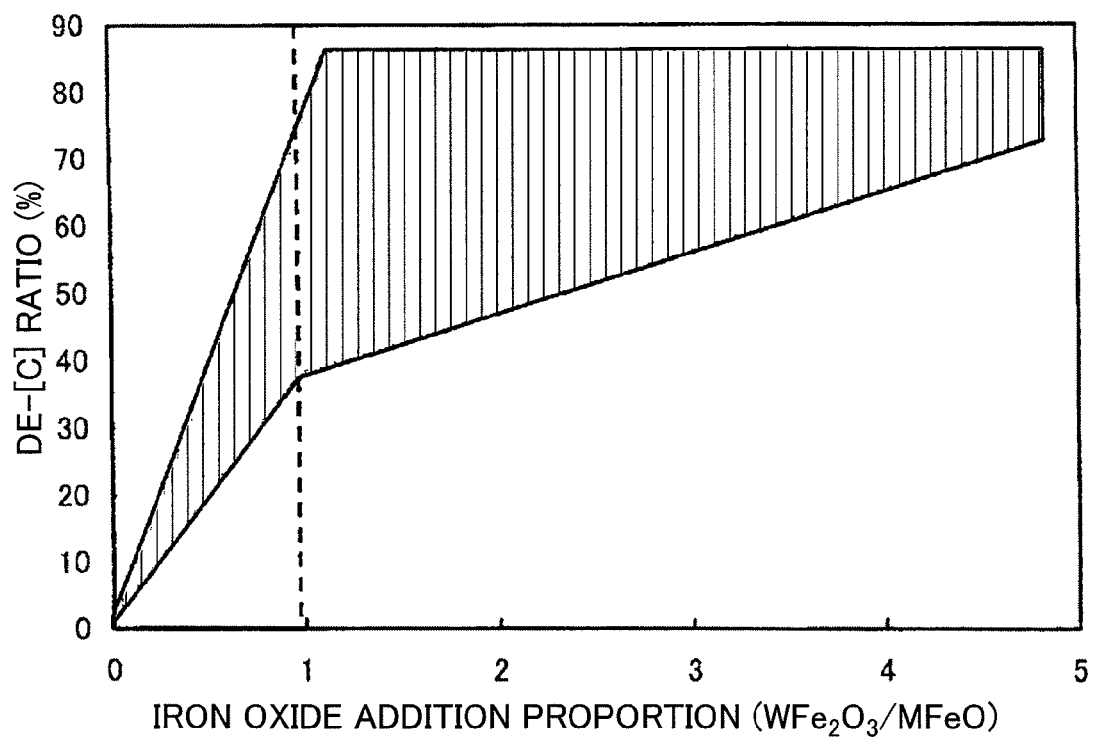
FIG. 9 is a graph illustrating the correlation between decarburization ratio and iron oxide addition proportion (WFe$_2$O$_3$/MFeO) in cold hearth-type electron beam melting oxidation refining.

There was studied a correlation relationship between a ratio of $WFe_2O_3$ with respect to MFeO (i.e. $WFe_2O_3$/MFeO, also referred to as iron oxide addition proportion), and a decarburization ratio $\eta[C] = ([C]0 - [C]EB)/[C]0 \times 100(\%)$, in a case where comparatively high-purity stainless steel was used as the starting material electrode. The results are shown in FIG. 9. The lower limit value of decarburization ratio is about 40% or greater when the iron oxide addition proportion ($WFe_2O_3$/MFeO) is 1 or greater, and the central value of the decarburization ratio is about 50% or greater. This indicates that the decarburization reaction is promoted.

The inventors found that relying on cold hearth-type electron beam melting was highly effective for separating, by floating, nonmetallic inclusions in the ingot, and also highly effective as an oxygen removal scheme. It was found that the method for producing alloy ingots of the present embodiment allows preparing alloy ingots in which $[C] \leq 10$ ppm and $[O] \leq 10$ ppm. It was likewise found that alloy ingots having [C]<5 ppm and [O]<5 ppm, at or below the analytical limit, could be prepared by optimizing the weight of the third refining agent. In many instances, manganese (Mn), as alloy component, dropped to $[Mn] \leq 0.01$ wt %, after refining, through evaporative removal during the electron beam melting process.

(Combination of the Refining Processes of the First to Third Embodiments)

Preferably, there are combined any two or more refining processes of the first to third embodiments.

Specifically, there is preferably performed a refining process that is an appropriate combination of the reduction refining process of the first embodiment (also referred to as Ca reduction refining process), and the oxidation refining process of the second embodiment (also referred to as oxidation refining process). Through reduction refining of the first embodiment, impurity elements such as phosphorus (P), sulfur (S), nitrogen (N), trace and tramp elements (Sn, Pb, As, Sb, Bi, Se and the like), boron (B) and the like are removed from melt pool 6 the components whereof are adjusted to a predetermined alloy composition. Through vacuum oxidation refining of the second embodiment, there are removed boron (B), carbon (C), silicon (Si), aluminum (Al), titanium (Ti), zirconium (Zr), calcium (Ca) and alkali metal elements.

As a result, the content of impurities such as phosphorus (P), sulfur (S), tin (Sn) and lead (Pb) can be reduced to 2 ppm or less. Also, the content of nitrogen (N) can be reduced to 5 ppm or less, and the content of silicon (Si), aluminum (Al), titanium (Ti), zirconium (Zr) and the like can be brought to 100 ppm or less. Further, the content of carbon (C) can be reduced to 50 ppm or less, and the content of silicon (Si), calcium (Ca) and the like can be reduced to 1 ppm or less.

Pick-up of elements such as C, Si, Al, Ca and the like occurs as a result of the reduction refining process of the first embodiment. Preferably, therefore, the oxidation refining process (for instance, vacuum oxidation refining process) of the second embodiment is performed after Ca reduction refining. In a case where the content of C, Si, Al, Ti and the like, which are impurity elements in the melt starting material, is remarkably large, it is effective to lower the content of C, Si, Al, Ti and the like by performing oxidation refining before Ca reduction refining.

In a case where, for instance, scrap or the like of stainless steel is used as the melt starting material (alloy starting material), the content of carbon may be high, and the content of alloy components such as Si, Al, Ti and the like may be of about 1 wt %, depending on the composition of the alloy. Also, for instance, the alloy may have added thereto about several tens of ppm of Zr, B and the like. In such cases, it is necessary to significantly increase the amount of iron oxide that is added during oxidation refining. Oxidation refining performed thus with an increased amount of added iron oxide is likely to exhibit a significantly higher [O] in the melt pool 6. When an active metal alloy element is added to the melt pool 6 having high oxygen content, in order to adjust the components incident the final alloy composition, there may occur deviations from component specifications on account of a significant drop in yield, as well as dramatic increases in the amount of nonmetallic inclusions. In such cases, oxidation refining is preferably performed divided over two times. Initially, C, Si, Al, Ti, B and the like are removed by performing oxidation refining (for instance, vacuum oxidation refining). Thereafter, P, S, Sn, Pb, N and the like are removed initially by Ca reduction refining. Thus, C, Si, Al, Ca and the like ranging from several tens to several hundred ppm, picked up during the Ca reduction refining process, are removed thereafter in a repeated (second) vacuum oxidation refining that is performed again, to preclude thereby an excessive residual oxygen O in the melt pool 6.

Thus, melting refining of ultrahigh-purity (ultralow impurity) Fe-based alloy ingots, Fe—Ni-based alloy ingots and Ni-based alloy ingots are made possible by performing refining through an appropriate combination of a Ca reduction refining process and an oxidation refining process (for instance, vacuum oxidation refining process). Alloy ingots purified to ultra-high purity can be thus produced.

Preferably, further decarburization and deoxidation are performed, according to the oxidation refining process of the third embodiment, using a secondary ingot (alloy starting material) in the form of an ingot prepared by combining the reduction refining process of the first embodiment and the oxidation refining process of the second embodiment, or an ingot resulting from alloying through addition, to the foregoing ingot, of a below-described deoxidizing element-based alloy component.

Preferably, further decarburization and deoxidation are performed, according to the oxidation refining process of the third embodiment, using a primary ingot (alloy starting material) in the form of an ingot prepared according to the oxidation refining process of the second embodiment, or an ingot resulting from alloying through addition, to the foregoing ingot, of a below-described deoxidizing element-based alloy component. Specifically, an alloy ingot is produced through removal refining of impurity elements such as C, Al, Ti, Zr, Ca, Si, B and the like by performing oxidation refining (for instance, vacuum oxidation refining) in which a second refining agent is added, using the cold-crucible induction melter 1 having a cold crucible 3 of inner diameter of ϕ200 mm or larger, with a melt pool weight of 10 kg or more. Alternatively, there is produced an ingot in which, as the case may require, a deoxidizing element-based alloy component is further added to the above alloy ingot. Preferably, removal refining is performed thereafter, by decarburization and deoxidation, according to the oxidation refining process of the third embodiment, down to [C]<10 ppm and [O]<10 ppm. It becomes possible to produce a high-purity (ultralow impurity) Fe-based alloy ingot, Fe—Ni-based alloy ingot and Ni-based alloy ingot.

The oxidation refining process in the method for producing alloy ingots of the second embodiment may follow the reduction refining process in the method for producing alloy ingots of the first embodiment. More specifically, removal refining of P, S, Sn, Pb, N, B and the like may be performed by carrying out metallic calcium reduction refining in which a first refining agent is added, with melt pool weight of 10 kg or more, using the cold-crucible induction melter 1 having the cold crucible 3 of inner diameter of ϕ200 mm or larger; thereafter, removal refining of impurity elements such as C, Al, Ti, Zr, Ca, Si, B and the like may be carried out by oxidation refining (for instance, vacuum oxidation refining) in which a second refining agent is added; and the melt after refining is left to solidify, to produce thereby an alloy ingot. Alternatively, an ingot may be produced in which, as the case may require, a below-described deoxidizing element-based alloy component is further added to the above alloy ingot. Removal refining may be performed thereafter, by decarburization and deoxidation, according to the oxidation refining process of the third embodiment, down to [C]<10 ppm and [O]<10 ppm. As a result of the above method, it becomes possible to produce a highest-purity (ultralow impurity) Fe-based alloy ingot, Fe—Ni-based alloy ingot and Ni-based alloy ingot.

(Addition of a Deoxidizing Element-Based Alloy Component)

When using an alloy starting material in the form of an ingot prepared as a result of the oxidation refining process of the second embodiment, or a ingot prepared as a result of an appropriate combination of the reduction refining process of the first embodiment and the oxidation refining process of the second embodiment, it is preferable to perform alloying (alloy formation) through addition of a deoxidizing element-based alloy component to melt pool that is formed out of the above ingot. Examples of deoxidizing element-based alloy components include, for instance, elements such as Si, Al, Ti, Zr and B. As a result there can be prepared an ultrahigh-purity (ultralow impurity) Fe-based alloy ingot, Fe—Ni-based alloy ingot or Ni-based alloy ingot of predetermined alloy composition. Preferably, Ca reduction refining and so forth is carried out in case that the content of P, S, N, Sn, Pb and the like in the ingot is high.

In a preparation of ultrahigh-purity alloy ingots, a state of abundant oxygen present in the melt pool 6 arises when vacuum oxidation refining or oxidation refining is performed as the last process. Upon addition of an active-element (deoxidizing element-based) alloy component to the melt pool 6 containing a large amount of oxygen, there is generated a deoxidation oxide of the foregoing. To separate and remove such deoxidation oxides from the melt pool 6 it is effective to add a calcium halide-based flux together with the alloy component. An appropriate addition amount of the calcium halide-based flux {Flx}M in this case ranges from about 0.5 to 2 wt %. Herein, Ca reduction refining and so forth must be carried out in case that the content of P, S, N, Sn, Pb and the like in the ingot is high.

In the present description, [X] denotes the content (concentration) of an element X comprised in an alloy (or melt), and "removal" of impurity elements from an alloy (or melt) encompasses not only instances where the impurity elements present in the alloy (or melt) are completely removed, but also instances where the content of the impurity elements is reduced. In the present description, the various elements are also denoted by element symbols. Also, ultrahigh purity means that the sum total of content of elements present in the alloy ingot from which the elements are to be removed is smaller than 100 ppm. In the first embodiment, for instance, the element to be removed is at least phosphorus. Therefore, ultrahigh purity entails satisfying [P]<100 ppm. In the second embodiment, the elements to be removed are at least carbon and calcium. Therefore, ultrahigh purity entails satisfying [C]+[Ca]<100 ppm. In the third embodiment, the elements to be removed are at least carbon and oxygen. Therefore, ultrahigh purity entails satisfying [C]+[O]<40 ppm.

EXAMPLES

The present invention is explained in more detail next based on examples, but the invention is not limited in any way by the examples. The examples can be carried out by being appropriately modified while conforming to the purpose of the subject matter set forth earlier or later in the disclosure, all such modifications being encompassed within the technical scope of the present invention.

In the examples, the refining effect of the present invention was assessed using the melter illustrated schematically in FIG. 1 and FIG. 8. An outline of the specifications of the melter follows next.

(A) Cold Crucible-Type Induction Melting (CCIM) device

| | |
|---|---|
| High-frequency power source | maximum output 400 kW, frequency: 3000 Hz |
| Cold crucible | inner diameter: ϕ220 mm, number of segments: 24, water-cooled, made of copper |
| Ultimate vacuum | $10^{-2}$ mbar level |
| Vacuum evacuation system | rotary pump and mechanical booster pump |

(B) Cold Hearth-Type Electron Beam Melting (EB CHR) device

| | |
|---|---|
| High-voltage power source | accelerating voltage: 40 kV, maximum output: 300 kW |
| Electron beam gun | 2 guns |
| Ultimate vacuum | $10^{-6}$ mbar level |
| Vacuum evacuation system | rotary pump and mechanical booster pump, diffusion pump |
| Starting material supply mechanism | maximum ϕ210 × 1000 L mm |
| Ingot drawing mechanism | maximum ϕ200 × 1000 L mm |

Example A

Reduction Refining Test Using a Cold-Crucible Induction Melter

Herein there was performed a test of reduction refining that employs a first refining agent being mixture of metallic calcium and a flux. Specifically, firstly an alloy starting material in the form of a ferrochrome material and a low-carbon steel material, as inexpensive starting materials having a substantial impurity element content, were charged into a water-cooled copper crucible (cold crucible 3), having an inner diameter of ϕ220 mm that was provided in the cold-crucible induction melter 1. Melt pools 6, having the alloy types (Fe-20Ni-25Cr, Fe-35Ni-25Cr) given in Table 1 as target compositions, were formed under argon gas atmosphere. Next, metallic calcium and a flux given in Table 1, as the first refining agent, were added to the melt pools 6, and the melt was held for 2.0 to 60.0 minutes, to perform thereby reduction refining. The phosphorus content [P]0 before refining and the phosphorus content [P]1 after refining were measured by GD-MS analysis, and the dephosphorization ratio np was worked out. The measurement results are given in Table 1 alongside the test conditions. In Table 1, $CaF_2$-20CaO denotes $CaF_2$—CaO (20 wt %), $CaF_2$-10CaO denotes $CaF_2$—CaO (10 wt %) and $CaF_2$-10CaO-10CaCl$_2$ denotes $CaF_2$—(CaO+CaCl$_2$)(20 wt %).

As Table 1 shows, the melt pool could be observed also after addition of the first refining agent in Comparative example A1 where metallic calcium addition ratio {Ca}M=0.2, but only a low dephosphorization effect could be achieved. In Example A1 having a metallic calcium addition ratio {Ca}M=0.4, by contrast, the melt pool could not be observed after addition of the first refining agent, but a sufficient dephosphorization effect was achieved. A better dephosphorization effect was achieved in Example A2 having metallic calcium addition ratio {Ca}M=1.0, i.e. an increased addition amount of metallic calcium. A very good dephosphorization effect was achieved in Examples A3 to A6, where the addition amount of metallic calcium was substantial (metallic calcium addition ratio comparatively high ({Ca}M≧0.5) and large addition amount of flux with respect to the metallic calcium (flux addition ratio {Flx}M≧{Ca}M). A very good dephosphorization effect was achieved also in a case (Example A13) of a large melt pool (50.0 kg) of 2.5-fold weight.

Focusing next on the melt hold time, an excellent dephosphorization effect was achieved by controlling appropriately the melt hold time, for every alloy type in Examples A7 to A11 (Fe-20Ni-25Cr alloys) and Examples A12 to A16 (Fe-35Ni-25Cr alloys) in which only the melt hold time was modified.

TABLE 1

| | | Melt pool weight (kg) | Metallic calcium | | Flux | | |
|---|---|---|---|---|---|---|---|
| | Alloy type | | Metallic Ca addition rate {Ca}M (wt %) | Addition weight Wca (g) | Component composition | Pre-addition rate {Flx}M0 (wt %) | Flux addition rate {Flx}M (wt %) |
| Example A1 | Fe—20Ni—25Cr | 20.0 | 0.4 | 80 | $CaF_2$—20CaO | 1.5 | 1.5 |
| Example A2 | Fe—20Ni—25Cr | 20.0 | 1.0 | 200 | $CaF_2$—20CaO | 0.0 | 0.5 |
| Example A3 | Fe—20Ni—25Cr | 20.0 | 0.6 | 120 | $CaF_2$—20CaO | 1.5 | 1.5 |
| Example A4 | Fe—20Ni—25Cr | 20.0 | 1.0 | 200 | $CaF_2$—20CaO | 1.5 | 1.5 |
| Example A5 | Fe—20Ni—25Cr | 20.0 | 1.0 | 200 | $CaF_2$—20CaO | 1.5 | 1.5 |
| Example A6 | Fe—20Ni—25Cr | 20.0 | 2.0 | 400 | $CaF_2$—20CaO | 1.5 | 1.5 |
| Example A7 | Fe—20Ni—25Cr | 20.0 | 1.0 | 200 | $CaF_2$—20CaO | 1.5 | 1.5 |
| Example A8 | Fe—20Ni—25Cr | 20.0 | 1.0 | 200 | $CaF_2$—20CaO | 1.5 | 1.5 |
| Example A9 | Fe—20Ni—25Cr | 20.0 | 1.0 | 200 | $CaF_2$—20CaO | 1.5 | 1.5 |
| Example A10 | Fe—20Ni—25Cr | 20.0 | 1.0 | 200 | $CaF_2$—20CaO | 1.5 | 1.5 |
| Example A11 | Fe—20Ni—25Cr | 20.0 | 1.0 | 200 | $CaF_2$—20CaO | 1.5 | 1.5 |
| Example A12 | Fe—35Ni—25Cr | 50.0 | 1.0 | 500 | $CaF_2$—10CaO—10CaCl$_2$ | 1.5 | 1.5 |
| Example A13 | Fe—35Ni—25Cr | 50.0 | 1.0 | 500 | $CaF_2$—10CaO | 1.5 | 1.5 |
| Example A14 | Fe—35Ni—25Cr | 50.0 | 1.0 | 500 | $CaF_2$—10CaO | 1.5 | 1.5 |
| Example A15 | Fe—35Ni—25Cr | 50.0 | 1.0 | 500 | $CaF_2$—10CaO | 1.5 | 1.5 |
| Example A16 | Fe—35Ni—25Cr | 50.0 | 1.0 | 500 | $CaF_2$—10CaO | 1.5 | 1.5 |
| Comparative example A1 | Fe—20Ni—25Cr | 20.0 | 0.2 | 40 | $CaF_2$—20CaO | 0.0 | 1.8 |

| | Flux total weight WFlx0 + WFlx (g) | Melt hold time (min) | Visual observation of melt pool after addition of metallic calcium | Refining result | | |
|---|---|---|---|---|---|---|
| | | | | Phosphorus content [P]0 before refining (wt %) | Phosphorus content [P] after refining (wt %) | Dephosphorization rate nP (%) |
| Example A1 | 600 | 10.0 | Not possible | 0.015 | 0.0090 | 40.0 |
| Example A2 | 100 | 10.0 | Not possible | 0.014 | 0.0080 | 42.9 |
| Example A3 | 600 | 10.0 | Not possible | 0.014 | 0.0040 | 71.4 |
| Example A4 | 600 | 10.0 | Not possible | 0.015 | 0.0015 | 90.0 |
| Example A5 | 600 | 10.0 | Not possible | 0.014 | 0.0050 | 64.3 |
| Example A6 | 600 | 10.0 | Not possible | 0.016 | 0.0012 | 92.5 |
| Example A7 | 600 | 2.0 | Not possible | 0.013 | 0.0090 | 30.8 |
| Example A8 | 600 | 6.0 | Not possible | 0.015 | 0.0030 | 80.0 |
| Example A9 | 600 | 10.0 | Not possible | 0.014 | 0.0012 | 91.4 |
| Example A10 | 600 | 20.0 | Not possible | 0.015 | 0.0060 | 60.0 |
| Example A11 | 600 | 30.0 | Not possible | 0.014 | 0.0090 | 35.7 |
| Example A12 | 1500 | 5.0 | Not possible | 0.011 | 0.0070 | 36.4 |
| Example A13 | 1500 | 10.0 | Not possible | 0.012 | 0.0030 | 75.0 |
| Example A14 | 1500 | 15.0 | Not possible | 0.011 | 0.0010 | 90.9 |
| Example A15 | 1500 | 30.0 | Not possible | 0.011 | 0.0020 | 81.8 |

TABLE 1-continued

| | | | | | | |
|---|---|---|---|---|---|---|
| Example A16 | 1500 | 60.0 | Not possible | 0.012 | 0.0060 | 50.0 |
| Comparative example A1 | 360 | 10.0 | Possible | 0.013 | 0.0100 | 23.1 |

Example B

Oxygen Refining Test 1 Using a Cold-Crucible Induction Melter)

An oxidation refining test was carried out using mixture (i.e. second refining agent) of a flux and iron oxide as the first oxide. Specifically, firstly an alloy starting material in the form of an ultralow-carbon steel material and a ferrochrome material (FeCr), as inexpensive starting materials having a substantial impurity element content, for instance carbon (C), silicon (Si) and the like, plus electrolytic nickel, being a high-purity starting material, were charged into a water-cooled copper crucible provided in the cold-crucible induction melter 1. Melt pools 6, having the alloy types (Fe-35Ni-25Cr, Fe-20Ni-25Cr) given in Table 2 as target compositions, were formed under an argon gas atmosphere. Next, the fluxes and iron oxides given in Table 2 were added, as the second refining agent, to the melt pools 6. Thereafter, the melt was held for 10.0 to 30.0 minutes, in an evacuated state where argon gas was evacuated to the exterior, to carry out thereby oxidation refining. The carbon content [C], silicon content [Si], calcium content [Ca] and boron content [B] after refining were measured by GD-MS analysis. The measurement results are given in Table 2 alongside the test conditions. Table 2 shows the above alloy starting materials comprised a substantial amount of carbon and silicon as impurity elements, and comprised also about 50 ppm of boron (B) as impurity element.

In Table 2, $CaF_2$-15CaO-5$CaCl_2$ denotes $CaF_2$—(CaO+$CaCl_2$) (20 wt %), $CaF_2$-20CaO denotes $CaF_2$—CaO (20 wt %), $CaF_2$-21CaO denotes $CaF_2$—CaO (21 wt %) and $CaF_2$-22CaO denotes $CaF_2$—CaO (22 wt %), respectively.

As Table 2 shows, the addition amount of iron oxide in Comparative example B1, where $WFe_3O_4/MFeO=0.15$, was too small ($WFe_3O_4/MFeO<0.2$), and hence no high decarburization effect was elicited. By contrast, Examples B1 and B2 that satisfied $WFe_3O_4/MFeO\geq 0.2$ and $\{Flx\}M\geq 0.5$ for the purpose of decarburization, exhibited a sufficient decarburization effect. Examples B3 to B5, which satisfied $WFe_3O_4/MFeO\geq 1.0$ and $\{Flx\}M\geq 3.0$, for the purpose of desiliconization (Si) and deboration (B), exhibited a sufficient decarburization effect and also satisfactory desiliconization and deboration effects. The addition amount of iron oxide in Comparative example B2, where $WFe_3O_4/MFeO=4.5$, was excessively large ($WFe_3O_4/MFeO>4$), and hence severe droplet scattering (splashing) occurred accompanying the decarburization reaction during vacuum refining, which made impossible a stable refining operation.

TABLE 2

| | | | | Iron oxide ($Fe_3O_4$) | | Flux | Flux |
|---|---|---|---|---|---|---|---|
| | Refining purpose | Alloy type | Melt pool weight (kg) | $WFe_3O_4/$ MFeO (—) | Addition weight (kg) | Component composition | addition rate (wt %) |
| Comparative example B1 | Decarburization | Fe—35Ni—25Cr | 50.0 | 0.15 | 0.087 | $CaF_2$—15CaO—5$CaCl_2$ | 0.4 |
| Example B1 | Decarburization | Fe—35Ni—25Cr | 50.0 | 0.25 | 0.151 | $CaF_2$—15CaO—5$CaCl_2$ | 0.5 |
| Example B2 | Decarburization | Fe—20Ni—25Cr | 50.0 | 0.50 | 0.277 | $CaF_2$—20CaO | 1.0 |
| Example B3 | Desiliconization and deboration | Fe—20Ni—25Cr | 50.0 | 1.00 | 0.589 | $CaF_2$—20CaO | 3.0 |
| Example B4 | Desiliconization and deboration | Fe—20Ni—25Cr | 50.0 | 2.00 | 1.181 | $CaF_2$—21CaO | 4.0 |
| Example B5 | Desiliconization and deboration | Fe—20Ni—25Cr | 50.0 | 3.00 | 1.699 | $CaF_2$—22CaO | 4.5 |
| Comparative example B2 | Desiliconization and deboration | Fe—20Ni—25Cr | 50.0 | 4.50 | 2.500 | $CaF_2$—20CaO | 5.5 |

| | Flux Addition weight (kg) | Melt pool vacuum hold time (min) | State during vacuum oxidation refining | Impurity element content after refining (wt %) | | | |
|---|---|---|---|---|---|---|---|
| | | | | [C] | [Si] | [Ca] | [B] |
| Comparative example B1 | 0.2 | 15.0 | No splashing | 0.013 | 0.23 | 0.001 | 0.0010 |
| Example B1 | 0.3 | 15.0 | Splashing | 0.008 | 0.22 | 0.0002 | 0.0090 |
| Example B2 | 0.5 | 30.0 | Splashing | 0.004 | 0.17 | <0.0001 | 0.0070 |
| Example B3 | 1.5 | 20.0 | Splashing | 0.003 | 0.10 | <0.0001 | 0.0010 |
| Example B4 | 2.0 | 20.0 | Splashing | 0.003 | <0.01 | <0.0001 | 0.0003 |
| Example B5 | 2.3 | 22.0 | Splashing | 0.002 | <0.01 | <0.0001 | <0.0001 |
| Comparative example B2 | 2.8 | 10.0 | The flux failed to melt completely. The operation was discontinued on account of violent splashing. | | | | |

TABLE 2-continued

| | Starting material history | Ingot weight (kg) | Content of impurity elements before testing (wt %) | | | | | | MFeO (kg) |
| | | | [C] | [Si] | [B] | [Al] | [Ti] | [Ca] | [O] | |
|---|---|---|---|---|---|---|---|---|---|---|
| Comparative example B1 | Blend of inexpensive starting material (low-carbon steel, ferrochrome) and electrolytic nickel | 50 | 0.020 | 0.23 | 0.005 | 0.03 | 0.001 | 0.001 | 0.008 | 0.578 |
| Example B1 | Blend of inexpensive starting material (low-carbon steel, ferrochrome) and electrolytic nickel | 50 | 0.018 | 0.24 | 0.004 | 0.04 | 0.001 | 0.001 | 0.009 | 0.604 |
| Example B2 | Blend of inexpensive starting material (low-carbon steel, ferrochrome) and electrolytic nickel | 50 | 0.019 | 0.22 | 0.005 | 0.03 | 0.001 | 0.001 | 0.009 | 0.553 |
| Example B3 | Blend of inexpensive starting material (low-carbon steel, ferrochrome) and electrolytic nickel | 50 | 0.018 | 0.23 | 0.005 | 0.04 | 0.001 | 0.001 | 0.008 | 0.589 |
| Example B4 | Blend of inexpensive starting material (low-carbon steel, ferrochrome) and electrolytic nickel | 50 | 0.019 | 0.24 | 0.004 | 0.03 | 0.001 | 0.001 | 0.009 | 0.590 |
| Example B5 | Blend of inexpensive starting material (low-carbon steel, ferrochrome) and electrolytic nickel | 50 | 0.017 | 0.22 | 0.005 | 0.04 | 0.001 | 0.001 | 0.008 | 0.566 |
| Comparative example B2 | Blend of inexpensive starting material (low-carbon steel, ferrochrome) and electrolytic nickel | 50 | 0.019 | 0.23 | 0.004 | 0.04 | 0.001 | 0.001 | 0.009 | 0.586 |

Example C

Oxygen Refining Test 2 Using a Cold-Crucible Induction Melter

A reduction refining test using the same cold-crucible induction melter as in Example A was performed employing a ferrochrome material, an ultralow carbon steel material and electrolytic nickel as alloy starting materials, and there was prepared a alloy ingot (primary ingot). Using this primary ingot as alloy starting material, an oxidation refining test was performed in the same way as in Example B under the test conditions of Table 3, instead of the test conditions of Table 2. The contents of carbon, silicon, calcium and boron after refining were measured by GD-MS analysis. The measurement results are given in Table 3 alongside the test conditions.

As Table 3 shows, the addition amount of iron oxide in Comparative example C1, where $WFe_3O_4/MFeO=0.1$, was too small ($WFe_3O_4/MFeO<0.2$), and hence no high decarburization effect was elicited. By contrast, Examples C1 and C2 that satisfied $WFe_3O_4/MFeO\geqq0.2$ and $\{Flx\}M\geqq0.5$ for the purpose of decarburization, exhibited a sufficient decarburization effect. Examples C3 to C5, which satisfied $WFe_3O_4/MFeO\geqq1.0$ and $\{Flx\}M\geqq3.0$, for the purpose of desiliconization (Si) and deboration (B), exhibited a sufficient decarburization effect and also satisfactory desiliconization and deboration effects. The addition amount of iron oxide in Comparative example C2, where $WFe_3O_4/MFeO=5.0$, was excessively large ($WFe_3O_4/MFeO>4$), and hence severe droplet scattering (splashing) occurred accompanying the decarburization reaction during vacuum refining, which made impossible a stable refining operation.

TABLE 3

| | | | | Iron oxide (Fe₃O₄) | | | Flux | |
| | Refining purpose | Alloy type | Melt pool weight (kg) | $WFe_3O_4/MFeO$ (—) | Addition weight (kg) | Component composition | Flux addition rate (wt %) |
|---|---|---|---|---|---|---|---|
| Comparative example C1 | Decarburization | Fe—20Ni—25Cr | 50.0 | 0.1 | 0.038 | CaF₂—20CaO | 0.3 |
| Example C1 | Decarburization | Fe—20Ni—25Cr | 50.0 | 0.2 | 0.077 | CaF₂—20CaO | 0.5 |
| Example C2 | Decarburization | Fe—20Ni—25Cr | 50.0 | 0.5 | 0.201 | CaF₂—20CaO | 1.0 |
| Example C3 | Desiliconization and deboration | Fe—20Ni—25Cr | 50.0 | 1.0 | 0.379 | CaF₂—20CaO | 3.0 |
| Example C4 | Desiliconization and deboration | Fe—20Ni—25Cr | 50.0 | 2.0 | 0.766 | CaF₂—21CaO | 4.0 |
| Example C5 | Desiliconization and deboration | Fe—20Ni—25Cr | 50.0 | 3.0 | 1.138 | CaF₂—22CaO | 4.5 |
| Comparative example C2 | Desiliconization and deboration | Fe—20Ni—25Cr | 50.0 | 5.0 | 2.500 | CaF₂—20CaO | 5.0 |

| | Flux Addition weight (kg) | Melt pool vacuum hold time (min) | State during vacuum oxidation refining | Impurity element content after refining (wt %) | | | |
| | | | | [C] | [Si] | [Ca] | [B] |
|---|---|---|---|---|---|---|---|
| Comparative example C1 | 0.2 | 15.0 | No splashing | 0.013 | 0.23 | 0.001 | 0.0010 |

TABLE 3-continued

| | | | | | | | |
|---|---|---|---|---|---|---|---|
| Example C1 | 0.3 | 15.0 | Splashing | 0.008 | 0.22 | 0.0002 | 0.0090 |
| Example C2 | 0.5 | 30.0 | Splashing | 0.004 | 0.17 | <0.0001 | 0.0070 |
| Example C3 | 1.5 | 20.0 | Splashing | 0.003 | 0.10 | <0.0001 | 0.0010 |
| Example C4 | 2.0 | 20.0 | Splashing | 0.003 | <0.01 | <0.0001 | 0.0003 |
| Example C5 | 2.3 | 22.0 | Splashing | 0.002 | <0.01 | <0.0001 | <0.0001 |
| Comparative example C2 | 2.5 | 10.0 | The operation was discontinued on account of violent splashing. | | | | |

| | Starting material history | Ingot weight (kg) | Content of impurity elements before testing (wt %) | | | | | | | MFeO (kg) |
|---|---|---|---|---|---|---|---|---|---|---|
| | | | [C] | [Si] | [B] | [Al] | [Ti] | [Ca] | [O] | |
| Comparative example C1 | Reduction refining of inexpensive starting material with first refining agent | 50.0 | 0.018 | 0.23 | 0.001 | 0.02 | 0.01 | 0.04 | 0.0005 | 0.377 |
| Example C1 | Reduction refining of inexpensive starting material with first refining agent | 50.0 | 0.019 | 0.22 | 0.001 | 0.03 | 0.01 | 0.04 | 0.0005 | 0.385 |
| Example C2 | Reduction refining of inexpensive starting material with first refining agent | 50.0 | 0.017 | 0.24 | 0.001 | 0.03 | 0.01 | 0.04 | 0.0005 | 0.401 |
| Example C3 | Reduction refining of inexpensive starting material with first refining agent | 50.0 | 0.019 | 0.23 | 0.001 | 0.02 | 0.01 | 0.04 | 0.0005 | 0.379 |
| Example C4 | Reduction refining of inexpensive starting material with first refining agent | 50.0 | 0.018 | 0.22 | 0.001 | 0.03 | 0.01 | 0.04 | 0.0005 | 0.383 |
| Example C5 | Reduction refining of inexpensive starting material with first refining agent | 50.0 | 0.019 | 0.23 | 0.001 | 0.02 | 0.01 | 0.04 | 0.0005 | 0.379 |
| Comparative example C2 | Reduction refining of inexpensive starting material with first refining agent | 50.0 | 0.018 | 0.24 | 0.001 | 0.03 | 0.01 | 0.04 | 0.0005 | 0.403 |

Example D

Test 1 by Cold Hearth-Type Electron Beam Melting

An oxidation refining test was performed using a second oxide, as third refining agent. Specifically, firstly a starting material electrode 12 was supplied up to a side face opposite a tap hole of the cold hearth 9 by the starting material supply mechanism of the cold hearth-type electron beam melter 11, and melt pool 13 having an alloy type (Fe-20Ni-25Cr) given in Table 4 as the target composition was formed on the cold hearth 9 under a vacuum atmosphere such that the degree of vacuum was smaller than $5 \times 10^{-4}$ mbar. Next, $Fe_2O_3$ (second oxide) in granular form resulting from sintering a microparticulate $Fe_2O_3$ powder at 1250° C., was added, as the third refining agent, to the melt pool 13 on the cold hearth 9, to perform thereby oxidation refining. The carbon content [C] and oxygen content [O] after refining were measured by GD-MS analysis. The measurement results are given in Table 4 alongside the test conditions.

The content (wt %) of impurity elements in the starting material electrode 12 before the test was [C]=0.005, [O]=0.003. The MFe0 amount as calculated from the content of impurity elements was 0.011 kg.

As Table 4 shows, Comparative example D1, where $WFe_2O_3/MFeO=0.5$, failed to exhibit a high decarburization effect. This can be attributed to the fact that the addition amount of iron oxide was too small and thus the amount of $Fe_2O_3$ was smaller ($WFe_2O_3/MFeO<1$) than the oxygen amount required for the expected decarburization reaction, so that, as a result, the progress of the decarburization reaction was insufficient.

By contrast, Examples D1 to D4, which satisfied $1 \leq WFe_2O_3/MFeO \leq 4$, exhibited sufficient decarburization and deoxidation effects. In particular, Examples D2 and D3, which satisfied $2 \leq WFe_2O_3/MFeO \leq 3$, exhibited very good decarburization and deoxidation effects, in that the sum total of carbon content and oxygen content was smaller than 15 ppm.

Comparative example D2, where $WFe_2O_3/MFeO=5.0$, exhibited a sufficient decarburization effect, but no deoxidation effect at all, such that the oxygen content increased with respect to that before refining. This can be attributed to the excessively large addition amount of iron oxide, in that the amount of $Fe_2O_3$ ($WFe_2O_3/MFeO>4$) was larger than the oxygen amount as required for the expected decarburization reaction, i.e. oxygen was supplied in excess of the amount consumed in the decarburization reaction.

TABLE 4

| | | Melt weight (kg) | Iron oxide ($Fe_2O_3$) | | State during vacuum oxidation refining | Impurity element content after refining (wt %) | |
|---|---|---|---|---|---|---|---|
| | Alloy type | | $WFe_2O_3/MFeO$ (—) | Addition weight (kg) | | [C] | [O] |
| Comparative example D1 | Fe—20Ni—25Cr | 50.0 | 0.5 | 0.0055 | No splashing | 0.0040 | 0.0015 |

TABLE 4-continued

| | | Iron oxide (Fe$_2$O$_3$) | | | Impurity element content after refining (wt %) | |
|---|---|---|---|---|---|---|
| | | | | | | |
| | Alloy type | Melt weight (kg) | WFe$_2$O$_3$/ MFeO (—) | Addition weight (kg) | State during vacuum oxidation refining | [C] [O] |
| Example D1 | Fe—20Ni—25Cr | 50.0 | 1.0 | 0.0111 | Splashing | 0.0010 0.0010 |
| Example D2 | Fe—20Ni—25Cr | 50.0 | 2.0 | 0.0222 | Splashing | 0.0008 0.0007 |
| Example D3 | Fe—20Ni—25Cr | 50.0 | 3.0 | 0.0332 | Splashing | <0.0005 <0.0005 |
| Example D4 | Fe—20Ni—25Cr | 50.0 | 4.0 | 0.0443 | Splashing | <0.0005 0.002 |
| Comparative example D2 | Fe—20Ni—25Cr | 50.0 | 5.0 | 0.0554 | Splashing | 0.0005 0.009 |

Example E

Test 2 by Cold Hearth-Type Electron Beam Melting

An oxidation refining test using the same cold-crucible induction melter as in Example B was performed employing a ferrochrome material, an ultralow carbon steel material and electrolytic nickel as alloy starting materials, and there was prepared a alloy ingot (primary ingot). Next, an oxidation refining test by cold hearth-type electron beam melting was performed in the same way as in Example D, using this primary ingot as starting material electrode, but now under the test conditions of Table 5 instead of the test conditions of Table 4. The carbon and oxygen contents after refining were measured by GD-MS analysis. The measurement results are given in Table 5 alongside the test conditions.

The content (wt %) of impurity elements in the starting material electrode 12 before the test was [C]=0.0045, [O]=0.0025. The MFeO amount as calculated from the content of impurity elements was 0.011 kg.

As Table 5 shows, Comparative example E1, where WFe$_2$O$_3$/MFeO=0.80, failed to exhibit a high decarburization effect. This can be attributed to the fact that the addition amount of iron oxide was too small and thus the amount of Fe$_2$O$_3$ was smaller (WFe$_2$O$_3$/MFeO<1) than the oxygen amount required for the expected decarburization reaction, so that, as a result, the progress of the decarburization reaction was insufficient.

By contrast, Examples E1 to E4, which satisfied $1 \leq \text{WFe}_2\text{O}_3/\text{MFeO} \leq 4$, exhibited sufficient decarburization and deoxidation effects. In particular, Examples E2 and E3, which satisfied $2 \leq \text{WFe}_2\text{O}_3/\text{MFeO} \leq 3$, exhibited very good decarburization and deoxidation effects, in that the sum total of carbon content and oxygen content was 15 ppm or less.

Comparative example E2, where WFe$_2$O$_3$/MFeO=5.00, exhibited a sufficient decarburization effect, but no deoxidation effect at all, such that the oxygen content increased with respect to that before refining. This can be attributed to the excessively large addition amount of iron oxide, in that the amount of Fe$_2$O$_3$ (WFe$_2$O$_3$/MFeO>4) was larger than the oxygen amount as required for the expected decarburization reaction, i.e. oxygen was supplied in excess of the amount consumed in the decarburization reaction.

TABLE 5

| | | Iron oxide (Fe$_2$O$_3$) | | | Impurity element content after refining (wt %) | |
|---|---|---|---|---|---|---|
| | Alloy type | Melt weight (kg) | WFe$_2$O$_3$/ MFeO (—) | Addition weight (kg) | State during vacuum oxidation refining | [C] [O] |
| Comparative example E1 | Fe—35Ni—25Cr | 50.0 | 0.80 | 0.0089 | No splashing | 0.0030 0.0015 |
| Example E1 | Fe—35Ni—25Cr | 50.0 | 1.20 | 0.0133 | Splashing | 0.0010 0.0010 |
| Example E2 | Fe—35Ni—25Cr | 50.0 | 2.00 | 0.0222 | Splashing | 0.0008 0.0007 |
| Example E3 | Fe—35Ni—25Cr | 50.0 | 3.00 | 0.0332 | Splashing | <0.0005 <0.0005 |
| Example E4 | Fe—35Ni—25Cr | 50.0 | 4.00 | 0.0443 | Splashing | <0.0005 0.0025 |
| Comparative example E2 | Fe—35Ni—25Cr | 50.0 | 5.00 | 0.0554 | Splashing | 0.0005 0.0080 |

Example F

Test 3 by Cold Hearth-Type Electron Beam Melting

An reduction refining similar to that of Example A and an oxidation refining similar to that of Example B were performed in a cold-crucible induction melter, using a ferrochrome material, an ultralow carbon steel material and electrolytic nickel as alloy starting materials, to prepare an alloy ingot. Next, an oxidation refining test by cold hearth-type electron beam melting was performed in the same way as in Example D, using this ingot as starting material electrode, but now under the test conditions of Table 6 instead of the test conditions of Table 4. The carbon and oxygen contents after refining were measured by GD-MS analysis. The measurement results are given in Table 6 alongside the test conditions.

The content (wt %) of impurity elements in the starting material electrode 12 before the test was [C]=0.005, [O]=0.003. The MFeO amount as calculated from the content of impurity elements was 0.011 kg.

As Table 6 shows, Comparative example F1, where WFe$_2$O$_3$/MFeO=0.5, failed to exhibit a high decarburization effect. This can be attributed to the fact that the addition amount of iron oxide was too small and thus the amount of Fe$_2$O$_3$ was smaller (WFe$_2$O$_3$/MFeO<1) than the oxygen amount required for the expected decarburization reaction, so that, as a result, the progress of the decarburization reaction was insufficient.

By contrast, Examples F1 to F4, which satisfied $1 \leq WFe_2O_3/MFeO \leq 4$, exhibited sufficient decarburization and deoxidation effects. In particular, Examples F2 and F3, which satisfied $2 \leq WFe_2O_3/MFeO \leq 3$, exhibited very good decarburization and deoxidation effects, in that the sum total of carbon content and oxygen content was 15 ppm or less.

Comparative example F2, where $WFe_2O_3/MFeO=5.0$, exhibited a sufficient decarburization effect, but no deoxidation effect at all, such that the oxygen content increased with respect to that before refining. This can be attributed to the excessively large addition amount of iron oxide, in that the amount of $Fe_2O_3$ ($WFe_2O_3/MFeO>4$) was larger than the oxygen amount as required for the expected decarburization reaction, i.e. oxygen was supplied in excess of the amount consumed in the decarburization reaction.

melter 1. Using these secondary ingots as alloy starting materials, finished ingots were produced then by vacuum oxidation refining (EB oxidation refining) that satisfied conditions (9) to (11) set forth in the third embodiment, in the cold hearth-type electron beam melter 11 having the water-cooled dish-like vessel 9 made of copper. The impurity element contents in the finished ingots were measured in accordance with ordinary chemical analysis methods for steel materials, and in accordance with GD-MS analysis, suitable for microanalysis. In the chemical analysis methods, all the ingots exhibited [P]<2 ppm (equal to or lower than the analytical limit value), and [P]=1.54 ppm and [P]=0.65 ppm by GD-MS analysis. The contents of other impurity elements (analysis values) measured by GD-MS analysis are given in Table 7. For comparison purposes, Table 7 shows also results

TABLE 6

| | Alloy type | Melt weight (kg) | Iron oxide ($Fe_2O_3$) | | | | Impurity element content after refining (wt %) | |
| | | | $WFe_2O_3/MFeO$ (—) | Addition weight (kg) | State during vacuum oxidation refining | | [C] | [O] |
|---|---|---|---|---|---|---|---|---|
| Comparative example F1 | Fe—20Ni—25Cr | 50.0 | 0.5 | 0.0055 | No splashing | | 0.0040 | 0.0015 |
| Example F1 | Fe—20Ni—25Cr | 50.0 | 1.0 | 0.0111 | Splashing | | 0.0010 | 0.0010 |
| Example F2 | Fe—20Ni—25Cr | 50.0 | 2.0 | 0.0222 | Splashing | | 0.0008 | 0.0007 |
| Example F3 | Fe—20Ni—25Cr | 50.0 | 3.0 | 0.0332 | Splashing | | <0.0005 | <0.0005 |
| Example F4 | Fe—20Ni—25Cr | 50.0 | 4.0 | 0.0443 | Splashing | | <0.0005 | 0.002 |
| Comparative example F2 | Fe—20Ni—25Cr | 50.0 | 5.0 | 0.0554 | Splashing | | 0.0005 | 0.009 |

Example G

Comparison of Impurity Element Contents

As explained in detail below, the content of impurity elements of two types of ultrahigh-purity stainless steel ingots (Fe-20Ni-25Cr-0.2Ti and Fe-35Ni-25Cr-0.2Ti) prepared by combining the method for producing alloy ingots according to the first to third embodiments were compared with the content of impurity elements of a conventional high-purity ingot. Details will be explained below.

Firstly, primary ingots of Fe-20Ni-25Cr-0.2Ti and Fe-35Ni-25Cr-0.2Ti were respectively produced by performing reduction refining (CCIM reduction refining) in which a refining agent was added that satisfied conditions (1) to (4) set forth in the first embodiment, using alloy starting materials in the form of a low-carbon steel material (converter material) and a ferrochrome material having large impurity element contents, and employing the cold-crucible induction melter 1 having a ϕ220 mm water-cooled copper crucible 3. Using these primary ingots as alloy starting materials, secondary ingots were produced next by performing vacuum oxidation refining (CCIM oxidation refining) in which a refining agent was added that satisfied conditions (5) to (8) set forth in the second embodiment, employing the cold-crucible induction of measurements of impurity element content in a commercially available stainless steel material (SUS304ULC) and a conventional high-purity ingot (prepared by vacuum induction melting—electron beam (VIM-EB) using electrolytic iron, electrolytic nickel and metallic chromium as melt starting materials). Table 7 shows that an ingot of higher purity (impurity-free ingot) can be produced by combining the methods for producing alloy ingots according to the first to third embodiments. Specifically, refining in the first embodiment is very effective for removing P and S, and removing trace and tramp elements such as Sn, Sb, Pb and the like. The enhanced purity vis-à-vis that of a conventional high-purity ingot can be gleaned from Table 7. Although nitrogen cannot be analyzed by GD-MS analysis, chemical analysis methods showed that nitrogen was removed down to less than 5 ppm, i.e. [N]<5 ppm, which is the analytical limit, in all the above finished ingots.

Herein, GD-MS analysis refers to an analysis method known as glow-discharge mass spectrometry, being an analysis method that enables microanalysis of, for instance, metal elements, semiconductor elements and insulator elements down to the level of about 0.01 ppm. For instance, GD-MS analysis is used for microanalysis of semiconductor materials and the like.

TABLE 7

| Impurity element | Commercial material SUS304ULC | (Conventional method) VIM-EB Fe—25Cr—35Ni—0.2Ti | (Present invention) CCIM Reduction refining, CCIM Oxidation refining, and then, EB Oxidation refining | |
|---|---|---|---|---|
| | | | Fe—20Ni—25Cr—0.2Ti | Fe—35Ni—25Cr—0.2Ti |
| B | 0.15 | 0.21 | 0.05 | 0.19 |
| Na | <0.01 | <0.01 | <0.01 | <0.01 |

TABLE 7-continued

| Impurity element | Commercial material SUS304ULC | (Conventional method) VIM-EB Fe—25Cr—35Ni—0.2Ti | (Present invention) CCIM Reduction refining, CCIM Oxidation refining, and then, EB Oxidation refining | |
|---|---|---|---|---|
| | | | Fe—20Ni—25Cr—0.2Ti | Fe—35Ni—25Cr—0.2Ti |
| P | 17.28 | 5.25 | 1.54 | 0.65 |
| S | 14.62 | 12.60 | 0.09 | 0.73 |
| Ca | <0.05 | <0.05 | <0.05 | <0.05 |
| Zn | 0.26 | <0.05 | <0.05 | <0.05 |
| As | 2.45 | 0.25 | <0.05 | <0.05 |
| Se | <0.05 | <0.05 | <0.05 | <0.05 |
| Sn | 3.16 | 6.13 | <0.1 | <0.1 |
| Sb | 0.28 | 1.2 | <0.01 | <0.01 |
| Te | <0.05 | <0.05 | <0.05 | <0.05 |
| Pb | 0.12 | 0.33 | <0.005 | <0.005 |
| Bi | <0.01 | <0.01 | <0.01 | <0.01 |

Units: wt ppm (parts per million by weight)

As described in detail above, an aspect of the present invention is a method for producing alloy ingot, comprising: a step of charging alloy starting material into a cold crucible in a cold-crucible induction melter, and forming melt pool of the alloy starting material by induction heating in inert gas atmosphere; a step of continuing the induction heating and adding first refining agent to the melt pool, and then reducing the content of at least phosphorus from among impurity elements present in the melt pool; and a step of forming alloy ingot by solidifying the melt, the phosphorus content of which has been reduced, wherein the first refining agent is mixture of metallic calcium and flux containing calcium halide; the flux contains calcium fluoride and at least one of calcium oxide and calcium chloride, with a proportion of a total weight of the calcium oxide and the calcium chloride with respect to a weight of the calcium fluoride ranging from 5 to 30 wt %; and a proportion of a weight of the metallic calcium in the first refining agent with respect to a weight of the melt pool before adding the first refining agent is 0.4 wt % or greater.

The above method enables practical-scale production of alloy ingots, having a weight of for instance of 10 kg or more, and having an extremely low content of phosphorus (P).

In the above production method, preferably, the proportion of a weight of the flux in the first refining agent with respect to the weight of the melt pool before adding the first refining agent is equal to or greater than the proportion of a weight of the metallic calcium in the first refining agent with respect to the weight of the melt pool.

Evaporative loss of metallic calcium is significantly reduced thanks the above method. As a result, this allows preparing an alloy ingot having a yet lower content of phosphorus (P).

In the above production method, preferably, the melt pool is held by continuing the induction heating from a point in time at which the first refining agent is added to the melt pool up to a predetermined point in time between t1 to t2, in the step of reducing the content of phosphorus. The t1 denotes a point in time by which there has elapsed half the time until fusion of all the first refining agent from the point in time at which the first refining agent is added to the melt pool, and the t2 denotes the point in time by which there has elapsed a time over which half the metallic calcium in the first refining agent evaporates, from the point in time at which the first refining agent is added to the melt pool.

The above method allows managing quantitatively an appropriate melt hold time. A yet higher dephosphorization ratio and higher denitrification ratio can be achieved as a result.

In the above production method, preferably, a process from the step of forming the melt pool up to the step of forming alloy ingot is performed at least once after the step of forming alloy ingot, by using the alloy ingot as alloy starting material.

The method allows producing, in a practical scale, alloy ingots having yet lower phosphorus (P) and nitrogen (N) contents.

The above production method, preferably, further comprises: a step of charging into the cold crucible the alloy ingot formed by solidification, as primary ingot, and forming melt pool of the primary ingot out of the primary ingot by induction heating in inert gas atmosphere; a step of continuing the induction heating and adding second refining agent to the melt pool of the primary ingot, and then reducing the content of at least carbon and calcium from among impurity elements present in the melt pool; and a step of forming alloy ingot by solidifying the melt, the carbon and calcium content of which has been reduced, wherein the second refining agent is mixture of the flux and first oxide containing one, two or more types of oxides of main component element in the primary ingot; a weight of the first oxide in the second refining agent ranges from 0.2 to 4 times a calculated weight that is calculated in order to oxidize totally at least carbon and calcium from among impurity elements present in the melt pool of the primary ingot; and a proportion of the weight of the flux in the second refining agent with respect to a weight of the melt pool of the primary ingot before adding the second refining agent ranges from 0.5 to 5 wt %.

The method allows reliably performing removal refining of carbon (C) and calcium (Ca) as impurity elements, and allows therefore producing practical-scale ingots having an extremely low content of carbon, calcium and phosphorus.

In this case, preferably, the second refining agent is added to the melt pool of the primary ingot, and thereafter, the melt pool of the primary ingot is held by continuing the induction heating for 15 minutes or longer in evacuated state resulting from evacuating inert gas to the exterior, in the step of reducing the content of carbon and calcium. This allows further decreasing the oxide in the melt.

The above production method, preferably, further comprises: a step of charging into the cold crucible, as secondary ingot, the alloy ingot formed by solidification of the melt, the carbon and calcium content of which has been reduced, and forming melt pool of the secondary ingot out of the secondary ingot by induction heating in inert gas atmosphere; a step of continuing the induction heating and adding deoxidizing element-based alloy component into the melt pool of the secondary ingot thereby to form alloy; and a step of forming alloy ingot by solidifying the melt that forms the alloy.

The above production method, preferably, further comprises: a step of supplying into a cold hearth-type electron beam melter the alloy ingot formed by solidification, as starting material electrode, and irradiating electron beam onto the electrode of the starting material under atmospheric pressure lower than $5\times10^{-4}$ mbar, and then forming melt pool of the starting material electrode in a cold hearth in the cold hearth-type electron beam melter; a step of adding third refining agent to the melt pool of the starting material electrode, and then reducing the content of carbon as impurity element present in the melt pool; and a step of forming alloy ingot by solidifying the melt, the carbon content of which has been reduced, wherein the third refining agent is second oxide containing one, two or more types from among oxides of main component element in the starting material electrode; and a weight of the third refining agent is 1 to 4 times a calculated weight that is calculated in order to oxidize totally carbon from among the impurity elements present in the melt pool of the starting material electrode.

The method allows performing reliably removal refining of carbon (C) and oxygen (O) as impurity elements, and allows therefore producing practical-scale ingots having an extremely low content of carbon, oxygen and phosphorus.

Another aspect of the present invention is a method for producing alloy ingot, comprising: a step of charging alloy starting material into a cold crucible in a cold-crucible induction melter, and forming melt pool of the alloy starting material by induction heating in inert gas atmosphere; a step of continuing the induction heating and adding second refining agent to the melt pool, and thereafter, continuing the induction heating for 15 minutes or longer in evacuated state resulting from evacuating inert gas to the exterior, and then reducing the content of at least carbon and calcium from among impurity elements present in the melt pool; and a step of forming alloy ingot by solidifying the melt, the carbon and calcium content of which has been reduced, wherein the second refining agent is mixture of flux and first oxide containing one, two or more types from among oxides of main component element in the alloy starting material; the flux contains calcium fluoride and at least one of calcium oxide and calcium chloride, with a proportion of a total weight of the calcium oxide and the calcium chloride with respect to a weight of the calcium fluoride ranging from 5 to 30 wt %; and a weight of the first oxide in the second refining agent ranges from 0.2 to 4 times a calculated weight that is calculated in order to oxidize totally at least carbon and calcium from among impurity elements present in the melt pool; and a proportion of a weight of the flux in the second refining agent with respect to a weight of the melt pool before addition of the second refining agent ranges from 0.5 to 5 wt %.

The above method enables practical-scale production of alloy ingots, having a weight of for instance of 10 kg or more, and having an extremely low content of carbon (C) and calcium (Ca).

In the above production method, preferably, the flux is mixture of calcium fluoride and calcium oxide, with a proportion of a weight of the calcium oxide with respect to a weight of the calcium fluoride ranging from 5 to 30 wt %, or mixture of calcium fluoride, calcium oxide and calcium chloride, with a proportion of a total weight of the calcium oxide and the calcium chloride with respect to a weight of the calcium fluoride ranging from 5 to 30 wt %; the weight of the first oxide in the second refining agent ranges from 2 to 4 times a calculated weight that is calculated in order to oxidize totally at least carbon, calcium, aluminum and silicon from among impurity elements present in the melt pool; and the proportion of the weight of the flux in the second refining agent with respect to the weight of the melt pool before addition of the second refining agent ranges from 3 to 5 wt %.

The above method allows performing, more reliably, removal refining of carbon (C) and calcium (Ca), as impurity elements, and allows removing also silicon (Si) as impurity element. Therefore, the method allows producing practical-scale ingots having a yet lower content of carbon and calcium phosphorus, and having a low content of silicon.

The above production method, preferably, further comprises: a step of charging into the cold crucible, as primary ingot, the alloy ingot formed by solidification of the melt, the content of carbon and calcium of which has been reduced, and forming melt pool of the primary ingot out of the primary ingot by induction heating in inert gas atmosphere; a step of continuing the induction heating and adding deoxidizing element-based alloy component into the melt pool of the primary ingot thereby to form alloy; and a step of forming alloy ingot by solidifying the melt that forms the alloy.

The above production method, preferably, further comprises: a step of supplying into a cold hearth-type electron beam melter the alloy ingot formed by solidification, as starting material electrode, and irradiating electron beam onto the electrode of the starting material under atmospheric pressure lower than $5\times10^{-4}$ mbar, and then forming melt pool of the starting material electrode in a cold hearth in the cold hearth-type electron beam melter; a step of adding third refining agent to the melt pool of the starting material electrode, and then reducing the content of carbon as impurity element present in the melt pool; and a step of forming alloy ingot by solidifying the melt, the carbon content of which has been reduced, wherein the third refining agent is second oxide containing one, two or more types from among oxides of main component element in the starting material electrode; and a weight of the third refining agent is 1 to 4 times a calculated weight that is calculated in order to oxidize totally carbon from among the impurity elements present in the melt pool of the starting material electrode.

The method allows performing reliably removal refining of carbon (C) and oxygen (O) as impurity elements, and allows therefore producing practical-scale ingots having an extremely low content of carbon, oxygen and calcium.

Yet another aspect of the present invention is a method for producing alloy ingot, comprising: a step of supplying starting material electrode into a cold hearth-type electron beam melter, and irradiating electron beam onto the starting material electrode under atmospheric pressure lower than $5\times10^{-4}$ mbar, and then forming melt pool in a cold hearth in the cold hearth-type electron beam melter; a step of adding third refining agent to the melt pool and then reducing the content of carbon as impurity element present in the melt pool; and a step of forming alloy ingot by solidifying the melt, the carbon content of which has been reduced, wherein the third refining agent is second oxide containing one, two or more types from among oxides of main component element in the starting material electrode; and a weight of the third refining agent is 1 to 4 times a calculated weight that is calculated in order to oxidize totally carbon from among the impurity elements present in the melt pool.

The method allows performing reliably removal refining of carbon (C) and oxygen (O) as impurity elements. Therefore the method allows producing practical-scale ingots having an ultralow carbon content (for instance, [C]<10 ppm) and an ultralow oxygen content (for instance, [O]<10 ppm), which are difficult to produce when using a cold-crucible induction melter.

Industrial Applicability

The method for producing alloy ingot of the present invention enables production through preparation of ultrahigh-purity alloy ingots in a practical scale, in that the weight of the finished ingot is, for instance, 10 kg or more. Therefore, the invention widens the field of ultrahigh-purity alloy materials.

What is claimed is:

1. A method for producing alloy ingot, comprising:
   a step of charging alloy starting material into a cold crucible in a cold-crucible induction melter, and forming a melt pool of the alloy starting material by induction heating in inert gas atmosphere;
   a step of continuing the induction heating and adding first refining agent to the melt pool, and then reducing the content of at least phosphorus from among impurity elements present in the melt pool; and
   a step of forming alloy ingot by solidifying the melt, the phosphorus content of which has been reduced, wherein
   the first refining agent is a mixture of metallic calcium and flux containing calcium halide;
   the flux contains calcium fluoride and at least one of calcium oxide and calcium chloride, with a proportion of a total weight of the calcium oxide and the calcium chloride with respect to a weight of the calcium fluoride ranging from 5 to 30 wt %; and a proportion of a weight of the metallic calcium in the first refining agent with respect to a weight of the melt pool before adding the first refining agent is 0.4 wt % or greater.

2. The method for producing alloy ingot according to claim 1, wherein
   the proportion of a weight of the flux in the first refining agent with respect to the weight of the melt pool before adding the first refining agent is equal to or greater than the proportion of a weight of the metallic calcium in the first refining agent with respect to the weight of the melt pool.

3. The method for producing alloy ingot according to claim 1, wherein
   the melt pool is held by continuing the induction heating from a point in time at which the first refining agent is added to the melt pool up to a predetermined point in time between t1 to t2, in the step of reducing the content of phosphorus,
   where the t1 denotes a point in time by which there has elapsed half the time until fusion of all the first refining agent from the point in time at which the first refining agent is added to the melt pool, and the t2 denotes the point in time by which there has elapsed a time over which half the metallic calcium in the first refining agent evaporates, from the point in time at which the first refining agent is added to the melt pool.

4. The method for producing alloy ingot according to claim 1, wherein
   a process from the step of forming the melt pool up to the step of forming alloy ingot is performed at least once after the step of forming alloy ingot, by using the alloy ingot as alloy starting material.

5. The method for producing alloy ingot according to claim 1, further comprising:
   a step of charging into the cold crucible the alloy ingot formed by solidification, as primary ingot, and forming melt pool of the primary ingot out of the primary ingot by induction heating in inert gas atmosphere;
   a step of continuing the induction heating and adding second refining agent to the melt pool of the primary ingot, and then reducing the content of at least carbon and calcium from among impurity elements present in the melt pool; and
   a step of forming alloy ingot by solidifying the melt, the carbon and calcium content of which has been reduced, wherein
   the second refining agent is mixture of the flux and first oxide containing one, two or more types of oxides of main component element in the primary ingot;
   a weight of the first oxide in the second refining agent ranges from 0.2 to 4 times a calculated weight that is calculated in order to oxidize totally at least carbon and calcium from among impurity elements present in the melt pool of the primary ingot; and
   a proportion of the weight of the flux in the second refining agent with respect to a weight of the melt pool of the primary ingot before adding the second refining agent ranges from 0.5 to 5 wt %.

6. The method for producing alloy ingot according to claim 5, wherein
   the second refining agent is added to the melt pool of the primary ingot, and thereafter, the melt pool of the primary ingot is held by continuing the induction heating for 15 minutes or longer in evacuated state resulting from evacuating inert gas to the exterior, in the step of reducing the content of carbon and calcium.

7. The method for producing alloy ingot according to claim 6, further comprising:
   a step of charging into the cold crucible, as secondary ingot, the alloy ingot formed by solidification of the melt, the carbon and calcium content of which has been reduced, and forming melt pool of the secondary ingot out of the secondary ingot by induction heating in inert gas atmosphere;
   a step of continuing the induction heating and adding deoxidizing element-based alloy component into the melt pool of the secondary ingot thereby to form alloy; and a step of forming alloy ingot by solidifying the melt that forms the alloy.

8. The method for producing alloy ingot according to claim 1, further comprising:
   a step of supplying into a cold hearth-type electron beam melter the alloy ingot formed by solidification, as starting material electrode, and irradiating electron beam onto the electrode of the starting material under atmospheric pressure lower than $5 \times 10^{-4}$ mbar, and then forming melt pool of the starting material electrode in a cold hearth in the cold hearth-type electron beam melter;
   a step of adding third refining agent to the melt pool of the starting material electrode, and then reducing the content of carbon as impurity element present in the melt pool; and
   a step of forming alloy ingot by solidifying the melt, the carbon content of which has been reduced, wherein
   the third refining agent is second oxide containing one, two or more types from among oxides of main component element in the starting material electrode; and a weight of the third refining agent is 1 to 4 times a calculated weight that is calculated in order to oxidize totally carbon from among the impurity elements present in the melt pool of the starting material electrode.

* * * * *